United States Patent
Ikeda et al.

(10) Patent No.: US 10,362,318 B2
(45) Date of Patent: *Jul. 23, 2019

(54) IMAGE PROCESSING DEVICE AND IMAGE PROCESSING METHOD THAT HORIZONTAL FILTERING ON PIXEL BLOCKS

(71) Applicant: SONY CORPORATION, Tokyo (JP)

(72) Inventors: Masaru Ikeda, Kanagawa (JP); Junichi Tanaka, Kanagawa (JP); Yoshitaka Morigami, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/902,870

(22) Filed: Feb. 22, 2018

(65) Prior Publication Data

US 2018/0184095 A1  Jun. 28, 2018

Related U.S. Application Data

(63) Continuation of application No. 13/990,893, filed as application No. PCT/JP2011/077953 on Dec. 2, 2011, now Pat. No. 9,973,763.

(30) Foreign Application Priority Data

Dec. 7, 2010 (JP) .................................. 2010-272907
Jan. 12, 2011 (JP) .................................. 2011-004391

(Continued)

(51) Int. Cl.
H04N 7/12 (2006.01)
H04N 19/176 (2014.01)
(Continued)

(52) U.S. Cl.
CPC ......... *H04N 19/176* (2014.11); *H04N 19/117* (2014.11); *H04N 19/182* (2014.11);
(Continued)

(58) Field of Classification Search
CPC .. H04N 19/117; H04N 19/176; H04N 19/182; H04N 19/36; H04N 19/436; H04N 19/597; H04N 19/80; H04N 19/86
See application file for complete search history.

(56) References Cited

U.S. PATENT DOCUMENTS 7,715,647 B2    5/2010  Kajihata
2003/0152146 A1*  8/2003  Lin ...................... H04N 19/136
                                                375/240.16

(Continued)

FOREIGN PATENT DOCUMENTS

CN    101127906     2/2008
JP    63-104586 A   5/1988
(Continued)

OTHER PUBLICATIONS

Kemal Ugur, et al., "Appendix to Description of video coding technology proposal by Tandberg Nokia Ericsson", Tandberg, Nokia, Ericsson, Joint Collaborative Team on Video Coding (JCT-VC) of ITU-T SG16 WP3 and ISO/IEC JTC1/SC29/WG11, Appendix_Decoder_Description, 1$^{st}$ Meeting, Apr. 15-23, 2010, 55 pages.

(Continued)

*Primary Examiner* — Jessica M Prince
(74) *Attorney, Agent, or Firm* — Xsensus, LLP

(57) ABSTRACT

An image processing device including processing circuitry that perform horizontal filtering determination processes in parallel across a plurality of vertical block boundaries among a plurality of 8x8 blocks within a locally decoded image. The processing circuitry is configured to apply in parallel a horizontal filter to pixels neighboring the plurality (Continued)

of vertical block boundaries within the locally decoded image to which the horizontal filter is determined to be applied by the horizontal filtering determination processes to generate a first filtered image, perform vertical filtering determination processes in parallel across a plurality of horizontal block boundaries among the plurality of 8x8 blocks within the first filtered image, apply in parallel the vertical filter to the pixels neighboring the horizontal block boundaries within the first filtered image to generate a second filtered image, and encode an image using the second filtered image to generate an encoded stream.

12 Claims, 43 Drawing Sheets

(30) Foreign Application Priority Data

| Mar. 2, 2011 | (JP) | ................................. | 2011-045652 |
| May 26, 2011 | (JP) | ................................. | 2011-117557 |

(51) Int. Cl.

| *H04N 19/117* | (2014.01) |
| *H04N 19/182* | (2014.01) |
| *H04N 19/80* | (2014.01) |
| *H04N 19/436* | (2014.01) |
| *H04N 19/86* | (2014.01) |
| *H04N 19/597* | (2014.01) |
| *H04N 19/36* | (2014.01) |

(52) U.S. Cl.
CPC ........... *H04N 19/436* (2014.11); *H04N 19/80* (2014.11); *H04N 19/86* (2014.11); *H04N 19/36* (2014.11); *H04N 19/597* (2014.11)

(56) References Cited

U.S. PATENT DOCUMENTS

| 2005/0067993 | A1 | 3/2005 | Kato et al. | |
| 2006/0078052 | A1 | 4/2006 | Dang | |
| 2006/0133504 | A1* | 6/2006 | Jung | ........................ H04N 19/61 375/240.16 |
| 2006/0147123 | A1* | 7/2006 | Kajihata | ............... H04N 19/176 382/239 |
| 2008/0043853 | A1 | 2/2008 | Kawa et al. | |
| 2008/0123750 | A1 | 5/2008 | Bronstein et al. | |
| 2008/0240252 | A1* | 10/2008 | He | ........................ H04N 19/176 375/240.24 |
| 2009/0304086 | A1 | 12/2009 | Shi et al. | |
| 2011/0002395 | A1* | 1/2011 | Nishihara | ............ H04N 19/117 375/240.24 |
| 2011/0026611 | A1 | 2/2011 | Kondo | |
| 2011/0194614 | A1* | 8/2011 | Norkin | ................. H04N 19/176 375/240.24 |
| 2011/0222607 | A1* | 9/2011 | An | ........................ H04N 19/159 375/240.24 |
| 2012/0121188 | A1 | 5/2012 | Kondo | |
| 2013/0028531 | A1 | 1/2013 | Sato | |
| 2013/0051477 | A1 | 2/2013 | Sasaki | |
| 2013/0071039 | A1 | 3/2013 | Sato | |
| 2013/0216149 | A1 | 8/2013 | Sato | |
| 2013/0251032 | A1 | 9/2013 | Tanaka | |
| 2013/0301739 | A1 | 11/2013 | Sato | |
| 2013/0301942 | A1 | 11/2013 | Kondo | |
| 2013/0322525 | A1 | 12/2013 | Tanaka | |
| 2013/0330012 | A1 | 12/2013 | Sato | |
| 2013/0343451 | A1 | 12/2013 | Sato | |
| 2014/0003510 | A1 | 1/2014 | Lu et al. | |
| 2014/0023150 | A1 | 1/2014 | Kondo | |
| 2014/0064362 | A1 | 3/2014 | Sato | |
| 2014/0072037 | A1 | 3/2014 | Sato | |
| 2014/0086322 | A1 | 3/2014 | Takahashi et al. | |
| 2014/0092958 | A1 | 4/2014 | Sato | |
| 2014/0105281 | A1 | 4/2014 | Sato et al. | |

FOREIGN PATENT DOCUMENTS

| JP | 2003-333597 A | 11/2003 |
| JP | 2006-174138 A | 6/2006 |
| JP | 2006-174486 A | 6/2006 |
| JP | 2006-270851 A | 10/2006 |
| JP | 2008-48181 A | 2/2008 |
| JP | 2008-529412 A | 7/2008 |
| JP | 2010-14513 A | 1/2010 |
| JP | 2010-136245 A | 6/2010 |
| JP | 2010-141513 A | 6/2010 |
| WO | WO 2008/118562 A1 | 10/2008 |
| WO | WO 2010/035403 A1 | 4/2010 |
| WO | WO 2011/129090 A1 | 10/2011 |
| WO | 2012/077607 A1 | 6/2012 |
| WO | 2012/077608 A1 | 6/2012 |

OTHER PUBLICATIONS

Office Action dated Aug. 11, 2015 in Japanese Patent Application No. 2012-547833.
Office Action dated Aug. 11, 2015 in Japanese Patent Application No. 2012-547834.
Combined Chinese Office Action and Search Report dated Sep. 14, 2015 in Patent Application No. 201180057815.8 (with English language translation).
Extended Search Report dated Jan. 29, 2015, in European Patent Application No. 11846900.6.
Extended Search Report dated Feb. 19, 2015 in European Patent Application No. 11846148.2.
Masaru Ikeda, et al., "Parallel deblocking filter", Joint Collaborative Team on Video Coding (JCT-VC) of ITU-T SG16 WP3 and ISO/IEC JTC1/SC29/WG11, 4th Meeting: CH,—Jan. 2011 No. JCTVC-D263,XP030008303, 7 pages.
Office Action dated Nov. 17, 2016 in Chinese Patent Application No. 201310654537.5 (with English-language translation).
Office Action dated Oct. 31, 2017 in Korean Patent Application No. 10-2013-7013869 (with English language translation).
Office Action dated Nov. 2, 2017 in Korean Patent Application No. 10-2013-7013868 (with English language translation).
Invitation pursuant to Article 94(3) and Rule 71(1) EPC issued in European Patent Application No. 11 846 900.6.
Combined Chinese Office Action and Search Report dated Jul. 18, 2016 in Patent Application No. 201180057796.9 (with English language translation).
Kemal Ugur, et al., "Description of video coding technology proposal by Tandberg, Nokia, Ericsson," Joint Collaborative Team on Video Coding (JCT-VC) of ITU-T SG16 WP3 and ISO/IEC JTC1/SC29/WG11, 1$^{st}$ Meeting, Apr. 15-23, 2010, 9 pages.
Office Action dated Apr. 26, 2016 in Japanese Patent Application No. 2012-547833.
Office Action dated Apr. 26, 2016 in Japanese Patent Application No. 2012-547834.
Combined Chinese Office Action and Search Report dated Mar. 7, 2016 in Patent Application No. 201180057815.8 (with English language translation).
Combined Chinese Office Action and Search Report dated Jan. 4, 2016 in Patent Application No. 201180057796.9 (with English language translation).
Office Action dated Jan. 19, 2016, in Japanese Patent Application No. 2012-547833.
Office Action dated Jan. 19, 2016, in Japanese Patent Application No. 2012-547834.
Korean Intellectual Property Office Notice of Preliminary Rejection, dated Aug. 17, 2018 in Korean Application 10-2018-7016187.
Korean Intellectual Property Office Notice of Preliminary Rejection, dated Aug. 17, 2018 in Korean Application 10-2018-7016184.
Kemel Ugur, Appendix to Description of Video Coding Technology Proposal by Tandberg Nokia Ericsson, Joint Collaborative Team on

(56) References Cited

OTHER PUBLICATIONS

Video Coding (JCT-VC) of ITU-T SG16 WP3 and ISO/IEC JTC1/SC29/WG11, Apr. 15-23, 2010; in Japanese Office Action corresponding to Japanese Application 2017-173731.
Kemel Ugur, Appendix to Description of Video Coding Technology Proposal by Tandberg Nokia Ericsson, Joint Collaborative Team on Video Coding (JCT-VC) of ITU-T SG16 WP3 and ISO/IEC JTC1/SC29/WG11, Apr. 15-23, 2010; in Japanese Office Action corresponding to Japanese Application 2017-173732.
Japanese Office Action, dated Jul. 31, 2018 in Japanese Application 2017-173732 with Partial Translation.
Japanese Office Action, dated Jul. 31, 2018 in Japanese Application 2017-173731 with Partial Translation.
Notification of Reasons for Refusal issued in Japanese Application 2017-173731 dated Nov. 6, 2018.
Notification of Reasons for Refusal issued in Japanese Application 2017-173732 dated Nov. 6, 2018.
Davies, T., et al., "BBC's Response to the Call for Proposals on Video Compression Technology", British Broadcasting Corporation and Samsung Electronics Co., Ltd,, Joint Collaborative Team on Video Coding (JCT-VC) of ITU-T SG16 WP3 and ISO/IEC JTC1/SC29/WG11, JCTVC-A125, 7 Pages total, (Apr. 15-23, 2010).

\* cited by examiner

⊘ : PIXEL UPDATED BY FILTERING ON VERTICAL BOUNDARIES (HORIZONTAL FILTERING)

PARALLELISM: SMALL

BOUNDARY

BOUNDARY

○ : FILTERING ENABLED
× : FILTERING DISABLED

| | | VERTICAL BOUNDARY | |
|---|---|---|---|
| | | ○ | × |
| HORIZONTAL BOUNDARY | ○ | WEIGHTED AVERAGE | FILTER OUTPUT FOR HORIZONTAL BOUNDARY |
| | × | FILTER OUTPUT FOR VERTICAL BOUNDARY | INPUT PIXEL VALUE |

EXAMPLE OF OUTPUT PIXEL VALUES
FROM CALCULATION SECTION

IMAGE PROCESSING DEVICE AND IMAGE PROCESSING METHOD THAT HORIZONTAL FILTERING ON PIXEL BLOCKS

CROSS-REFERENCE TO RELATED APPLICATIONS

This application is a continuation of U.S. Ser. No. 13/990,893 filed May 31, 2013, the entire content of which is incorporated herein by reference. U.S. Ser. No. 13/990,893 is a national stage of PCT/JP2011/077953 filed Dec. 2, 2011, and also claims priorities under 35 U.S.C. 119 to Japanese Application No. 2011-117557 filed May 26, 2011, Japanese Application No. 2011-045652 filed Mar. 2, 2011, Japanese Application No. 2011-004391 filed Jan. 12, 2011, and Japanese Application No. 2010-272907 filed Dec. 7, 2010.

TECHNICAL FIELD

The present disclosure relates to an image processing device and an image processing method.

BACKGROUND ART

H.264/AVC, one of standard specifications for image encoding scheme, applies a deblocking filter to a block boundary in units of blocks each containing 4×4 pixels, for example, in order to prevent image quality degradation due to block distortion while an image is encoded. The deblocking filter requires a large amount of processing and may account for 50% of the entire processing amount in image decoding, for example.

The standards work for High Efficiency Video Coding (HEVC), a next-generation image encoding system, proposes application of the deblocking filter in units of blocks each containing 8×8 pixels or more according to JCTVC-A119 (see Non-Patent Literature 1). The technique proposed in JCTVC-A119 increases the block size as a minimum unit for applying the deblocking filter to perform filtering processes in parallel on block boundaries in the same direction within one macro block.

CITATION LIST

Non-Patent Literature

Non-Patent Literature 1: K.Ugur (Nokia), K. R. Andersson (L M Ericsson), A. Fuldseth (Tandberg Telecom), "JCTVC-A119:Video coding technology proposal by Tandberg, Nokia, and Ericsson", Documents of the first meeting of the Joint Collaborative Team on Video Coding (JCT-VC), Dresden, Germany, 15-23 Apr. 2010.

SUMMARY OF INVENTION

Technical Problem

However, the technique proposed in JCTVC-A119 does not solve dependency between the process on vertical block boundaries and the process on horizontal block boundaries. It is still difficult to enable parallel processing on block boundaries in different directions within one macro block (or one encoding unit) and enable parallel processing between macro blocks. Accordingly, the above-described technique may not successfully solve problems of a delay and a decrease in data rates due to a large processing amount while the deblocking filter is applied.

The technology according to the disclosure aims at providing an image processing device and an image processing method capable of providing parallel processing when a deblocking filter is applied.

Solution to Problem

According to an embodiment of the present disclosure, there is provided an image processing device including a decoding section configured to decode an image from an encoded stream, a determination section configured to perform determination processes of determining whether to apply a deblocking filter to neighboring blocks neighboring across a block boundary within an image to be decoded by the decoding section, a filtering section configured to apply a deblocking filter to neighboring blocks to which the determination section has determined to apply a deblocking filter, and a control section configured to allow the determination section to perform the determination processes for a vertical block boundary and a horizontal block boundary using pixels of the neighboring blocks of a reconstruct image as reference pixels.

The image processing device can be realized typically as an image decoding device for decoding an image.

Further, according to an embodiment of the present disclosure, there is provided an image processing method including decoding an image from an encoded stream, performing determination processes of determining whether to apply a deblocking filter to neighboring blocks neighboring across a block boundary within an image to be decoded, applying a deblocking filter to neighboring blocks to which it has been determined in the determination processes to apply a deblocking filter, and controlling the determination processes in a manner that the determination processes for a vertical block boundary and a horizontal block boundary are performed using pixels of the neighboring blocks of a reconstruct image as reference pixels.

Further, according to an embodiment of the present disclosure, there is provided an image processing device including a determination section configured to perform determination processes of determining whether to apply a deblocking filter to neighboring blocks neighboring across a block boundary within an image to be locally decoded when an image to be encoded is encoded, a filtering section configured to apply a deblocking filter to neighboring blocks to which the determination section has determined to apply a deblocking filter, a control section configured to allow the determination section to perform the determination processes for a vertical block boundary and a horizontal block boundary using pixels of the neighboring blocks of a reconstruct image as reference pixels, and an encoding section configured to encode the image to be encoded using an image filtered by the filtering section.

The image processing device can be realized typically as an image encoding device for encoding an image.

According to an embodiment of the present disclosure, there is provided an image processing method including performing determination processes of determining whether to apply a deblocking filter to neighboring blocks neighboring across a block boundary within an image to be locally decoded when an image to be encoded is encoded, applying a deblocking filter to neighboring blocks to which it has been determined in the determination processes to apply a deblocking filter, controlling the determination processes in a manner that the determination processes for a vertical block boundary and a horizontal block boundary are performed using pixels of the neighboring blocks of a reconstruct image as reference pixels, and encoding the image to be encoded using an image filtered by the deblocking filter.

Advantageous Effects of Invention

As described above, the image processing device and the image processing method according to the present disclosure further improves parallel processing when a deblocking filter is applied.

DESCRIPTION OF EMBODIMENT

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Description of Embodiment will be described in the following sequence.

1. Apparatus Overview
1-1. Image Encoding Device
1-2. Image Decoding Device
2. Existing Technique
2-1. Basic Configuration of Deblocking Filter
2-2. Dependency Between Processes According to an Existing Technique
3. First Working Example
3-1. Deblocking Filter Configuration Example
3-2. Process Flow
4. Second Working Example
4-1. Deblocking Filter Configuration Example
4-2. Process Flow
4-3. Process Example for Each LCU
5. Third Working Example
5-1. Overview
5-2. Deblocking Filter Configuration Example
5-3. Process Sequence Example
5-4. Process Flow
6. Application to Various Codecs
6-1. Multiview Codec
6-2. Scalable Codec
7. Example Applications
8. Summing-up 1. Apparatus Overview With reference to FIGS. 1 and 2, the following describes an overview of an apparatus to which the technology disclosed in this specification is applicable. The technology disclosed in this specification is applicable to an image encoding device and an image decoding device, for example.

[1-1. Image Encoding Device]

Figure 1:
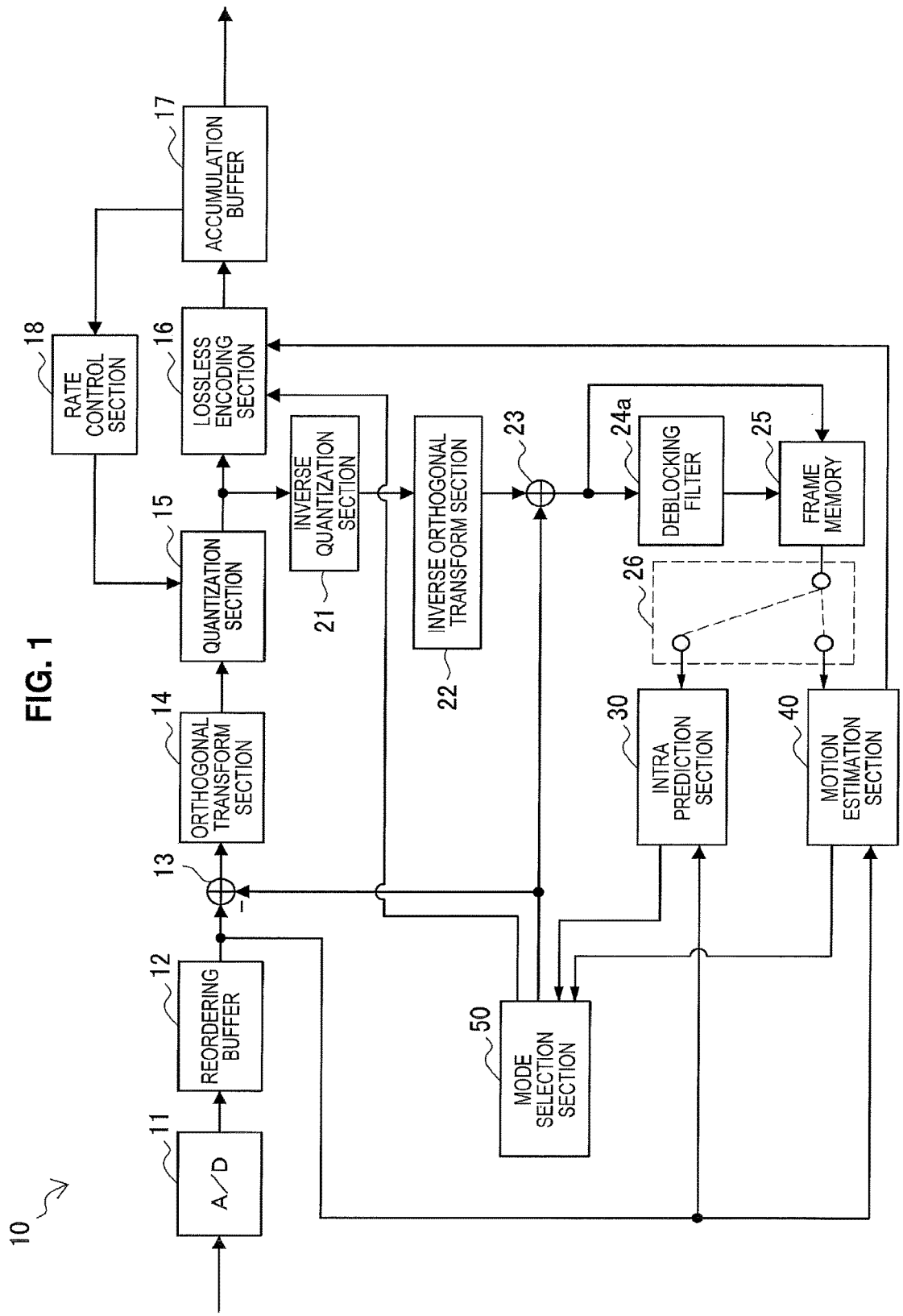
FIG. 1 is a block diagram showing an example of a configuration of an image encoding device according to an embodiment.

FIG. 1 is a block diagram showing an example of a configuration of an image encoding device 10 according to an embodiment. Referring to FIG. 1, the image encoding device 10 includes an A/D (Analogue to Digital) conversion section 11, a reordering buffer 12, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a deblocking filter 24a, a frame memory 25, a selector 26, an intra prediction section 30, a motion estimation section 40, and a mode selection section 50.

The A/D conversion section 11 converts an image signal input in an analogue format into image data in a digital format, and outputs a series of digital image data to the reordering buffer 12.

The reordering buffer 12 reorders the images included in the series of image data input from the A/D conversion section 11. After reordering the images according to the a GOP (Group of Pictures) structure according to the encoding process, the reordering buffer 12 outputs the image data which has been reordered to the subtraction section 13, the intra prediction section 30, and the motion estimation section 40.

The image data input from the reordering buffer 12 and predicted image data selected by the mode selection section 50 described later are supplied to the subtraction section 13. The subtraction section 13 calculates predicted error data which is a difference between the image data input from the reordering buffer 12 and the predicted image data input from the mode selection section 50, and outputs the calculated predicted error data to the orthogonal transform section 14.

The orthogonal transform section 14 performs orthogonal transform on the predicted error data input from the subtraction section 13. The orthogonal transform to be performed by the orthogonal transform section 14 may be discrete cosine transform (DCT) or Karhunen-Loeve transform, for example. The orthogonal transform section 14 outputs transform coefficient data acquired by the orthogonal transform process to the quantization section 15.

The transform coefficient data input from the orthogonal transform section 14 and a rate control signal from the rate control section 18 described later are supplied to the quantization section 15. The quantization section 15 quantizes the transform coefficient data, and outputs the transform coefficient data which has been quantized (hereinafter, referred to as quantized data) to the lossless encoding section 16 and the inverse quantization section 21. Also, the quantization section 15 switches a quantization parameter (a quantization scale) based on the rate control signal from the rate control section 18 to thereby change the bit rate of the quantized data to be input to the lossless encoding section 16.

The quantized data input from the quantization section 15 and information described later about intra prediction or inter prediction generated by the intra prediction section 30 or the motion estimation section 40 and selected by the mode selection section 50 are supplied to the lossless encoding section 16. The information about intra prediction may include prediction mode information indicating an optimal intra prediction mode for each block, for example. Also, the information about inter prediction may include prediction mode information for prediction of a motion vector for each block, difference motion vector information, reference image information, and the like, for example.

The lossless encoding section 16 generates an encoded stream by performing a lossless encoding process on the quantized data. The lossless encoding by the lossless encoding section 16 may be variable-length coding or arithmetic coding, for example. Furthermore, the lossless encoding section 16 multiplexes the information about intra prediction or the information about inter prediction mentioned above to the header of the encoded stream (for example, a block header, a slice header or the like). Then, the lossless encoding section 16 outputs the generated encoded stream to the accumulation buffer 17.

The accumulation buffer 17 temporarily stores the encoded stream input from the lossless encoding section 16 using a storage medium, such as a semiconductor memory. Then, the accumulation buffer 17 outputs the accumulated encoded stream at a rate according to the band of a transmission line (or an output line from the image encoding device 10).

The rate control section 18 monitors the free space of the accumulation buffer 17. Then, the rate control section 18 generates a rate control signal according to the free space on the accumulation buffer 17, and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21 performs an inverse quantization process on the quantized data input from the quantization section 15. Then, the inverse quantization section 21 outputs transform coefficient data acquired by the inverse quantization process to the inverse orthogonal transform section 22.

The inverse orthogonal transform section 22 performs an inverse orthogonal transform process on the transform coefficient data input from the inverse quantization section 21 to thereby restore the predicted error data. Then, the inverse orthogonal transform section 22 outputs the restored predicted error data to the addition section 23.

The addition section 23 adds the restored predicted error data input from the inverse orthogonal transform section 22 and the predicted image data input from the mode selection section 50 to thereby generate decoded image data. Then, the addition section 23 outputs the generated decoded image data to the deblocking filter 24a and the frame memory 25.

A deblocking filter 24a performs filtering processes to decrease block distortion that occurs during image encoding. For example, the deblocking filter 24a determines necessity of filtering for each block boundary of decoded image data supplied from an addition section 23 and applies the deblocking filter to a boundary that is determined to require the filter. The deblocking filter 24a is also supplied with information used for the determination of filtering necessity (e.g., mode information, transform coefficient information, and motion vector information) as well as decoded image data from the addition section 23. After the filtering, the block distortion is eliminated from the decoded image data and the deblocking filter 24a outputs the decoded image data to frame memory 25. The process for the deblocking filter 24a will be described in detail later.

The frame memory 25 stores, using a storage medium, the decoded image data input from the addition section 23 and the decoded image data after filtering input from the deblocking filter 24a.

The selector 26 reads, from the frame memory 25, the decoded image data before filtering that is to be used for the intra prediction, and supplies the decoded image data which has been read to the intra prediction section 30 as reference image data. Also, the selector 26 reads, from the frame memory 25, the decoded image data after filtering to be used for the inter prediction, and supplies the decoded image data which has been read to the motion estimation section 40 as reference image data.

The intra prediction section 30 performs an intra prediction process in each intra prediction mode, based on the image data to be encoded that is input from the reordering buffer 12 and the decoded image data supplied via the selector 26. For example, the intra prediction section 30 evaluates the prediction result of each intra prediction mode using a predetermined cost function. Then, the intra prediction section 30 selects an intra prediction mode by which the cost function value is the smallest, that is, an intra prediction mode by which the compression ratio is the highest, as the optimal intra prediction mode. Furthermore, the intra prediction section 30 outputs, to the mode selection section 50, prediction mode information indicating the optimal intra prediction mode, the predicted image data, and the information about intra prediction such as the cost function value.

A motion estimation section 40 performs an inter prediction process (prediction process between frames) based on image data for encoding supplied from a reordering buffer 12 and decoded image data supplied via a selector 26. For example, the motion estimation section 40 evaluates the prediction result of each prediction mode using a predetermined cost function. Then, the motion estimation section 40 selects an optimal prediction mode, namely, a prediction mode that minimizes the cost function value or maximizes the compression ratio. The motion estimation section 40 generates predicted image data according to the optimal prediction mode. The motion estimation section 40 outputs information about the inter prediction such as prediction mode information indicating the optimal intra prediction mode, the predicted image data, and the cost function value to a mode selection section 50.

The mode selection section 50 compares the cost function value related to the intra prediction input from the intra prediction section 30 and the cost function value related to the inter prediction input from the motion estimation section 40. Then, the mode selection section 50 selects a prediction method with a smaller cost function value, from the intra prediction and the inter prediction. In the case of selecting the intra prediction, the mode selection section 50 outputs the information about intra prediction to the lossless encoding section 16, and also, outputs the predicted image data to the subtraction section 13 and the addition section 23. Also, in the case of selecting the inter prediction, the mode selection section 50 outputs the information about inter prediction described above to the lossless encoding section 16, and also, outputs the predicted image data to the subtraction section 13 and the addition section 23.

[1-2. Image Decoding Device]

Figure 2:
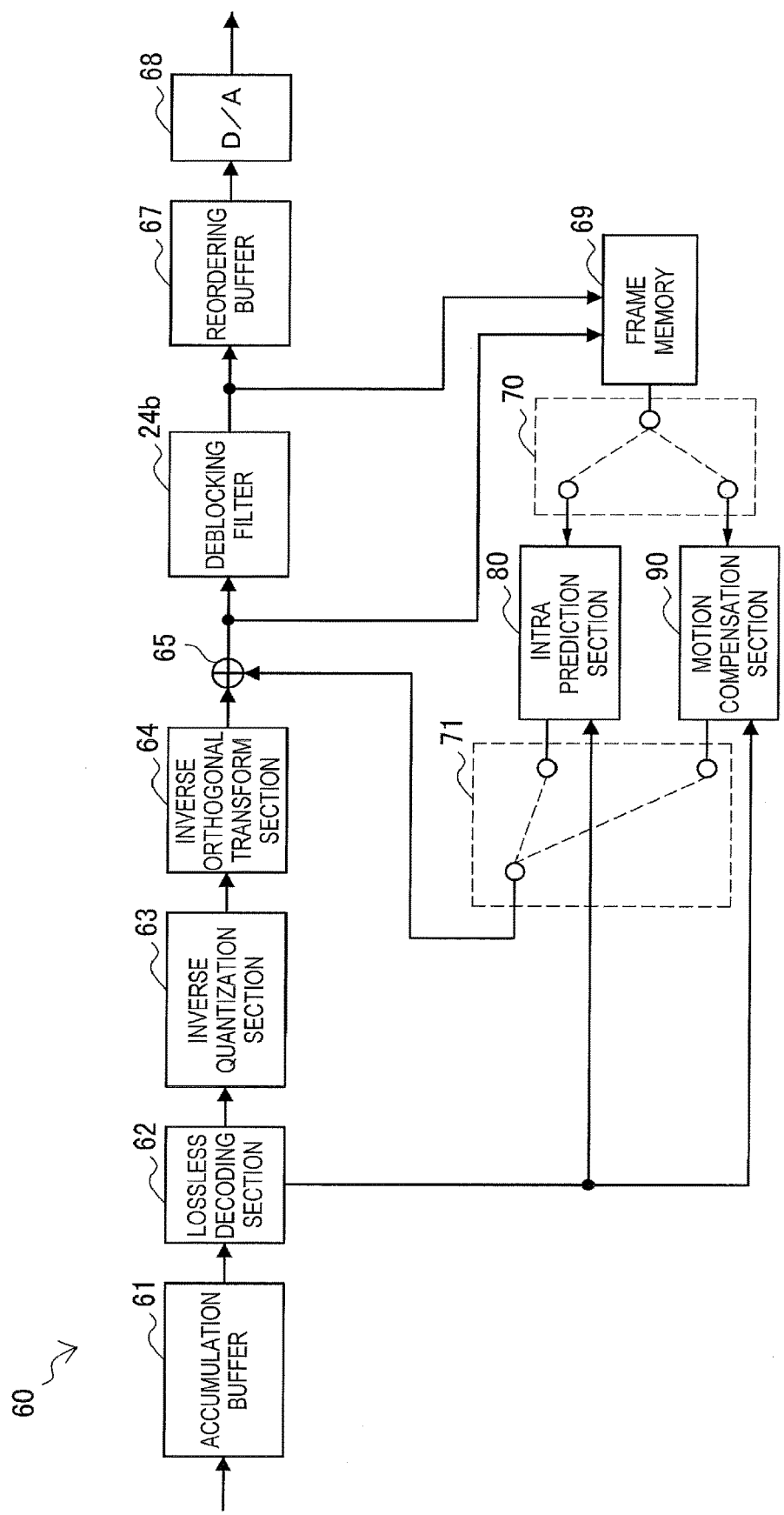
FIG. 2 is a block diagram showing an example of a configuration of an image decoding device according to an embodiment.

FIG. 2 is a block diagram showing an example of a configuration of an image decoding device 60 according to an embodiment. With reference to FIG. 2, the image decoding device 60 includes an accumulation buffer 61, a lossless decoding section 62, an inverse quantization section 63, an inverse orthogonal transform section 64, an addition section 65, a deblocking filter 24b, a reordering buffer 67, a D/A (Digital to Analogue) conversion section 68, a frame memory 69, selectors 70 and 71, an intra prediction section 80, and a motion compensation section 90.

The accumulation buffer 61 temporarily stores an encoded stream input via a transmission line using a storage medium.

The lossless decoding section 62 decodes an encoded stream input from the accumulation buffer 61 according to the encoding method used at the time of encoding. Also, the lossless decoding section 62 decodes information multiplexed to the header region of the encoded stream. Information that is multiplexed to the header region of the encoded stream may include information about intra prediction and information about inter prediction in the block header, for example. The lossless decoding section 62 outputs the information about intra prediction to the intra prediction section 80. Also, the lossless decoding section 62 outputs the information about inter prediction to the motion compensation section 90.

The inverse quantization section 63 inversely quantizes quantized data which has been decoded by the lossless decoding section 62. The inverse orthogonal transform section 64 generates predicted error data by performing inverse orthogonal transformation on transform coefficient data input from the inverse quantization section 63 according to the orthogonal transformation method used at the time of encoding. Then, the inverse orthogonal transform section 64 outputs the generated predicted error data to the addition section 65.

The addition section 65 adds the predicted error data input from the inverse orthogonal transform section 64 and predicted image data input from the selector 71 to thereby generate decoded image data. Then, the addition section 65 outputs the generated decoded image data to the deblocking filter 24b and the frame memory 69.

The deblocking filter 24b performs filtering processes to decrease block distortion appearing on a decoded image. The deblocking filter 24b determines the necessity of filtering at each block boundary for decoded image data input from the addition section 65, for example, and applies the deblocking filter to a boundary that is determined to require the filter. The deblocking filter 24b is also supplied with information used for the determination of filtering necessity as well as decoded image data from the addition section 65. After the filtering, the block distortion is eliminated from the decoded image data and the deblocking filter 24b outputs the decoded image data to the reordering buffer 67 and the frame memory 69. The process for the deblocking filter 24b will be described in detail later.

The reordering buffer 67 generates a series of image data in a time sequence by reordering images input from the deblocking filter 24b. Then, the reordering buffer 67 outputs the generated image data to the D/A conversion section 68.

The D/A conversion section 68 converts the image data in a digital format input from the reordering buffer 67 into an image signal in an analogue format. Then, the D/A conversion section 68 causes an image to be displayed by outputting the analogue image signal to a display (not shown) connected to the image decoding device 60, for example.

The frame memory 69 uses a storage medium to store the decoded image data input from the addition section 65 before filtering and the decoded image data input from the deblocking filter 24b after filtering.

The selector 70 switches the output destination of the image data from the frame memory 69 between the intra prediction section 80 and the motion compensation section 90 for each block in the image according to mode information acquired by the lossless decoding section 62. For example, in the case the intra prediction mode is specified, the selector 70 outputs the decoded image data before filtering that is supplied from the frame memory 69 to the intra prediction section 80 as reference image data. Also, in the case the inter prediction mode is specified, the selector 70 outputs the decoded image data after filtering that is supplied from the frame memory 69 to the motion compensation section 90 as the reference image data.

The selector 71 switches the output source of predicted image data to be supplied to the addition section 65 between the intra prediction section 80 and the motion compensation section 90 for each block in the image according to the mode information acquired by the lossless decoding section 62. For example, in the case the intra prediction mode is specified, the selector 71 supplies to the addition section 65 the predicted image data output from the intra prediction section 80. In the case the inter prediction mode is specified, the selector 71 supplies to the addition section 65 the predicted image data output from the motion compensation section 90.

The intra prediction section 80 performs in-screen prediction of a pixel value based on the information about intra prediction input from the lossless decoding section 62 and the reference image data from the frame memory 69, and generates predicted image data. Then, the intra prediction section 80 outputs the generated predicted image data to the selector 71.

The motion compensation section 90 performs a motion compensation process based on the information about inter prediction input from the lossless decoding section 62 and the reference image data from the frame memory 69, and generates predicted image data. Then, the motion compensation section 90 outputs the generated predicted image data to the selector 71.

<2. Existing Technique>

[2-1. Basic Configuration of Deblocking Filter]

Generally, processes using the deblocking filter in an existing image encoding system such as H.264/AVC or HEVC include two types of processes, namely, filtering need determination processes and filtering processes. The following describes these two processes in HEVC, for example.

(1) Filtering Need Determination Processes

The filtering need determination processes determine whether the deblocking filter needs to be applied to each boundary of blocks within an input image. Block boundaries include a vertical boundary between blocks horizontally adjacent to each other and a horizontal boundary between blocks vertically adjacent to each other. JCTVC-A119 uses a block size of 8×8 pixels as a minimum processing unit. For example, a macro block of 16×16 pixels includes four blocks of 8×8 pixels. The process is applied to one (left) vertical boundary and one (top) horizontal boundary for each block, namely, four boundaries plus four boundaries equal to eight boundaries in total. The specification assumes that the macro block as a technical term includes an coding unit (CU) in the context of HEVC.

Figure 3:
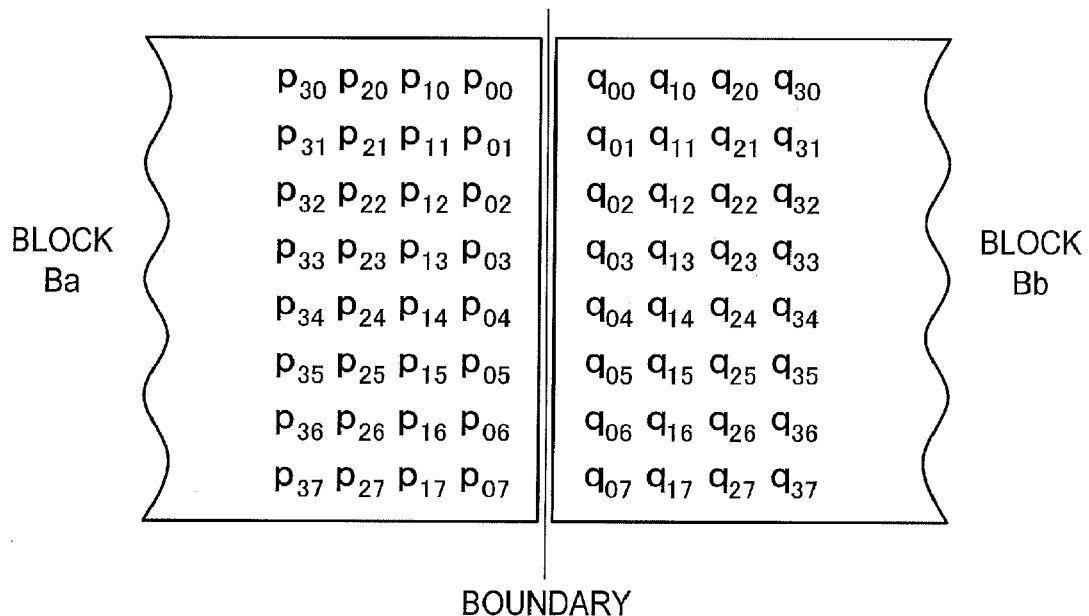
FIG. 3 is an explanatory diagram showing an example of neighboring pixels around a boundary.

FIG. 3 is an explanatory diagram showing an example of pixels in two blocks (neighboring blocks) Ba and Bb adjacent to each other around a boundary. The following describes the vertical boundary as an example and the description is obviously applicable to the horizontal boundary. The example in FIG. 3 uses symbol $p_{ij}$ to represent a pixel in block Ba. In this symbol, i denotes a column index and j denotes a row index. The column index i is numbered as 0, 1, 2, and 3 in order (from right to left) from the column nearest to the vertical boundary. The row index j is numbered as 0, 1, 2, . . . , 7 from the top to the bottom. The left half of block Ba is omitted from the drawing. Symbol $q_{kj}$ is used to represent a pixel in block Bb. In this symbol, k denotes a column index and j denotes a row index. The column index k is numbered as 0, 1, 2, and 3 in order (from left to right) from the column nearest to the vertical boundary. The right half of block Bb is omitted from the drawing.

The following conditions can be used to determine the necessity of applying the deblocking filter to the vertical boundary between blocks Ba and Bb shown in FIG. 3.

Determination condition of luma component (Luma) . . . The deblocking filter is applied if conditions A and B are both true.

Condition A:

(A1) Block Ba or Bb enters the intra prediction mode;

(A2) Block Ba or Bb has a nonzero orthogonal transform coefficient; or (A3) $|MVAx-MVBx| \geq 4$ or $|MVAy-MVBy| \geq 4$ Condition B:

$|p_{22}-2p_{12}+p_{02}|+|q_{22}-2q_{12}+q_{02}|+|p_{25}-2p_{15}+p_{05}|+|q_{25}-2q_{15}+q_{05}|<\beta$ Condition A3 assumes a motion vector for block Ba to be (MVAx,MVAy) and a motion vector for block Bb to be (MVBx,MVBy) according to the Qpel (¼ pixel) accuracy. Condition B uses β as an edge determination threshold value. An initial value of β is given according to a quantization parameter. The value for β is user-specifiable using a parameter within the slice header.

Determination condition of chroma component (Chroma) . . . The deblocking filter is applied if condition A1 is true.

Condition A1: Block Ba or Bb enters the intra prediction mode.

Figure 4:
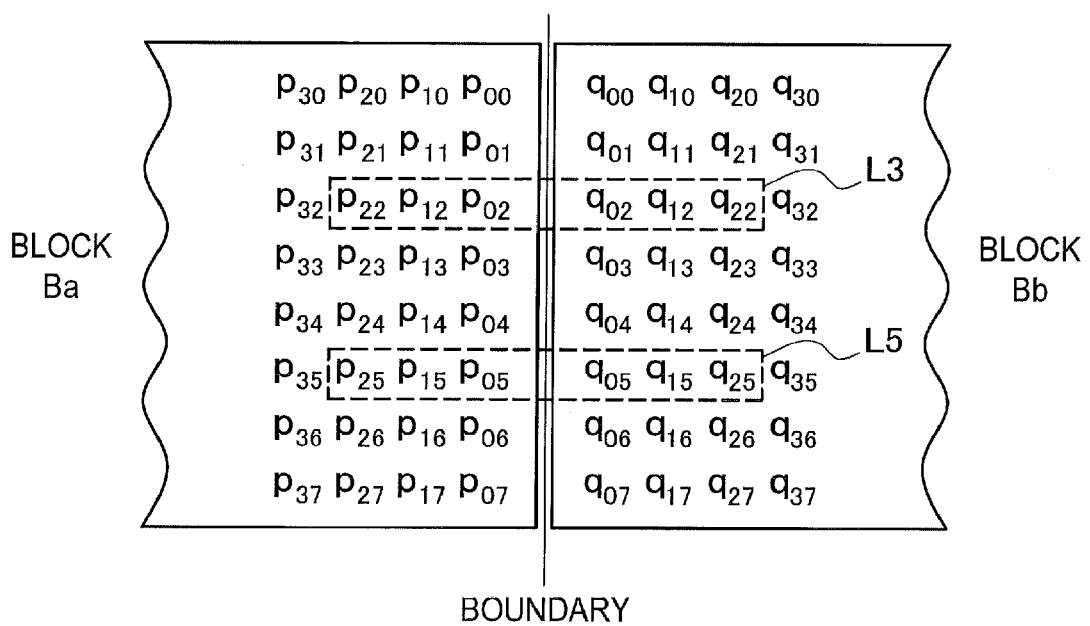
FIG. 4 is an explanatory diagram illustrating reference pixels during filtering need determination processes according to an existing technique.

As indicated by broken-line frames L3 and L6 in FIG. 4, the filtering need determination processes on general vertical boundaries (particularly under determination condition B of luma component) reference pixels on the third and sixth rows (assuming the top row to be the first) in each block. Similarly, the filtering need determination processes on horizontal boundaries reference pixels (not shown in FIG. 4) on the third and sixth columns in each block. The above-described determination conditions are used to determine that the deblocking filter needs to be applied to a boundary on which the filtering processes described below are performed.

(2) Filtering Processes

If it is determined that the deblocking filter needs to be applied to a boundary, the filtering processes are performed on pixels to the right and the left of the vertical boundary and on pixels above and below the horizontal boundary. On luma components, the filter strength is switched between a strong filter and a weak filter according to pixel values.

Filtering Luma Components

Selecting the strength . . . The filter strength is selected for each row or column. The strong filter is selected if all of the following conditions C1 through C3 are satisfied. The weak filter is selected if even any one of the conditions is not satisfied.

(C1) $d < (\beta >> 2)$
(C2) $(|p_{3j} - p_{0j}| + |q_{0j} - q_{3j}|) < (\beta >> 3)$
(C3) $|p_{0j} - q_{0j}| < ((5t_C + 1) >> 1)$ where j denotes a row index for the vertical boundary or a column index for the horizontal boundary. $d = |p_{22} - 2p_{12} + p_{02}| + |q_{22} - 2q_{12} + q_{02}| + |p_{25} - 2p_{15} + p_{05}| + |q_{25} - 2q_{15} + q_{05}|$ Weak Filtering $\Delta = \text{Clip}(-t_C, t_C, (13(q_{0j} - p_{0j}) + 4(q_{1j} - p_{1j}) - 5(q_{2j} - p_{2j}) + 16) >> 5))$ $p_{0j} = \text{Clip}_{0-255}(p_{0j} + \Delta)$
$q_{0j} = \text{Clip}_{0-255}(q_{0j} - \Delta)$
$p_{1j} = \text{Clip}_{0-255}(p_{1j} + \Delta/2)$
$q_{1j} = \text{Clip}_{0-255}(q_{1j} - \Delta/2)$ Strong Filtering $p_{0j} = \text{Clip}_{0-255}((p_{2j} + 2p_{1j} + 2p_{0j} + 2q_{0j} + q_{1j} 4) >> 3)$
$q_{0j} = \text{Clip}_{0-255}((p_{1j} + 2p_{0j} + 2q_{1j} + q_{2j} + 4) >> 3)$
$p_{1j} = \text{Clip}_{0-255}((p_{2j} + p_{1j} + p_{0j} + q_{0j} + 2) >> 2)$
$q_{1j} = \text{Clip}_{0-255}((p_{0j} + q_{0j} + q_{1j} + q_{2j} + 2) >> 2)$
$p_{2j} = \text{Clip}_{0-255}((2p_{3j} + 3p_{2j} + p_{1j} + p_{0j} + q_{0j} + 4) >> 3)$
$q_{2j} = \text{Clip}_{0-255}((p_{0j} + q_{0j} + q_{1j} + 3q_{2j} + 2q_{3j} + 4) >> 3)$ where Clip(a,b,c) denotes a process to clip value c within the range of $a \leq c \leq b$ and $\text{Clip}_{0-255}(c)$ denotes a process to clip value c within the range of $0 \leq c \leq 255$.

Figure 5:
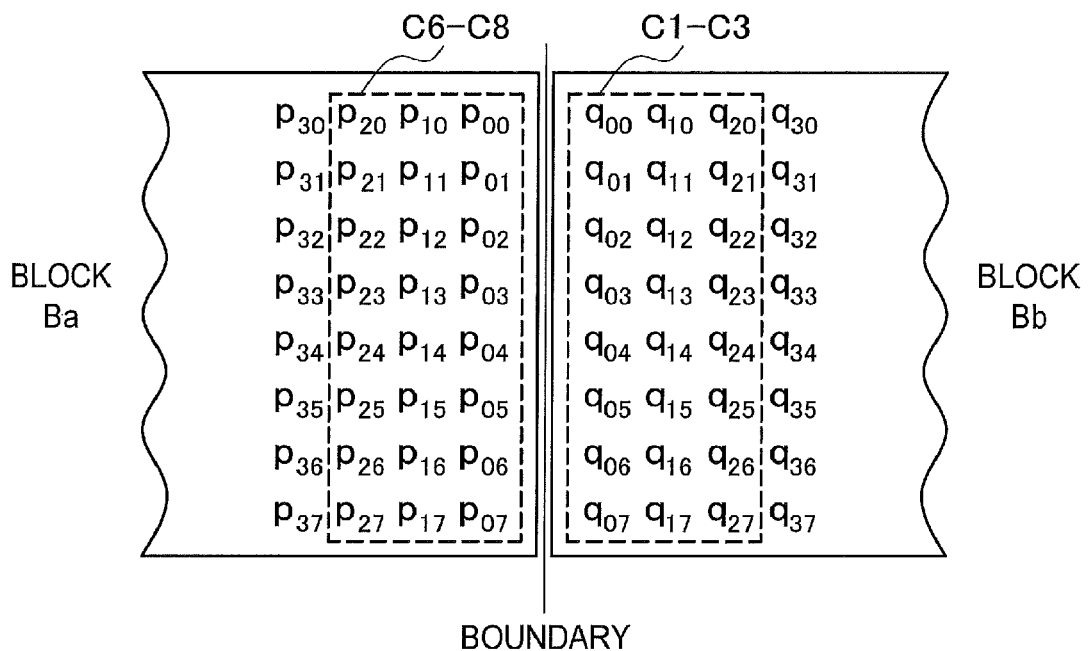
FIG. 5 is an explanatory diagram illustrating pixels updated by filtering processes.

Filtering Chroma Components $\Delta = \text{Clip}(-t_C, t_C, ((((q_{0j} - p_{0j}) << 2) + p_{1j} - q_{1j} + 4) >> 3))$
$p_{0j} = \text{Clip}_{0-255}(p_{0j} + \Delta)$
$q_{0j} = \text{Clip}_{0-255}(q_{0j} - \Delta)$ As indicated by broken-line frames C6 through C8 and C1 through C3 in FIG. 5, the filtering processes (particularly strong filtering on luma components) on general vertical boundaries update pixel values on the first through third and sixth through eighth columns in each block. Similarly, the filtering processes on horizontal boundaries update pixel values on the first through third and sixth through eighth rows in each block.

[2-2. Dependency Between Processes According to an Existing Technique]

Figure 6:
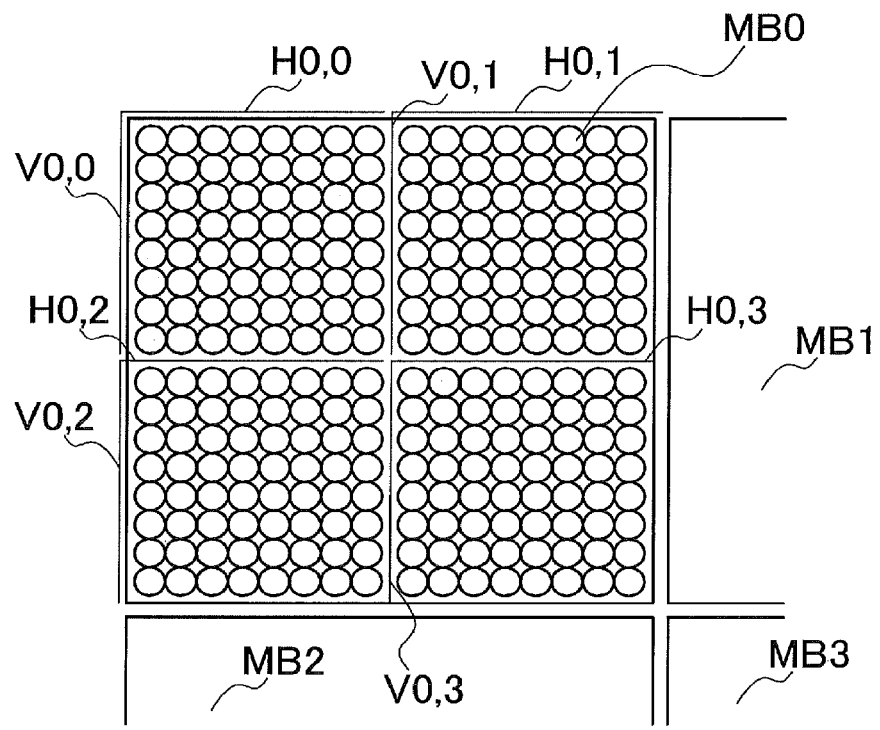
FIG. 6 is an explanatory diagram illustrating identification of edges for description of the embodiment.

For the purpose of description, as shown in FIG. 6, macro block MBx (MB0, MB1 . . . ) each having the size of 16×16 pixels includes the top left vertical boundary represented as Vx,0, the top center vertical boundary represented as Vx,1, the bottom left vertical boundary represented as Vx,2, the bottom center vertical boundary represented as Vx,3, the top left horizontal boundary represented as Hx,0, the top right horizontal boundary represented as Hx,1, the left center horizontal boundary represented as Hx,2, and the right center horizontal boundary represented as Hx,3. Concerning boundary Z, for example, the filtering need determination process is represented as $J_Z$ and the filtering process is represented as $F_Z$.

Figure 7:
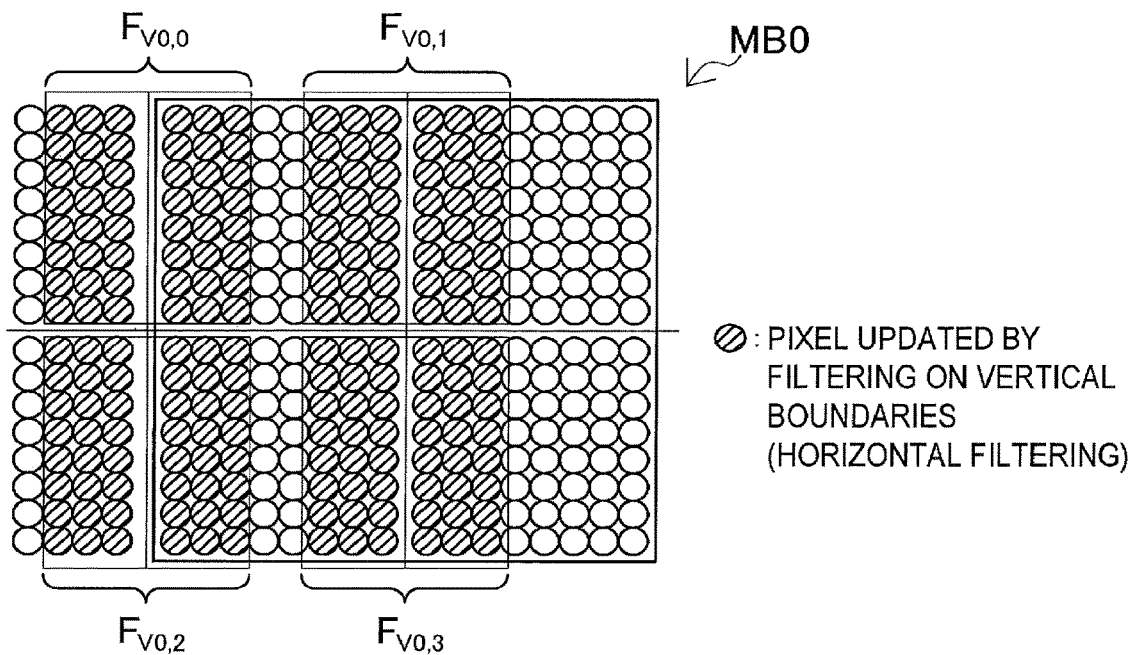
FIG. 7 is an explanatory diagram illustrating a parallel process according to an existing technique.

The above-described existing technique causes no dependency between processes on boundaries in the same direction within one macro block. Therefore, the technique can perform parallel filtering on vertical boundaries and horizontal boundaries within one macro block, for example. As an example, FIG. 7 makes it clear that there is no dependency among four filtering processes $F_{V0,0}$, $F_{V0,1}$, $F_{V0,2}$, and $F_{V0,3}$ (no pixel updated redundantly) within macro block MB0 and the filtering processes can be performed in parallel.

However, the above-described existing technique leaves the dependency between the filtering processes on vertical boundaries and the filtering need determination processes on horizontal boundaries. The existing technique also leaves the dependency between the filtering processes on horizontal boundaries and the filtering need determination processes on vertical boundaries. If a vertical boundary is processed prior to a horizontal boundary, for example, the filtering need determination processes need to be performed on horizontal boundaries within a given macro block after termination of the filtering processes on vertical boundaries.

Figure 8:
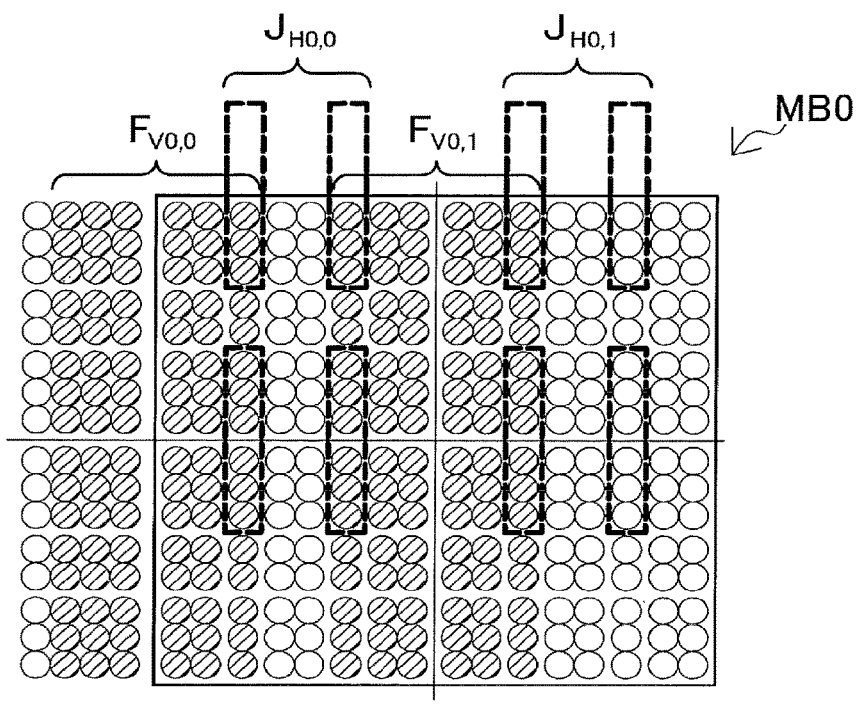
FIG. 8 is a first explanatory diagram illustrating dependency between processes according to an existing technique.
Figure 9:
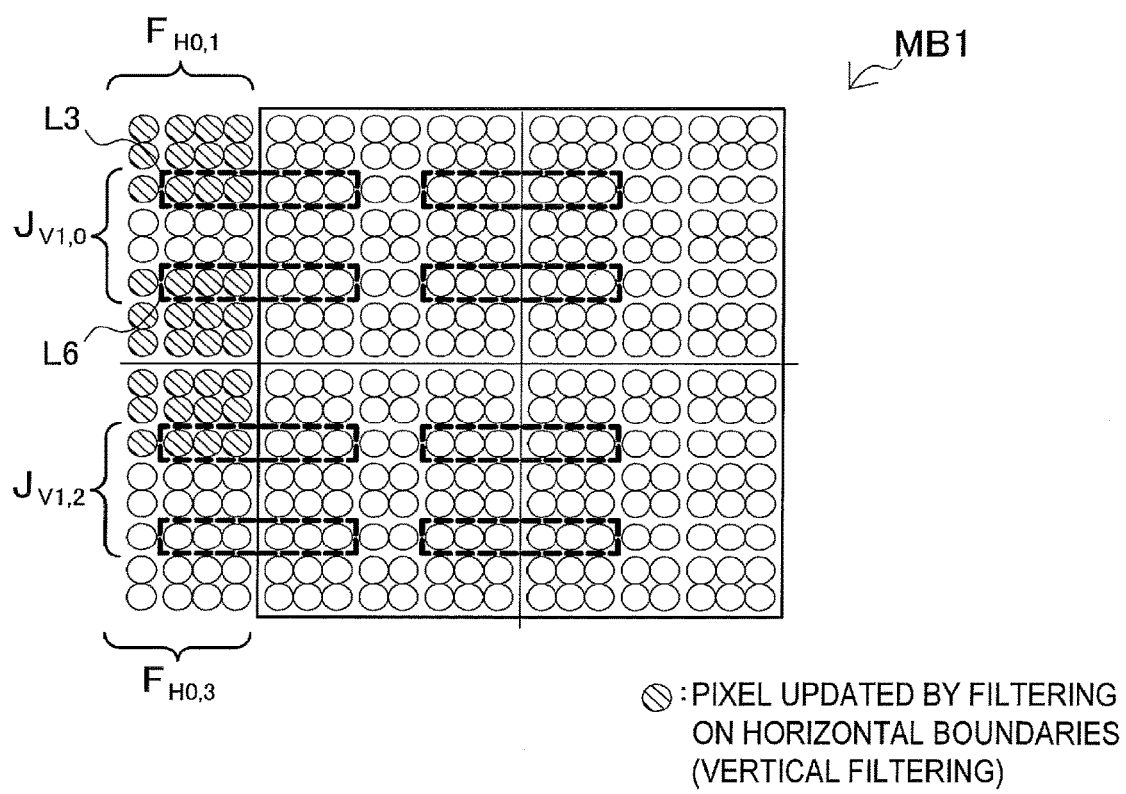
FIG. 9 is a second explanatory diagram illustrating dependency between processes according to an existing technique.

As an example, FIG. 8 shows that, within macro block MB0, filtering need determination process $J_{H0,0}$ depends on results of filtering processes $F_{V0,0}$ and $F_{V0,1}$ and filtering need determination process $J_{H0,1}$ depends on a result of filtering processes $F_{V0,1}$. Similarly, the filtering need determination processes need to be performed on vertical boundaries within a given macro block after termination of the filtering process on the horizontal boundary for the adjacent macro block. As an example, FIG. 9 shows that filtering need determination process $J_{V1,0}$ for macro block MB1 depends on results of filtering processes $F_{H0,1}$ and $F_{H0,3}$ for macro block MB0 and filtering need determination process $J_{V1,2}$ for macro block MB1 depends on a result of filtering process $F_{H0,3}$ for macro block MB0.

The existing technique involves the dependency between processes and therefore provides parallel processing of the deblocking filter to a very limited extent even if the technique proposed in JCTVC-A119 is used.

Figure 10:
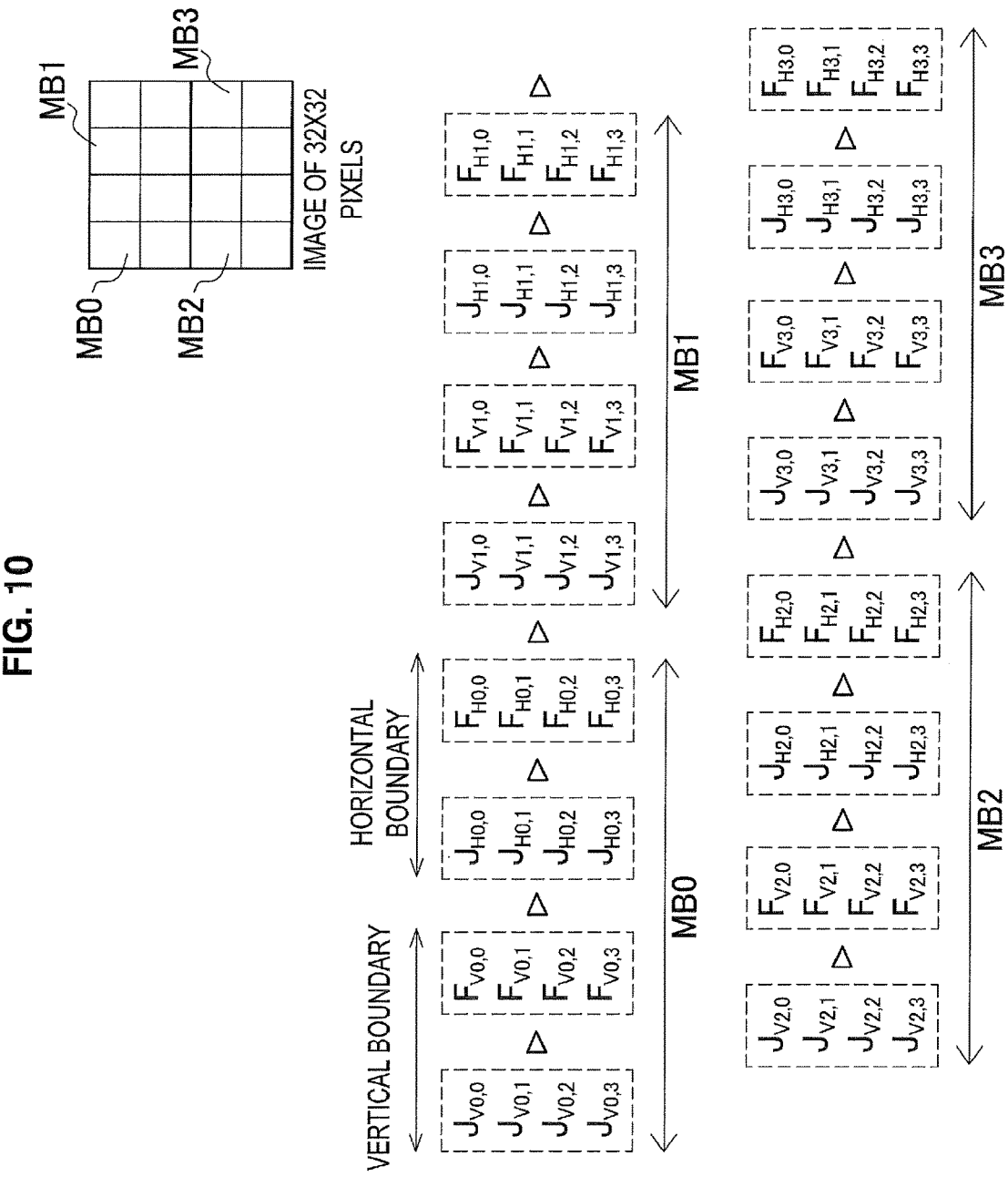
FIG. 10 is an explanatory diagram illustrating a sequence of processes according to an existing technique.

FIG. 10 is an explanatory diagram illustrating a sequence of deblocking filter processes according to an existing technique. The example assumes that the deblocking filter is supplied with an image having the size of 32×32 pixels. The input image includes four macro blocks MB0 through MB3 each having the size of 16×16 pixels.

In FIG. 10, each broken-line frame represents a process to be performed in parallel. For example, the first step performs, in parallel, filtering need determination processes $J_{V0,0}$, $J_{V0,1}$, $J_{V0,2}$ and $J_{V0,3}$ on four vertical boundaries in macro block MB0. The second step performs, in parallel, filtering processes $F_{V0, 0}$, $F_{V0,1}$, $F_{V0,2}$ and $F_{V0,3}$ on four vertical boundaries in macro block MB0. After termination of the second step, the third step performs, in parallel, filtering need determination processes $J_{H0,0}$, $J_{H0,1}$, $J_{H0,2}$ and $J_{H0,3}$ on four horizontal boundaries in macro block MB0. The fourth step performs, in parallel, filtering processes $F_{H0,0}$, $F_{H0,1}$, $F_{H0,2}$ and $F_{H0,3}$ on four horizontal boundaries in macro block MB0. After termination of the fourth step, processes (fifth to eighth steps) for macro block MB1 are performed successively. After termination of the processes on macro block MB1, processes (ninth to twelfth steps) for macro block MB2 are performed successively. After termination of the processes on macro block MB2, processes (thirteenth to sixteenth steps) for macro block MB3 are performed successively.

Such parallel processing within the limited extent cannot satisfactorily solve the problem of delay or data rate degradation due to a large processing amount when the deblocking filter is applied. Three working examples described below further improve parallel processing when the definition is applied.

<3. First Working Example>

[3-1. Deblocking Filter Configuration Example]

The following describes example configurations of the deblocking filter 24a for the image encoding device 10 shown in FIG. 1 and the deblocking filter 24b for the image decoding device 60 shown in FIG. 2 according to the first working example. The configurations of the deblocking filter 24a and the deblocking filter 24b may be common to each other. In the following description, the deblocking filter 24a and the deblocking filter 24b are generically referred to as a deblocking filter 24 when there is no need for distinction between them.

(1) Dependency Between New Processes

According to the working example, processes using the deblocking filter 24 also include two types of processes, namely, filtering need determination processes and filtering processes. However, the deblocking filter 24 uses values of a reference pixel different from the existing technique to determine whether to apply the deblocking filter to vertical boundaries and horizontal boundaries. Specifically, for the determination on vertical boundaries, the deblocking filter 24 uses a reference pixel, i.e., a pixel that is included in pixels of adjacent blocks around the vertical boundary and belongs to a row to which the deblocking filter for horizontal boundaries is not applied. For the determination on horizontal boundaries, the deblocking filter 24 uses another reference pixel, i.e., a pixel that is included in pixels of adjacent blocks around the horizontal boundary and belongs to a row to which the deblocking filter for vertical boundaries is not applied. Also in the following description, the deblocking filter 24 performs processes based on a block size of 8×8 pixels as a processing unit, for example.

Figure 11:
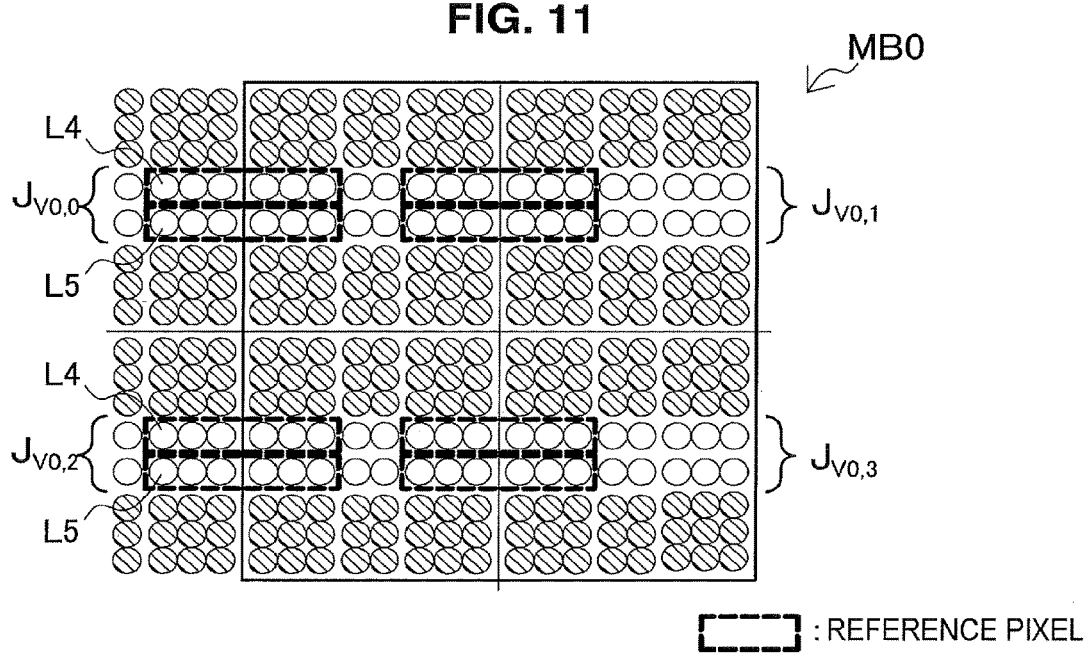
FIG. 11 is a first explanatory diagram illustrating reference pixels during filtering need determination processes according to a first working example.

FIG. 11 is an explanatory diagram illustrating reference pixels during the filtering need determination processes performed by the deblocking filter 24 on vertical boundaries. With reference to FIG. 11, macro block MB0 has the size of 16×16 pixels. The deblocking filter 24 determines whether to apply the filtering to four vertical boundaries of macro block MB0 using the reference pixel that belongs to at least one of the fourth and fifth rows (L4 and L5) of each block. The deblocking filter for horizontal boundaries is not applied to these two rows (see FIG. 9). This configuration solves the dependency between the filtering processes on horizontal boundaries and the filtering need determination processes on vertical boundaries.

Figure 12:
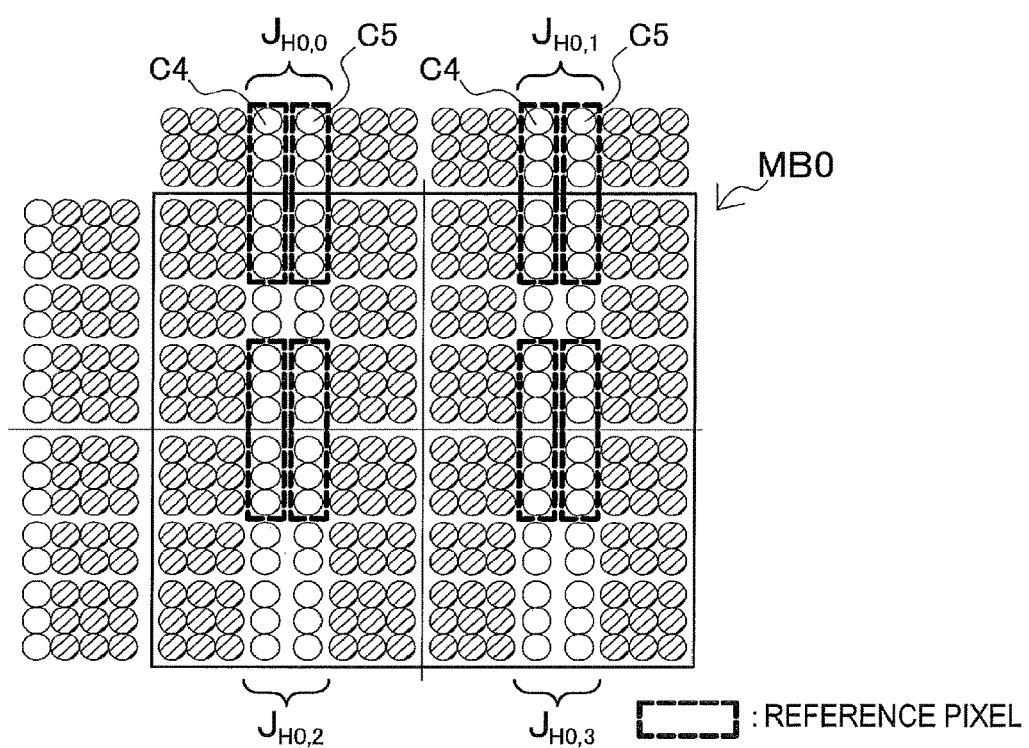
FIG. 12 is a second explanatory diagram illustrating reference pixels during the filtering need determination processes according to the first working example.

FIG. 12 is an explanatory diagram illustrating reference pixels during the filtering need determination processes performed by the deblocking filter 24 on horizontal boundaries. FIG. 12 also shows macro block MB0. The deblocking filter 24 determines whether to apply the filtering to four horizontal boundaries of macro block MB0 using the reference pixel that belongs to at least one of the fourth and fifth columns (C4 and C5) of each block. The deblocking filter for vertical boundaries is not applied to these two columns (see FIG. 7 or 8). This configuration solves the dependency between the filtering processes on vertical boundaries and the filtering need determination processes on horizontal boundaries.

Solving the dependency between processes can consequently parallelize filtering need determination processes for vertical boundaries and horizontal boundaries within one macro block. Processes can be parallelized between macro blocks. Filtering need determination processes can be performed in parallel on vertical boundaries and horizontal boundaries of all macro blocks within an input image.

Figure 13:
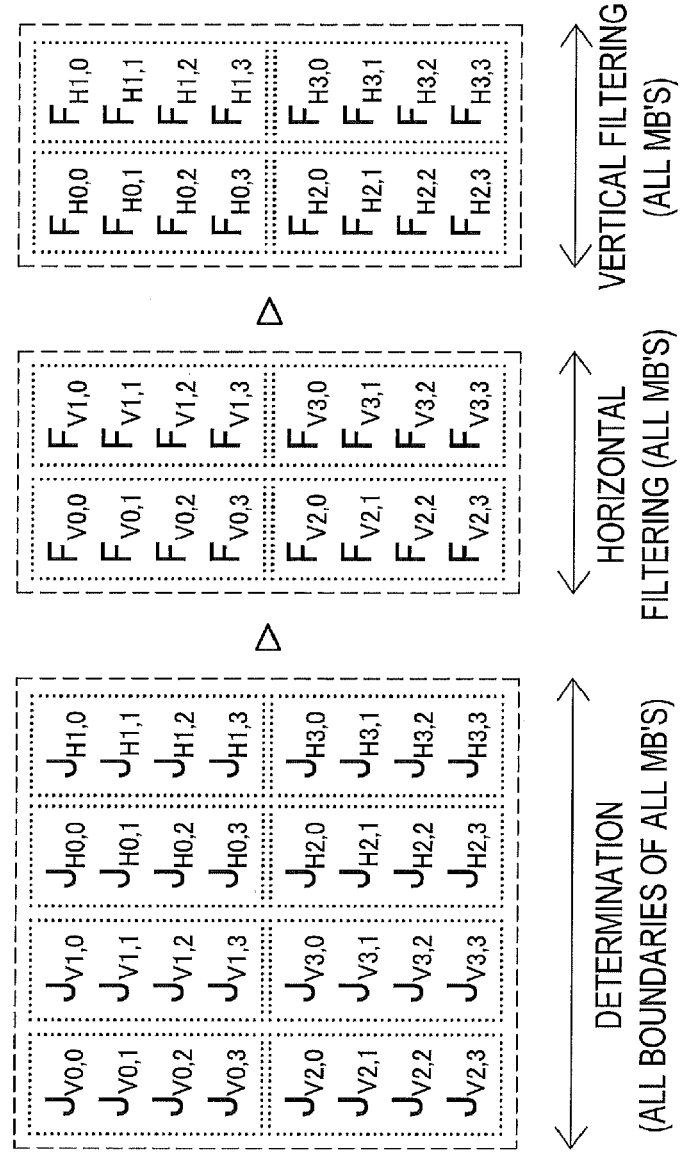
FIG. 13 is an explanatory diagram illustrating a first example of process sequence.

FIG. 13 is an explanatory diagram illustrating a first example of process sequence available on the deblocking filter 24. The example also assumes that the deblocking filter is supplied with an image having the size of 32×32 pixels. The input image includes four macro blocks MB0 through MB3 each having the size of 16×16 pixels.

In FIG. 13, each broken-line frame represents a process to be performed in parallel. While the example in FIG. 10 requires 16 process steps for a sequence of processes, the example in FIG. 13 aggregates the same number of processes into three process steps. The first step performs, in parallel, filtering need determination processes $J_{V0,0}$ through $J_{V3,3}$ and $J_{H0,0}$ through $J_{H3,3}$ on all vertical boundaries and all horizontal boundaries of all macro blocks MB0 through MB3. The second step performs, in parallel, filtering processes $F_{V0,0}$ through $F_{V3,3}$ on 16 vertical boundaries of all macro blocks MB0 through MB3. The third step performs, in parallel, filtering processes $F_{H0,0}$ through $F_{H3,3}$ on 16 horizontal boundaries of all macro blocks MB0 through MB3. The second step and the third step may be performed in the reverse order.

The example in FIG. 13 maximizes parallelism (the quantity of processes performed in parallel) based on parallel processing between macro blocks. According to the example in FIG. 14, however, the deblocking filter 24 can perform a process on each macro block.

Figure 14:
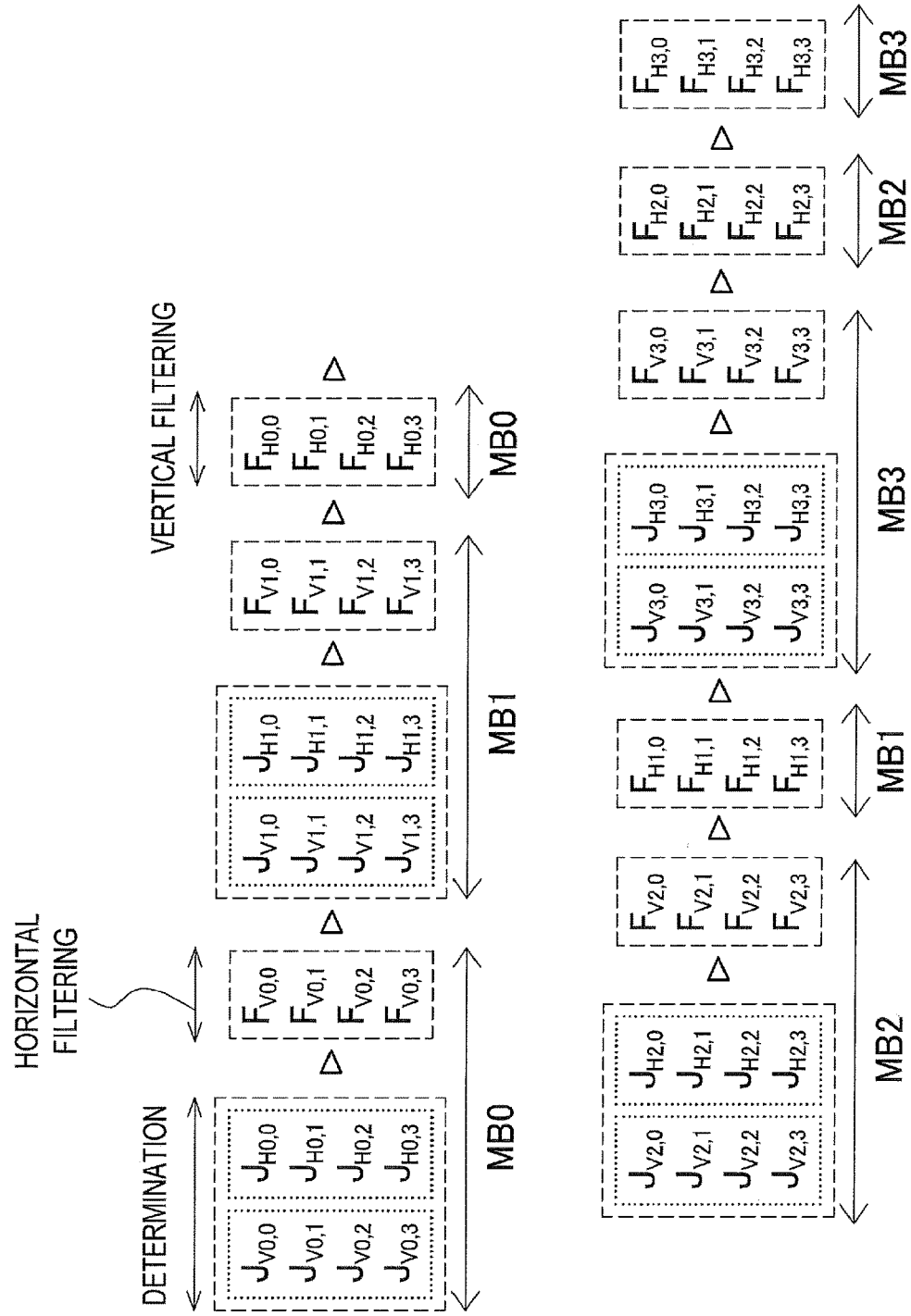
FIG. 14 is an explanatory diagram illustrating a second example of process sequence.

The example in FIG. 14 aggregates the same number of processes illustrated in FIGS. 10 and 13 into 12 process steps. The first step performs, in parallel, filtering need determination processes $J_{V0,0}$ through $J_{V0,3}$ and $J_{H0,0}$ through $J_{H0,3}$ on four vertical boundaries and four horizontal boundaries of macro block MB0. The second step performs, in parallel, filtering processes $F_{V0,0}$ through $F_{V0,3}$ on four vertical boundaries in macro block MB0. The third step performs, in parallel, filtering need determination processes $J_{V1,0}$ through $J_{V1,3}$ and $J_{H1,0}$ through $J_{H1,3}$ on four vertical boundaries and four horizontal boundaries of macro block MB1. The fourth step performs, in parallel, filtering processes $F_{V1,0}$ through $F_{V1,3}$ on four vertical boundaries in macro block MB1. The fifth step performs, in parallel, filtering processes $F_{H0,0}$ through $F_{H0,3}$ on four horizontal boundaries in macro block MB0. The sixth step performs, in parallel, filtering need determination processes $J_{V2,0}$ through $J_{V2,3}$ and $J_{H2,0}$ through $J_{H2,3}$ on four vertical boundaries and four horizontal boundaries of macro block MB2. The seventh step performs, in parallel, filtering processes $F_{V2,0}$ through $F_{V2,3}$ on four vertical boundaries in macro block MB2. The eighth step performs, in parallel, filtering processes $F_{H1,0}$ through $F_{H1,3}$ on four horizontal boundaries in macro block MB1. The ninth step performs, in parallel, filtering need determination processes $J_{V3,0}$ through $J_{V3,3}$ and $J_{H3,0}$ through $J_{H3,3}$ on four vertical boundaries and four horizontal boundaries of macro block MB3. The tenth step performs, in parallel, filtering processes $F_{V3,0}$ through $F_{V3,3}$ on four vertical boundaries in macro block MB3. The eleventh step performs, in parallel, filtering processes $F_{H2,0}$ through $F_{H2,3}$ on four horizontal boundaries in macro block MB2. The twelfth step performs, in parallel, filtering processes $F_{H3,0}$ through $F_{H3,3}$ on four horizontal boundaries in macro block MB3. In this case, the deblocking filter 24 can perform a process on the entire input image using process steps fewer than those of the existing technique while the parallelism is lower than the example in FIG. 13

(2) Basic Configuration of Deblocking Filter

Figure 15:
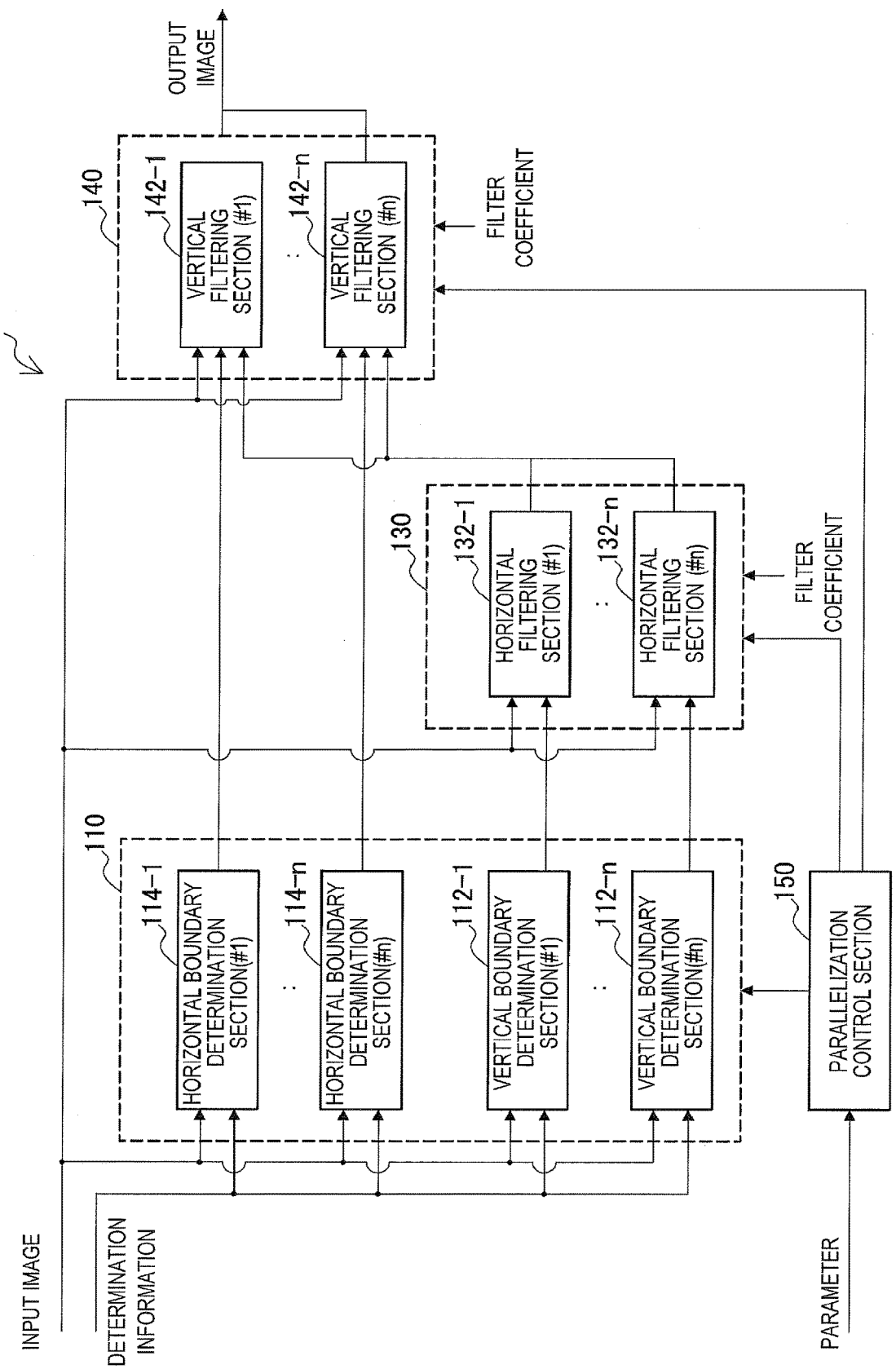
FIG. 15 is a block diagram illustrating a detailed configuration of a deblocking filter according to the first working example.

FIG. 15 is a block diagram illustrating a detailed configuration of the deblocking filter 24 according to the first working example for performing the above-described parallel processes. With reference to FIG. 15, the deblocking filter 24 includes a determination block 110, a horizontal filtering block 130, a vertical filtering block 140, and a parallelization control section 150.

(2-1) Determination block

The determination block 110 includes vertical boundary determination sections 112-1 through 112-$n$ and horizontal boundary determination sections 114-1 through 114-$n$. The vertical boundary determination sections 112 and the horizontal boundary determination sections 114 are supplied with images input to the deblocking filter 24 and determination information used to determine the necessity of filtering.

The vertical boundary determination sections 112 determine whether to apply the deblocking filter to vertical boundaries using pixel values of reference pixels belonging to a row to which the deblocking filter for horizontal boundaries is not applied as illustrated in FIG. 11. In this example, a pixel value of the reference pixel is input to the deblocking filter 24. The vertical boundary determination sections 112 output, to the horizontal filtering block 130, information indicating a determination result about each vertical boundary (for example, binary information of which value "1" indicates a determination result that the deblocking filter needs to be applied).

The horizontal boundary determination sections 114 determine whether to apply the deblocking filter to horizontal boundaries using pixel values of reference pixels belonging to a row to which the deblocking filter for vertical boundaries is not applied as illustrated in FIG. 12. In this example, a pixel value of the reference pixel is also input to the deblocking filter 24. The determination process performed by each of the horizontal boundary determination sections 114 is performed in parallel to the determination process performed by each of the vertical boundary determination sections 112. The horizontal boundary determination sections 114 output, to the vertical filtering block 140, information indicating a determination result about each horizontal boundary.

Figure 16:
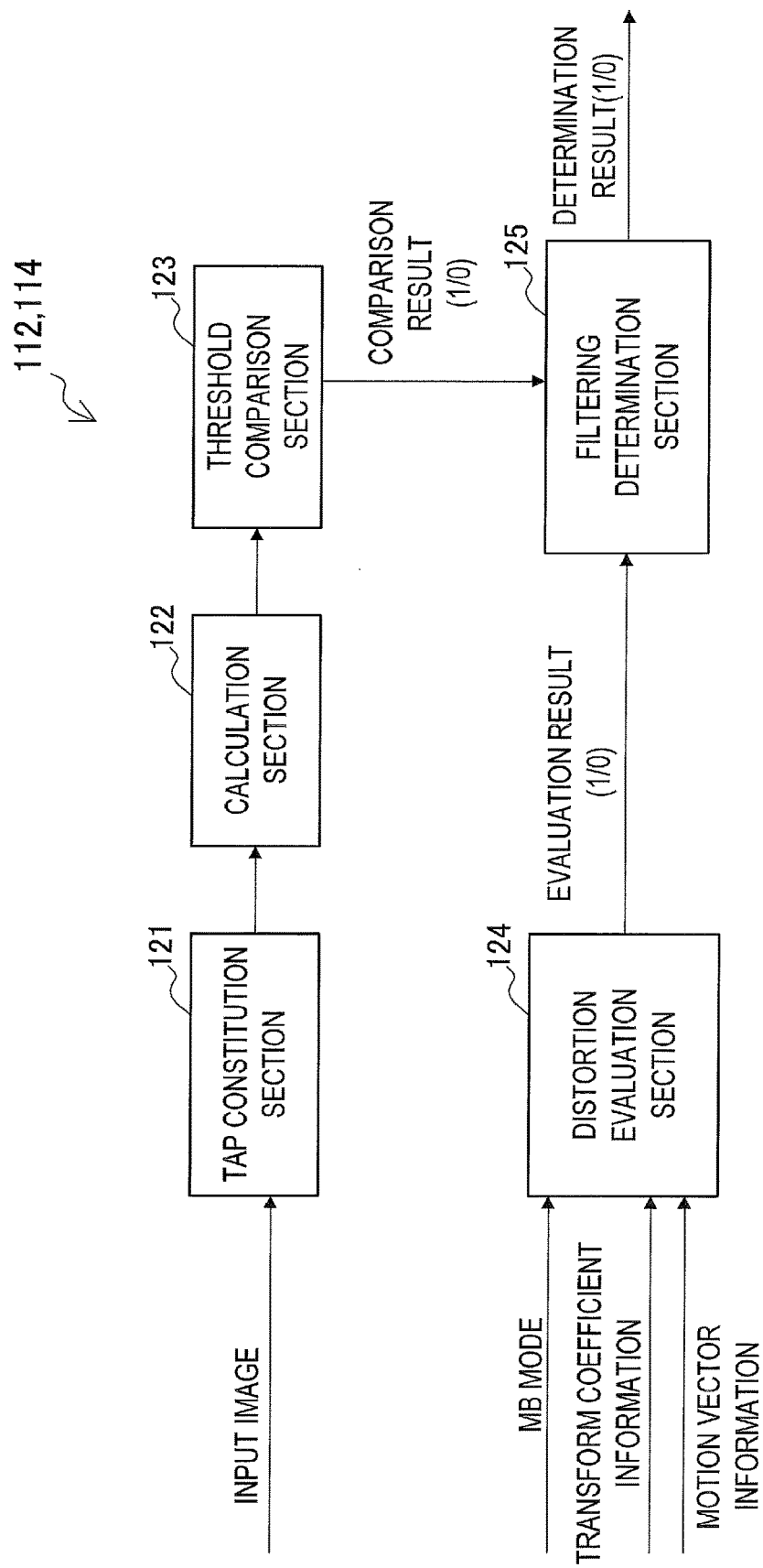
FIG. 16 is a block diagram illustrating a detailed configuration of a determination section.

FIG. 16 is a block diagram illustrating a detailed configuration of each of the vertical boundary determination sections 112 and the horizontal boundary determination sections 114. With reference to FIG. 16, each determination section includes a tap constitution section 121, a calculation section 122, a threshold comparison section 123, a distortion evaluation section 124, and a filtering determination section 125.

The tap constitution section 121 acquires a reference pixel value from pixel values of two neighboring blocks around a focused boundary in the input image and constitutes a tap (a set of reference pixel values) for determining determination condition B for the above-described luma component. For example, a vertical boundary may be focused in the blocks each of which has the size of 8×8 pixels. In this case, the tap constitution section 121 constitutes a tap from a pixel value belonging to the fourth and/or fifth rows of two blocks at the right and left. If a horizontal boundary is focused, the tap constitution section 121 constitutes a tap from a pixel value belonging to the fourth and/or fifth columns of two blocks at the top and bottom. The calculation section 122 assigns the tap constituted by the tap constitution section 121 to the left-hand side of the determination expression in determination condition B and calculates an edge value to be compared with edge determination threshold value β. The threshold comparison section 123 compares the value calculated by the calculation section 122 with edge determination threshold value β and outputs a comparison result to the filtering determination section 125.

The distortion evaluation section 124 evaluates determination condition A of the above-described luma component using mode information (MB mode), transform coefficient information, and motion vector information supplied as the determination information. The distortion evaluation section 124 outputs an evaluation result to the filtering determination section 125. The distortion evaluation section 124 evaluates only determination condition A1 of a chroma component based on the mode information.

The filtering determination section 125 determines whether to apply the deblocking filter to a focused boundary based on a comparison result of determination condition B supplied from the threshold comparison section 123 and an evaluation result of determination condition A supplied from the distortion evaluation section 124. The filtering determination section 125 outputs information indicating the determination result.

(2-2) Horizontal Filtering Block

Returning back to FIG. 15, the configuration of the deblocking filter 24 will be described further. The horizontal filtering block 130 includes horizontal filtering sections 132-1 through 132-$n$. The horizontal filtering sections 132 are supplied with an input image and a determination result concerning each vertical boundary from the determination block 110.

The horizontal filtering sections 132 apply the deblocking filter for vertical boundaries to right and left pixels around the corresponding vertical boundary if the determination result from the vertical boundary determination section 112 indicates that the filter needs to be applied. The horizontal filtering sections 132 output, to the vertical filtering block 140, a pixel value after the filtering in terms of the filtered pixel or a pixel value of the input image in terms of the other pixels.

(2-3) Vertical Filtering Block

The vertical filtering block 140 includes vertical filtering sections 142-1 through 142-$n$. The vertical filtering sections 142 are supplied with an input image and a determination result concerning each horizontal boundary from the determination block 110.

The vertical filtering sections 142 apply the deblocking filter for horizontal boundaries to top and bottom pixels around the corresponding horizontal boundary if the determination result from the horizontal boundary determination section 114 indicates that the filter needs to be applied. The vertical filtering sections 142 output a pixel value after the filtering in terms of the filtered pixel or a pixel value supplied from the horizontal filtering block 130 in terms of the other pixels. An output from each of the vertical filtering sections 142 may be contained in an output image from the deblocking filter 24.

(2-4) Parallelization Control Section

The parallelization control section 150 controls the parallelism of filtering need determination processes in the determination block 110 and the parallelism of filtering processes in the horizontal filtering block 130 and the vertical filtering block 140.

For example, the parallelization control section 150 may control the parallelism of processes for each block based on an input image size. More specifically, the parallelization control section 150 increases the parallelism of processes for each block if the input image size is relatively large. This can adaptively prevent delay or data rate degradation due to a processing amount that increases according to image sizes. For example, the parallelization control section 150 may control the parallelism of processes for each block based on a sequence parameter set, a picture parameter set, or parameters contained in the slice header. This enables to flexibly configure the parallelism according to requirements of users who develop apparatuses. For example the parallelism may be configured according to restrictions on the installation environment such as the number of processor cores or the number of software threads.

The working example can parallelize processes between macro blocks.

This signifies that any sequence of processes on blocks within an image has no effect on a finally output result. Accordingly, the parallelization control section 150 can control a sequence of filtering need determination processes in the determination block 110 and a sequence of filtering processes in the horizontal filtering block 130 and the vertical filtering block 140 on a block basis.

More specifically, the parallelization control section 150 may control a sequence of filtering processes according to the dependency of the filtering processes between macro blocks. According to an existing technique, for example, the dependency of processes between neighboring macro blocks around a slice boundary may delay parallel processes on each slice within an image. However, the parallelization control section 150 according to the working example can perform filtering processes on neighboring macro blocks around the slice boundary prior to the other macro blocks.

Figure 17:
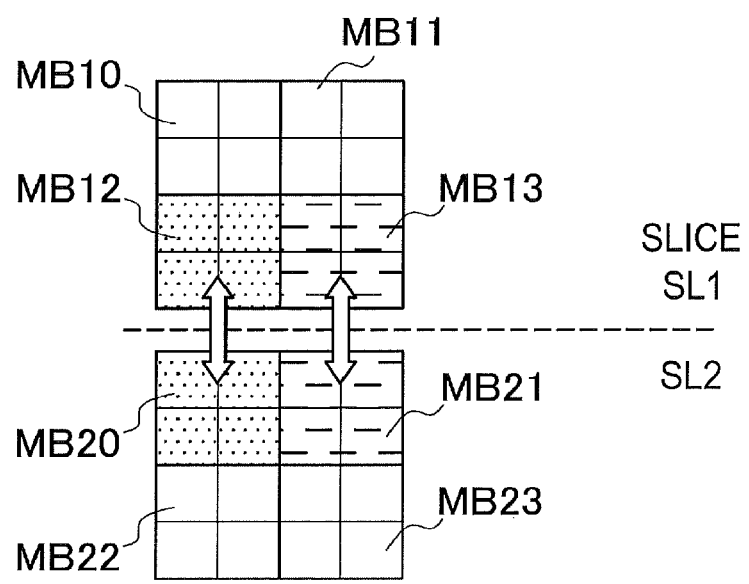
FIG. 17 is an explanatory diagram illustrating neighboring blocks around a slice boundary.

For example, FIG. 17 illustrates eight macro blocks MB10 through MB13 and MB20 through MB23 around a slice boundary. Macro blocks MB10 through MB13 belong to slice SL1. Macro blocks MB20 through MB23 belong to slice SL2. Concerning these macro blocks, the filtering processes for horizontal boundaries on macro block MB20 in slice SL2 depend on the filtering processes for vertical boundaries on macro block MB12 in slice SL1. Similarly, the filtering processes for horizontal boundaries on macro block MB21 in slice SL2 depend on the filtering processes for vertical boundaries on macro block MB13 in slice SL1.

Figure 18:
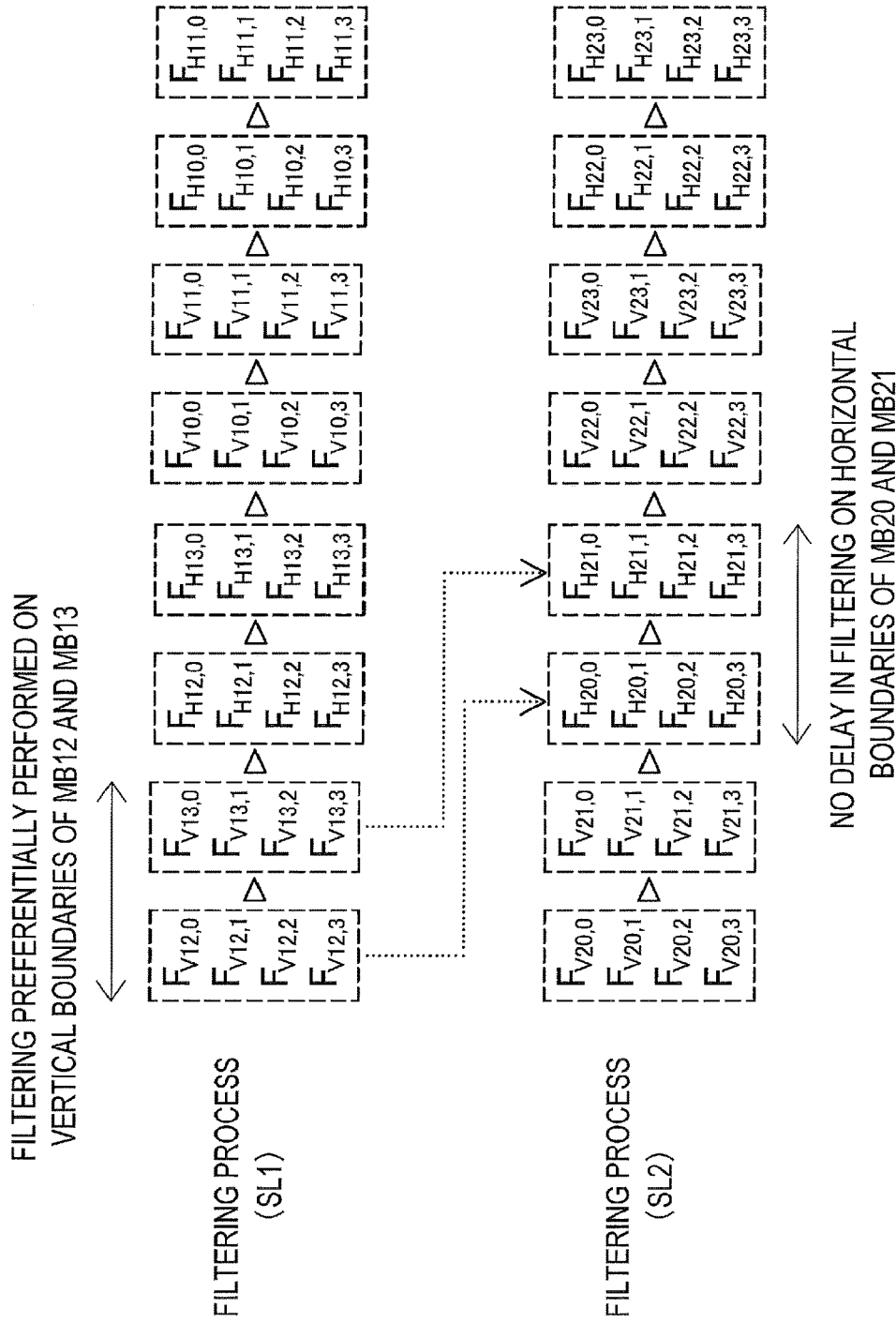
FIG. 18 is an explanatory diagram illustrating a first example of a sequence of processes for each slice.
Figure 19:
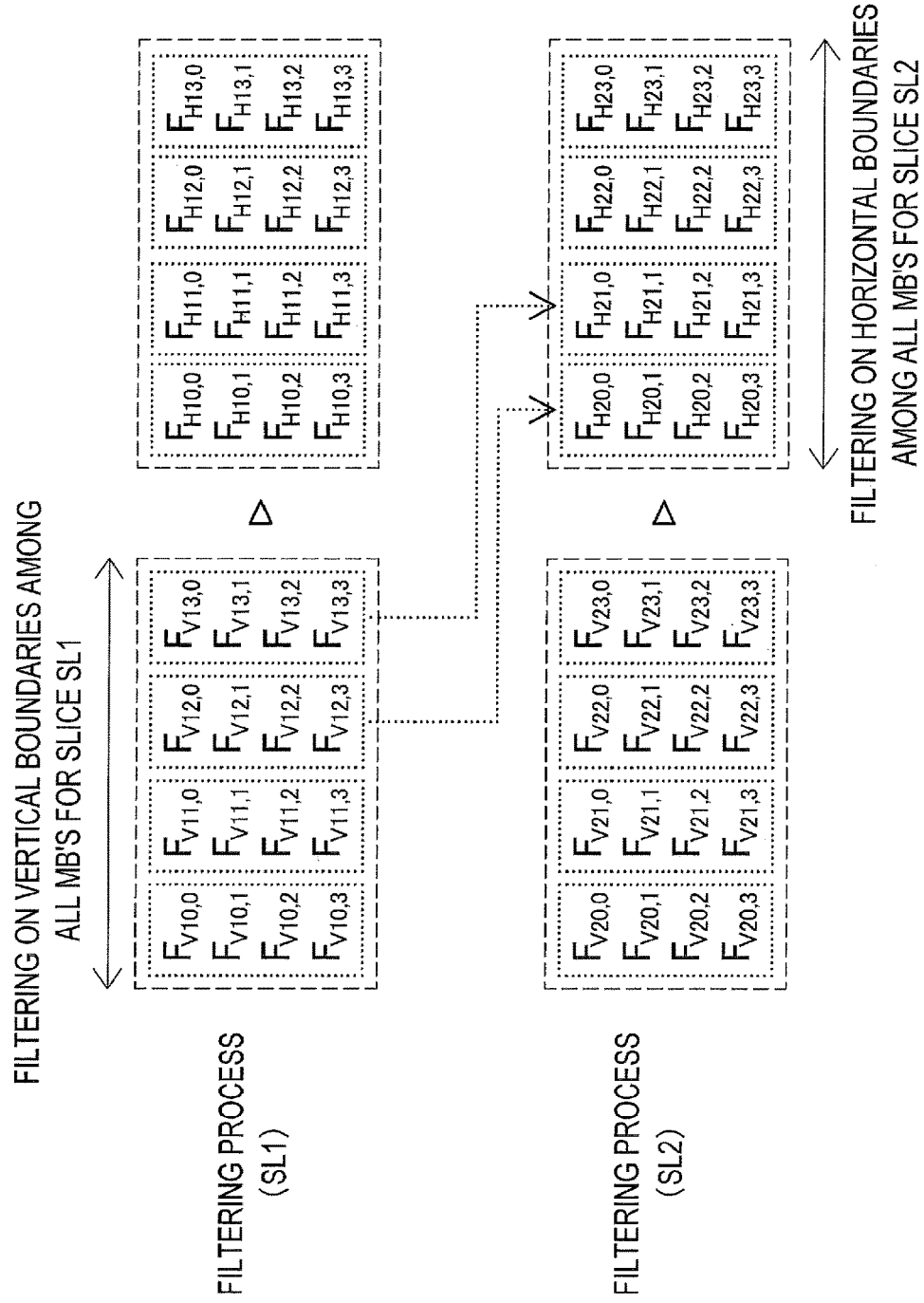
FIG. 19 is an explanatory diagram illustrating a second example of a sequence of processes for each slice.

According to an example in FIG. 18 under these conditions, the parallelization control section 150 performs filtering processes on the vertical boundaries of macro blocks MB12 and MB13 out of filtering processes for slice SL1 in preference to processes on the other boundaries. The result is to prevent a large delay from occurring in filtering processes on the horizontal boundaries of macro blocks MB20 and MB21 out of filtering processes for slice SL2. An example in FIG. 19 initially performs filtering processes in parallel on vertical boundaries for all macro blocks included in slice SL1. Also in this case, no delay occurs in the filtering process on the horizontal boundaries of macro blocks MB20 and MB21 in slice SL2.

[3-2. Process Flow]

Figure 20:
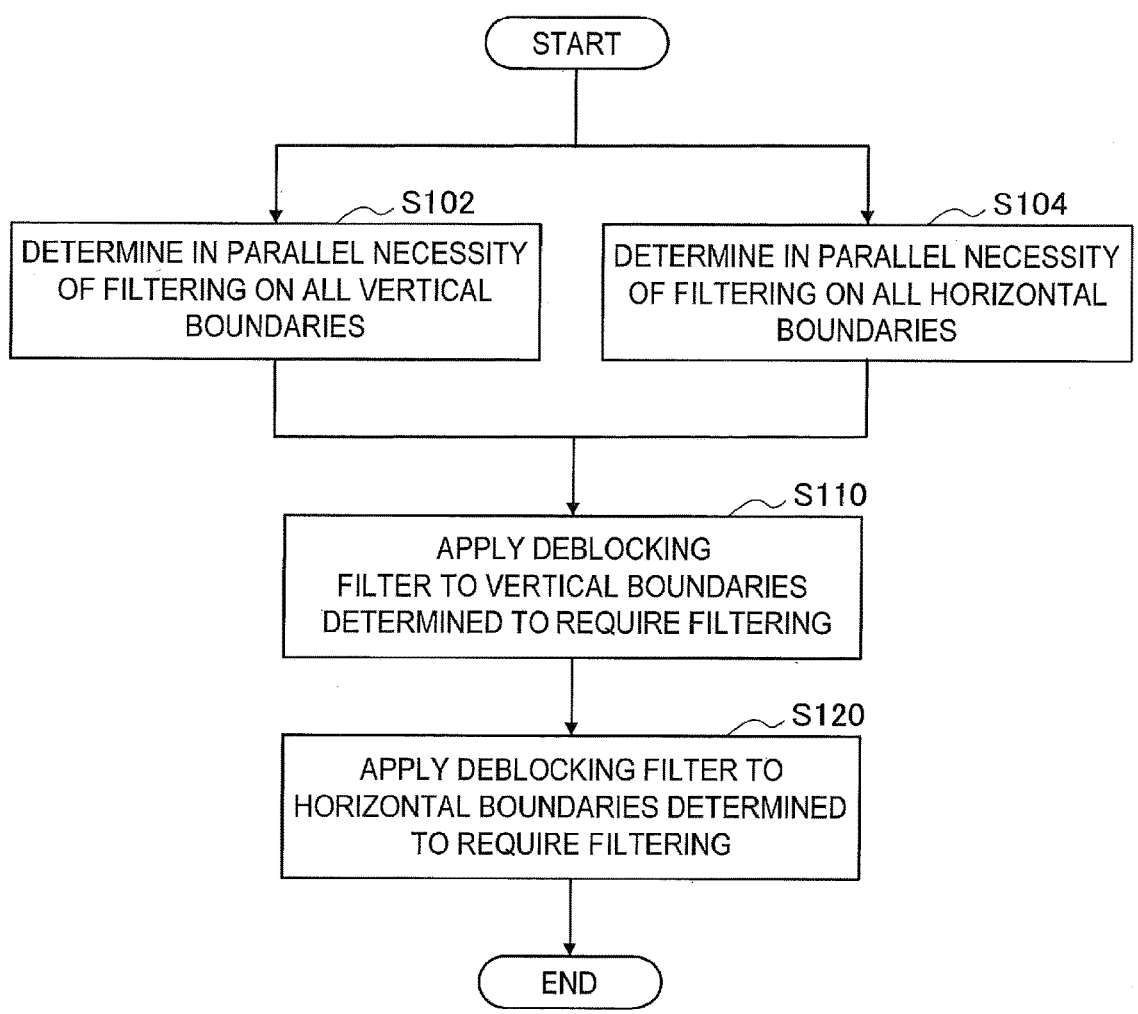
FIG. 20 is a flowchart illustrating a first example of a process flow for the deblocking filter according to an embodiment.
Figure 21:
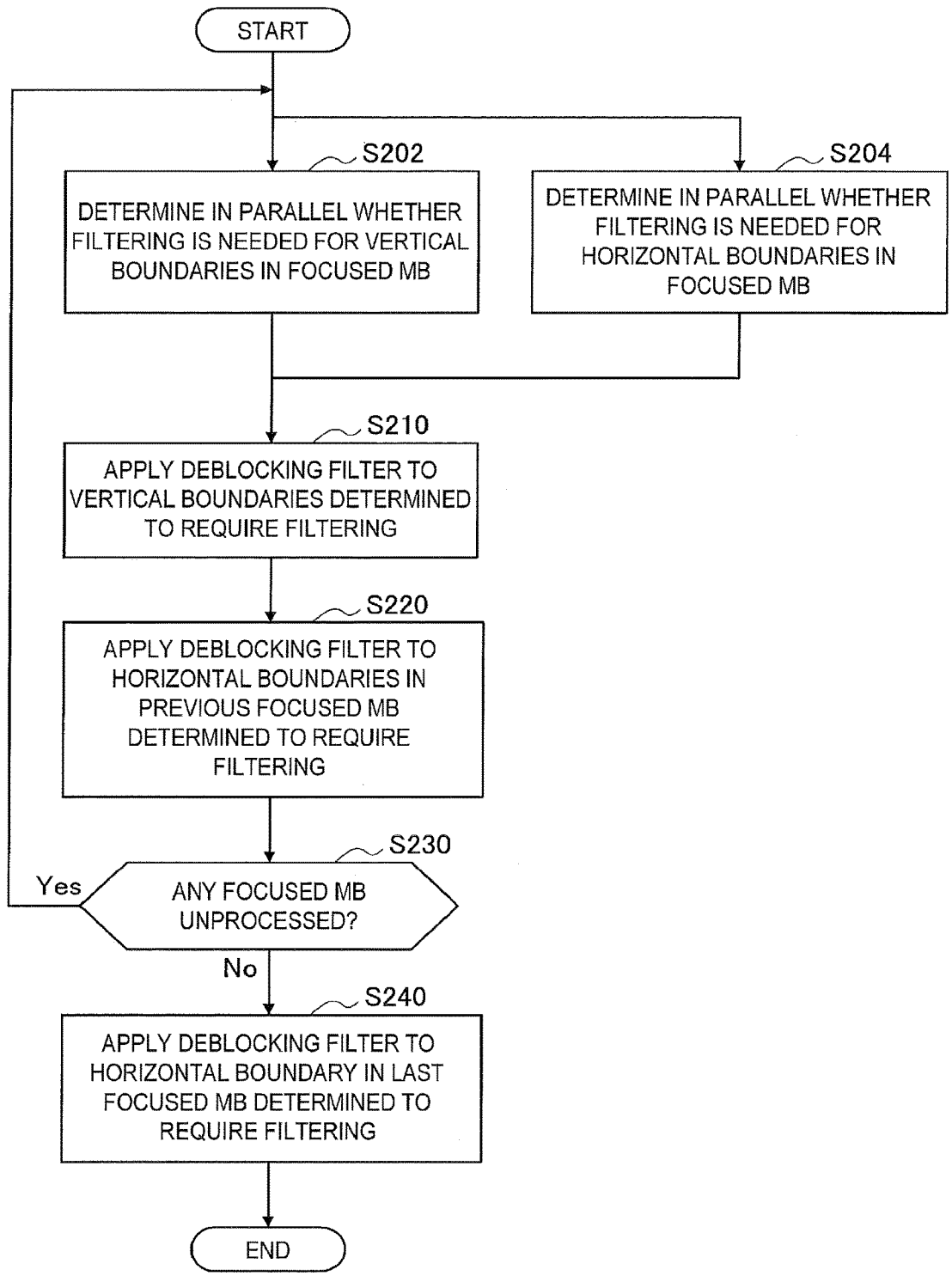
FIG. 21 is a flowchart illustrating a second example of a process flow for the deblocking filter according to an embodiment.
Figure 22:
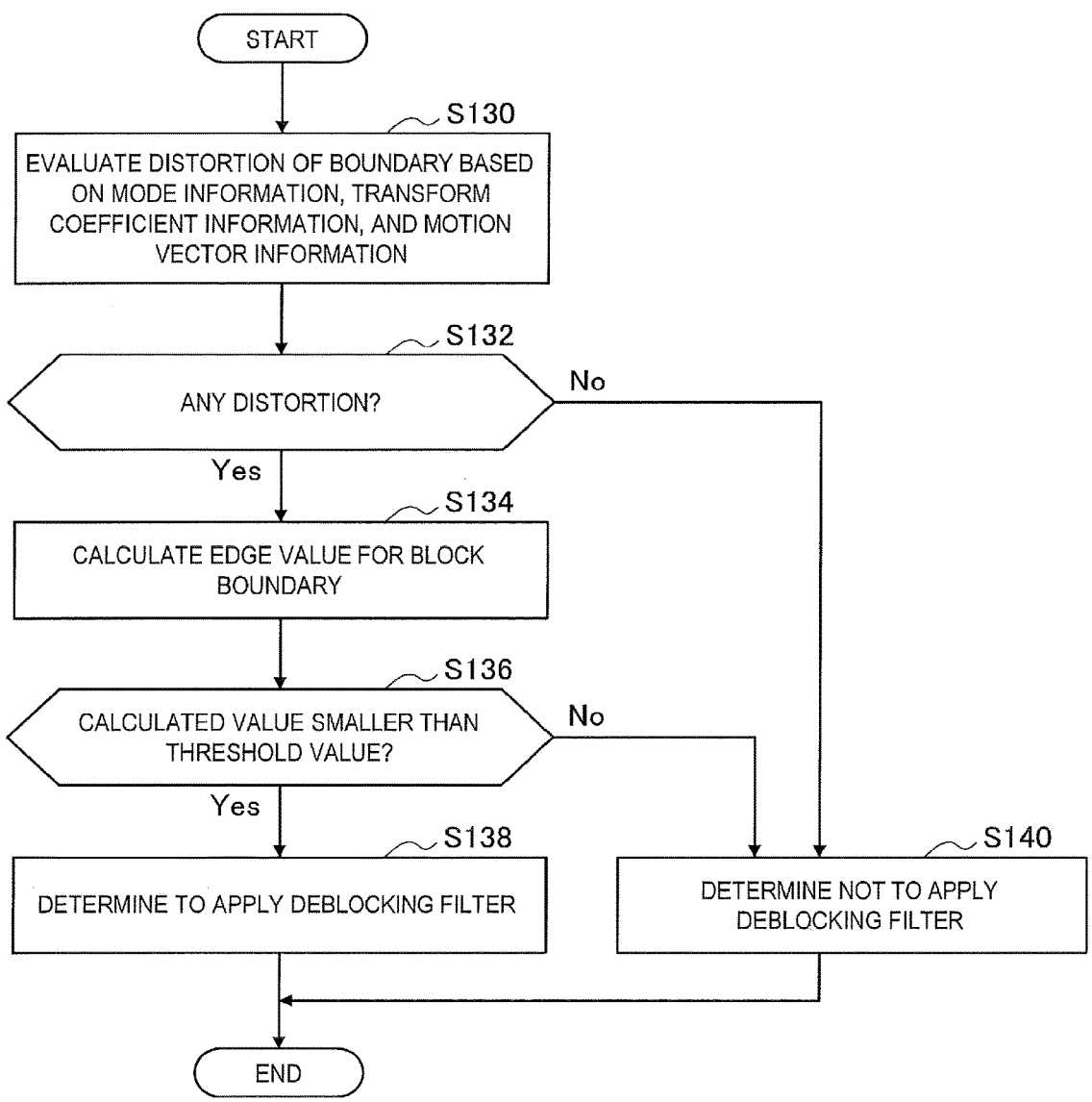
FIG. 22 is a flowchart illustrating a flow of filtering need determination processes according to an embodiment.

With reference to FIGS. 20 through 22, a process flow for the deblocking filter 24 will be described.

(1) First Scenario

FIG. 20 is a flowchart illustrating a process flow example for the deblocking filter 24 according to the first scenario. The first scenario corresponds to the example of large parallelism as shown in FIG. 13.

With reference to FIG. 20, the vertical boundary determination sections 112-1 through 112-$n$ determine in parallel whether filtering is needed for all vertical boundaries included in macro blocks within an input image (step S102). The horizontal boundary determination sections 114-1 through 114-$n$ determine in parallel whether filtering is needed for all horizontal boundaries included in macro blocks within an input image (step S104). Steps S102 and S104 are also performed in parallel.

The horizontal filtering sections 132-1 through 132-$n$ apply the deblocking filter in parallel to all vertical boundaries determined at step S102 to require the deblocking filter to be applied (step S110). The vertical filtering sections 142-1 through 142-$n$ apply the deblocking filter in parallel to all horizontal boundaries determined at step S104 to require the deblocking filter to be applied (step S120).

(2) Second Scenario

FIG. 21 is a flowchart illustrating a process flow example for the deblocking filter 24 according to the second scenario. The second scenario corresponds to the example of smaller parallelism as shown in FIG. 14.

With reference to FIG. 21, the vertical boundary determination sections 112-1 through 112-$n$ determine in parallel whether filtering is needed for all vertical boundaries included in a focused macro block within an input image (step S202). The horizontal boundary determination sections 114-1 through 114-$n$ determine in parallel whether filtering is needed for all horizontal boundaries included in the focused macro block (step S204). Steps S202 and S204 are also performed in parallel.

The horizontal filtering sections 132-1 through 132-$n$ apply the deblocking filter in parallel to vertical boundaries in the focused macro block determined at step S202 to require the deblocking filter to be applied (step S210).

The process at step S220 aims at a focused macro block in the most recent loop. The process at step S220 may be skipped for the first focused macro block. The vertical filtering sections 142-1 through 142-$n$ apply the deblocking filter in parallel to horizontal boundaries determined, at step S204 in the most recent loop, to require the deblocking filter to be applied (step S220).

The process at steps S202 through S220 is repeated for a newly focused macro block if focused macro blocks remain unprocessed in the input image (step S230).

If there remains no focused macro block unprocessed, the vertical filtering sections 142-1 through 142-$n$ apply the deblocking filter in parallel to horizontal boundaries determined to require the deblocking filter to be applied in the focused macro block for the last loop (step S240). The process then terminates.

While there have been described the two typical scenarios to parallelize processes in units of images and macro blocks, the two scenarios are mere examples for the description. Processes of the deblocking filter 24 may be parallelized in various units such as a given number of macro blocks (two or four macro blocks) or a group of horizontally or vertically placed blocks, for example.

(3) Filtering need determination processes

FIG. 22 is a flowchart illustrating a flow of filtering need determination processes corresponding to steps S102 and S104 in FIG. 20 and steps S202 and S204 in FIG. 21.

With reference to FIG. 22, the distortion evaluation section 124 evaluates distortion of each boundary based on the mode information, the transform coefficient information, and the motion vector information (step S130). The process proceeds to step S134 if the evaluation results in the presence of distortion (determination condition A is true). The process proceeds to step S140 if the evaluation results in the absence of distortion (step S132).

At step S134, the calculation section 122 calculates an edge value based on a reference pixel tap constituted by the tap constitution section 121 (step S134). The threshold comparison section 123 compares the calculated value with edge determination threshold value β (step S136). The process proceeds to step S138 if the edge value is smaller than threshold value β (determination condition B is true). The process proceeds to step S140 if the edge value is not smaller than threshold value β.

At step S138, the filtering determination section 125 determines to apply the deblocking filter to a boundary to be determined (step S138). At step S140, the filtering determination section 125 determines not to apply the deblocking filter to a boundary to be determined (step S140).

<4. Second Working Example>

The first working example performs the filtering need determination process on a given block using the pixel value of a pixel not updated by the filtering processes on the other blocks. By contrast, the second working example described below provides memory to store pixel values input to the deblocking filter and thereby enables to eliminate restrictions on the filtering need determination processes and use more versatile determination conditions.

[4-1. Deblocking Filter Configuration Example]

(1) Description of Sections

Figure 23:
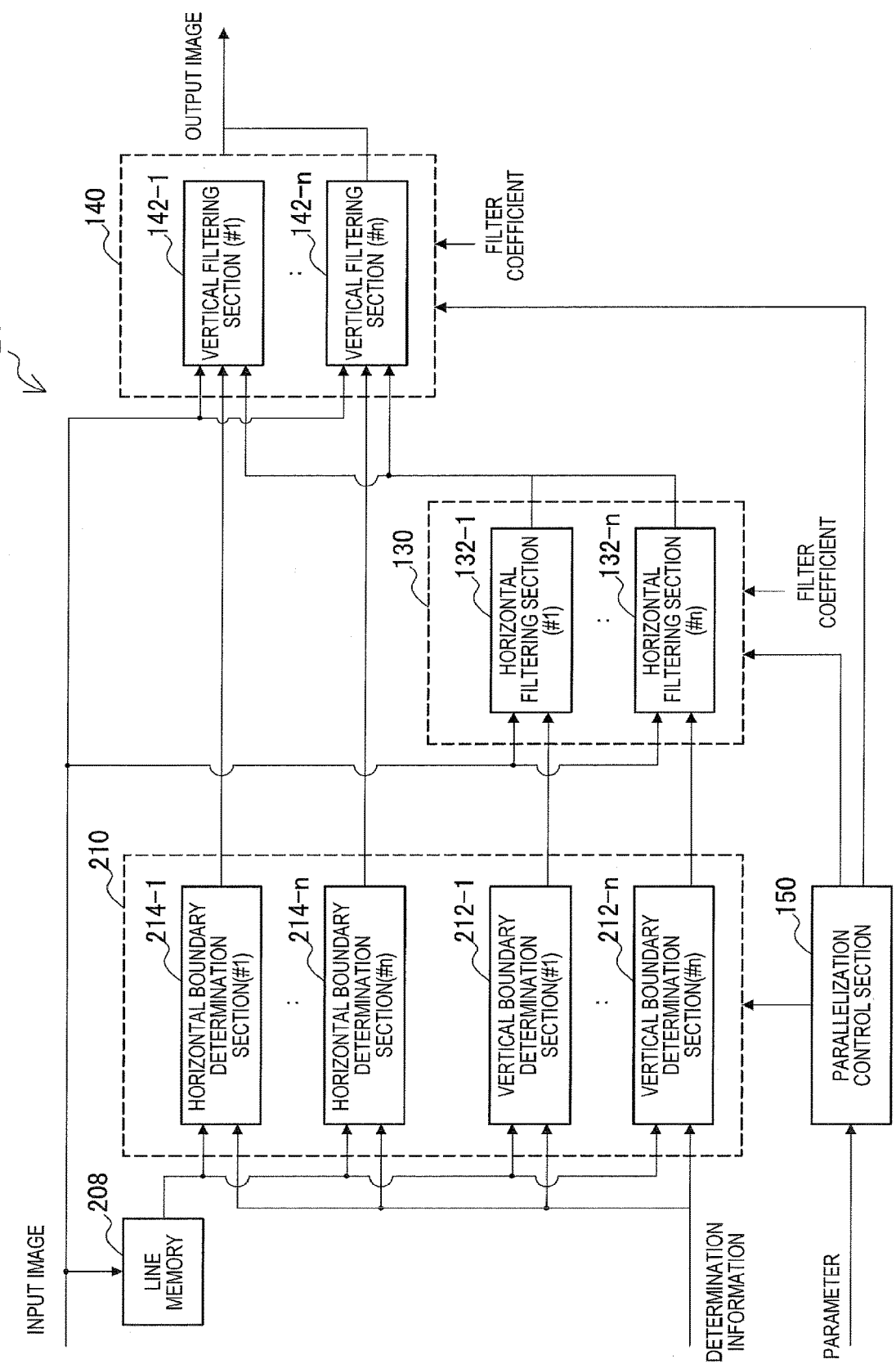
FIG. 23 is a block diagram illustrating a detailed configuration of the deblocking filter according to a second working example.

FIG. 23 is a block diagram illustrating a detailed configuration of the deblocking filter 24 according to the second working example. With reference to FIG. 23, the deblocking filter 24 includes line memory 208, a determination block 210, the horizontal filtering block 130, the vertical filtering block 140, and the parallelization control section 150.

The line memory 208 stores pixel values for an input image supplied to the deblocking filter 24. Filtering processes in the horizontal filtering block 130 and the vertical filtering block 140 do not update pixel values stored in the line memory 208. Filtering need determination processes performed by sections described below in the determination block 210 reference pixel values stored in the line memory 208. The apparatus includes another memory for purposes different from processes of the deblocking filter 24. This memory may be reused (shared) as the line memory 208.

The determination block 210 includes vertical boundary determination sections 212-1 through 212-$n$ and horizontal boundary determination sections 214-1 through 214-$n$. The vertical boundary determination sections 212 and the horizontal boundary determination sections 214 are supplied with pixel values stored in the line memory 208 for an image input to the deblocking filter 24 and determination information used to determine the need for filtering.

The vertical boundary determination sections 212 use pixel values input to the deblocking filter 24 to determine whether to apply the deblocking filter to each vertical boundary. The vertical boundary determination sections 212 output, to the horizontal filtering block 130, information indicating a determination result about each vertical boundary.

The horizontal boundary determination sections 214 also use pixel values input to the deblocking filter 24 to determine whether to apply the deblocking filter to each horizontal boundary. The horizontal boundary determination sections 214 perform determination processes in parallel to determination processes performed by the vertical boundary determination sections 212. The horizontal boundary determination sections 214 output, to the vertical filtering block 140, information indicating a determination result about each horizontal boundary.

(2) Versatile Determination Conditions

Similarly to the existing technique as shown in FIG. 4, the vertical boundary determination sections 212 according to the working example may reference pixels on the third and sixth rows of a block to determine the necessity of filtering on a vertical boundary of each block. In this case, however, pixel values to be referenced are stored in the line memory 208 and are attributed to an image input to the deblocking filter 24. Similarly, the horizontal boundary determination sections 214 may reference pixels on the third and sixth rows of a block to determine the necessity of filtering on a horizontal boundary of each block. In this case, the configuration according to the working example can be easily provided without changing determination conditions for the filtering need determination processes installed on an existing apparatus.

Figure 24:
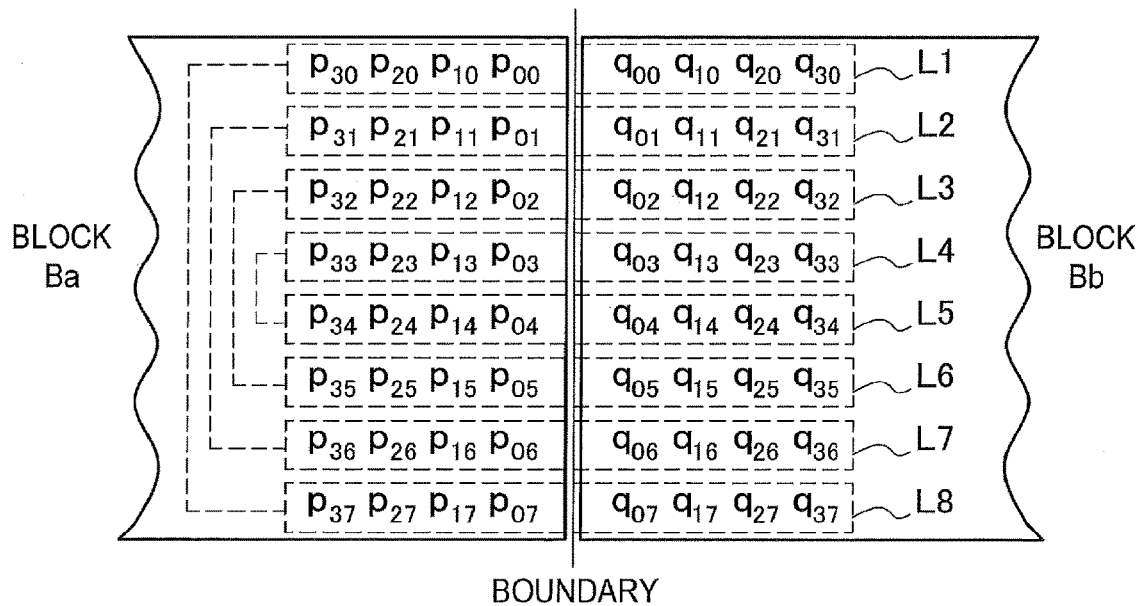
FIG. 24 is an explanatory diagram illustrating first and second examples of a determination technique provided by the second working example.
Figure 25:
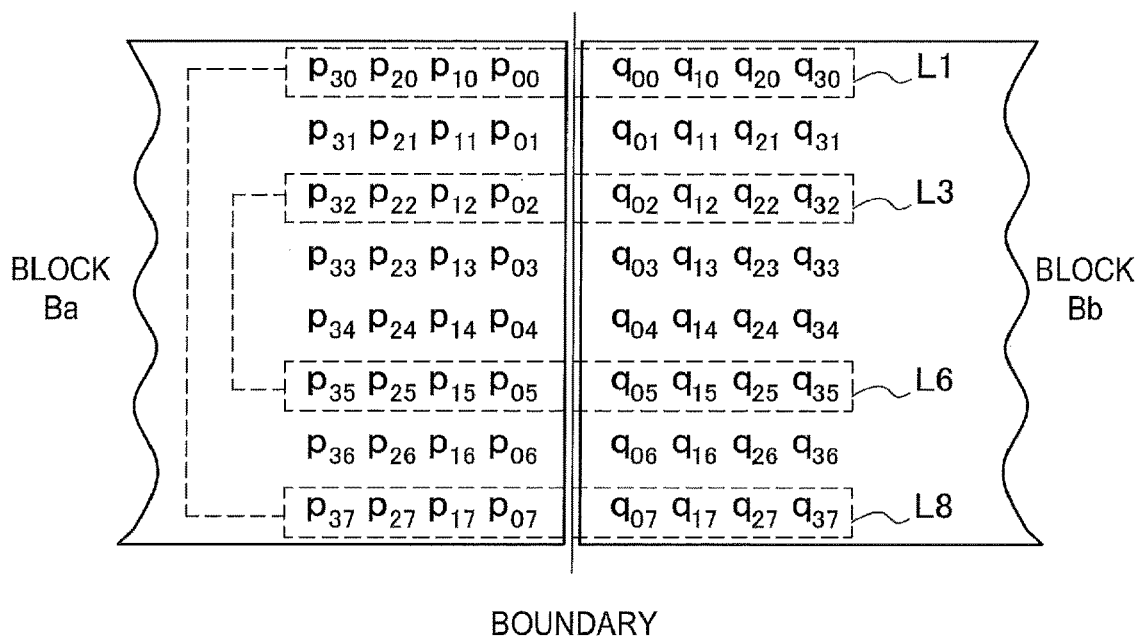
FIG. 25 is an explanatory diagram illustrating third and fourth examples of the determination technique provided by the second working example.
Figure 26:
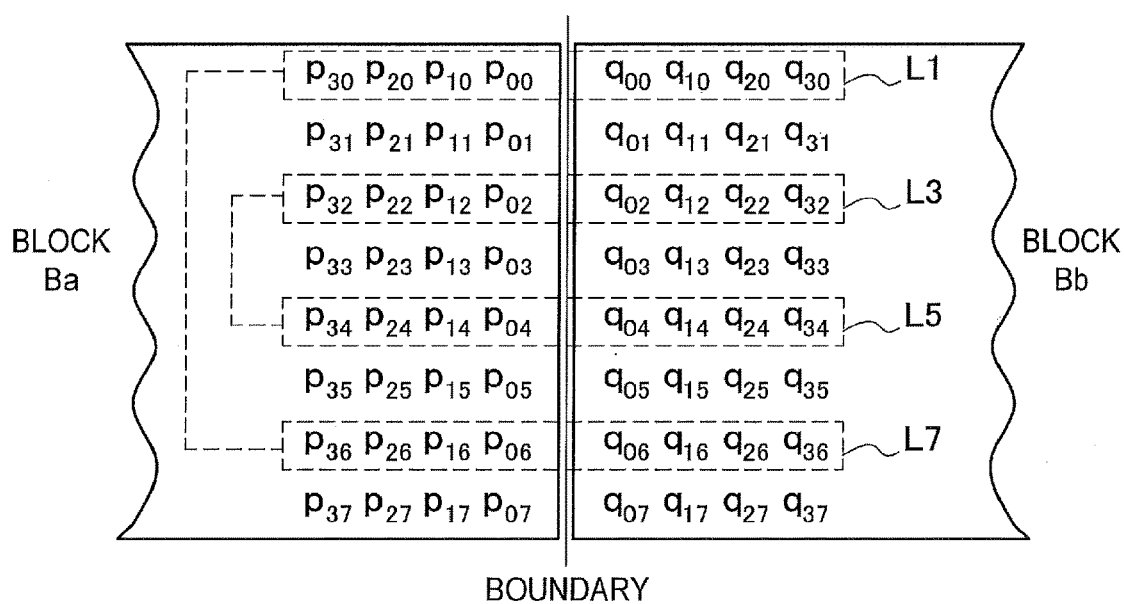
FIG. 26 is an explanatory diagram illustrating fifth and sixth examples of the determination technique provided by the second working example.

The vertical boundary determination sections 212 may reference pixels of three or more rows in a block during the determination. Similarly, the horizontal boundary determination sections 214 may reference pixels of three or more columns in a block during the determination. The vertical boundary determination sections 212 and the horizontal boundary determination sections 214 may use determination condition expressions different from the existing technique. With reference to FIGS. 24 through 26, the following describes six examples of the determination technique according to the working example.

(2-1) First Example

FIG. 24 is an explanatory diagram illustrating first and second examples of the determination technique. In the first and second examples, the filtering need determination processes (particularly the determination using determination condition B for luma components) for vertical boundaries references pixels of all rows L1 through L8 from the first to the eighth in each block. The filtering need determination processes for horizontal boundaries also references pixels of all columns from the first to the eighth in each block.

The first example may define determination conditions for luma components as follows.

Determination condition of luma component (Luma) . . .
The deblocking filter is applied if conditions A and B are both true.

Condition A:
(A1) Block Ba or Bb enters the intra prediction mode;
(A2) Block Ba or Bb has a nonzero orthogonal transform coefficient; or
(A3) $|MVAx-MVBx| \geq 4$ or $|MVAy-MVBy| \geq 4$ Condition B:
$iD_0=|p_{20}-2p_{10}+p_{00}|+|q_{20}-2q_{10}+q_{00}|+|p_{27}-2p_{17}+p_{07}|+|q_{27}-2q_{17}+q_{07}|$
$iD_1=|p_{21}-2p_{11}+p_{01}|+|q_{21}-2q_{11}+q_{01}|+|p_{26}-2p_{16}+p_{06}|+|q_{26}-2q_{16}+q_{06}|$
$iD_2=|p_{22}-2p_{12}+p_{02}|+|q_{22}-2q_{12}+q_{02}|+|p_{25}-2p_{15}+p_{05}|+|q_{25}-2q_{15}+q_{05}|$
$iD_3=|p_{23}-2p_{13}+p_{03}|+|q_{23}-2q_{13}+q_{03}|+|p_{24}-2p_{14}+p_{04}|+|q_{24}-2q_{14}+q_{04}|$ Under this condition, $iD_{ave}<\beta$ The determination condition for chroma components may be equal to the above-described existing technique. A weighted average may be calculated to calculate average $iD_{ave}$ for four determination parameters $iD_0$ through $iD_3$.

(2-2) Second Example

The second example may define determination condition B for luma components as follows.

Condition B:
$iD_0=|p_{20}-2p_{10}+p_{00}|+|q_{20}-2q_{10}+q_{00}|+|p_{27}-2p_{17}+p_{07}|+|q_{27}-2q_{17}+q_{07}|$
$iD_1=|p_{21}-2p_{11}+p_{01}|+|q_{21}-2q_{11}+q_{01}|+|p_{26}-2p_{16}+p_{06}|+|q_{26}-2q_{16}+q_{06}|$
$iD_2=|p_{22}-2p_{12}+p_{02}|+|q_{22}-2q_{12}+q_{02}|+|p_{25}-2p_{15}+p_{05}|+|q_{25}-2q_{15}+q_{05}|$
$iD_3=|p_{23}-2p_{13}+p_{03}|+|q_{23}-2q_{13}+q_{03}|+|p_{24}-2p_{14}+p_{04}|+|q_{24}-2q_{14}+q_{04}|$ Under this condition, $iD_0<\beta$ and $iD_1<\beta$ and $iD_2<\beta$ and $iD_3<\beta$ An equation to calculate four determination parameters $iD_0$ through $iD_3$ is equal to that of the first example. An available condition is that not all of, but at least three, two, or one of four determination parameters $iD_0$ through $iD_3$ is smaller than edge determination threshold value $\beta$.

(2-3) Third Example

FIG. 25 is an explanatory diagram illustrating third and fourth examples of the determination technique. In the third and fourth examples, the filtering need determination processes (particularly the determination using determination condition B for luma components) for vertical boundaries references pixels of four rows L1, L3, L6, and L8 in each block. The filtering need determination processes for horizontal boundaries also references pixels of four columns in each block.

The third example may define determination conditions for luma components as follows.

Determination condition of luma component (Luma) . . . The deblocking filter is applied if conditions A and B are both true.

Condition A:
(A1) Block Ba or Bb enters the intra prediction mode;
(A2) Block Ba or Bb has a nonzero orthogonal transform coefficient; or
(A3)$|MVAx-MVBx|\geq4$ or $|MVAy-MVBy|\geq4$ Condition B:
$iD_0=|p_{20}-2p_{10}+p_{00}|+|q_{20}-2q_{10}+q_{00}|+|p_{27}-2p_{17}+p_{07}|+|q_{27}-2q_{17}+q_{07}|$
$iD_2=|p_{22}-2p_{12}+p_{02}|+|q_{22}-2q_{12}+q_{02}|+|p_{25}-2p_{15}+p_{05}|+|q_{25}-2q_{15}+q_{05}|$
$iD_{ave}=(iD_0+iD_2)>>1$ Under this condition, $iD_{ave}<\beta$ The determination condition for chroma components may be equal to the above-described existing technique. A weighted average may be calculated to calculate average $iD_{ave}$ for two determination parameters $iD_0$ and $iD_2$.

(2-4) Fourth Example

The fourth example may define determination condition B for luma components as follows.

Condition B:
$iD_0=|p_{20}-2p_{10}+p_{00}|+|q_{20}-2q_{10}+q_{00}|+|p_{27}-2p_{17}+p_{07}|+|q_{27}-2q_{17}+q_{07}|$
$iD_2=|p_{22}-2p_{12}+p_{02}|+|q_{22}-2q_{12}+q_{02}|+|p_{25}-2p_{15}+p_{05}|+|q_{25}-2q_{15}+q_{05}|$ Under this condition, $iD_0<\beta$ and $iD_2<\beta$ An equation to calculate two determination parameters $iD_0$ and $iD_2$ is equal to that of the third example. An available condition is that not both of, but either of two determination parameters $iD_0$ and $iD_2$ is smaller than edge determination threshold value $\beta$.

While there has been described the example of referencing the first, third, sixth, and eighth rows (or columns) L1, L3, L6, and L8 in a block during the determination, the other combinations of rows or columns may be referenced.

(2-5) Fifth Example

FIG. 26 is an explanatory diagram illustrating fifth and sixth examples of the determination technique. In the fifth and sixth examples, the filtering need determination processes for vertical boundaries references pixels of four rows L1, L3, L5, and L7 in each block. The filtering need determination processes for horizontal boundaries also references pixels of four columns in each block.

The fifth example may define determination conditions for luma components as follows.

Determination condition of luma component (Luma) . . . The deblocking filter is applied if conditions A and B are both true.

Condition A:
(A1) Block Ba or Bb enters the intra prediction mode;
(A2) Block Ba or Bb has a nonzero orthogonal transform coefficient; or
(A3)$|MVAx-MVBx|\geq4$ or $|MVAy-MVBy|\geq4$ Condition B:
$iD_0=|p_{20}-2p_{10}+p_{00}|+|q_{20}-2q_{10}+q_{00}|+|p_{26}-2p_{16}+p_{06}|+|q_{26}-2q_{16}+q_{06}|$
$iD_2=|p_{22}-2p_{12}+p_{02}|+|q_{22}-2q_{12}+q_{02}|+|p_{24}-2p_{14}+p_{04}|+|q_{24}-2q_{14}+q_{04}|$
$iD_{ave}=(iD_0+iD_2)>>1$ Under this condition, $iD_{ave}<\beta$ The determination condition for chroma components may be equal to the above-described existing technique. A weighted average may be calculated to calculate average $iD_{ave}$ for two determination parameters $iD_0$ and $iD_2$.

(2-6) Sixth Example

The sixth example may define determination condition B for luma components as follows.

Condition B:
$iD_0=|p_{20}-2p_{10}+p_{00}|+|q_{20}-2q_{10}+q_{00}|+|p_{26}-2p_{16}+p_{06}|+|q_{26}-2q_{16}+q_{06}|$
$iD_2=|p_{22}-2p_{12}+p_{02}|+|q_{22}-2q_{12}+q_{02}|+|p_{24}-2p_{14}+p_{04}|+|q_{24}-2q_{14}+q_{04}|$Under this condition, $iD_0<\beta$ and $iD_2<\beta$ An equation to calculate two determination parameters $iD_0$ and $iD_2$ is equal to that of the fifth example. An available condition is that not both of, but either of two determination parameters $iD_0$ and $iD_2$ is smaller than edge determination threshold value $\beta$.

Generally, increasing the number of rows and columns to be referenced for the determination improves the determination accuracy. Therefore, the first and second examples of referencing eight rows and columns can minimize a possibility of filtering a block originally not targeted for the deblocking filter to be applied and a possibility of not filtering a block originally targeted for the deblocking filter to be applied. The result is to improve the quality of an image to be encoded and decode.

On the other hand, decreasing the number of rows and columns to be referenced for the determination can reduce processing costs. Since there is trade-off between the image quality and the processing cost, it may be advantageous to adaptively select the number of rows and columns to be referenced for the determination depending on the use of the apparatus or restrictions on the installation. It may be advantageous to adaptively select combinations of rows and columns to be referenced.

As described in the first, third, and fifth examples, average value $D_{ave}$ of determination parameters can be compared with edge determination threshold value $\beta$ to appropriately perform the determination on a block basis without an excess effect of parameter variations for each row or column.

4-2. Process Flow

According to the second working example as well as the first working example, the deblocking filter 24 can operate on different parallelisms.

In the first scenario using a large parallelism, the vertical boundary determination sections 212-1 through 212-n determine in parallel whether the filtering is needed for all vertical boundaries included in macro blocks within an input image. The horizontal boundary determination sections 214-1 through 214-n determine in parallel whether filtering is needed for all horizontal boundaries included in macro blocks within an input image. The determination processes for vertical boundaries and horizontal boundaries are also performed in parallel. The horizontal filtering sections 132-1 through 132-n and the vertical filtering sections 142-1 through 142-n apply the deblocking filter to a vertical boundary and a horizontal boundary determined to require the deblocking filter to be applied (see FIG. 20).

In the second scenario using a small parallelism, the vertical boundary determination sections 212-1 through 212-n determine in parallel whether the filtering is needed for all vertical boundaries included in one focused macro block within an input image. The horizontal boundary determination sections 214-1 through 214-n determine in parallel whether filtering is needed for all horizontal boundaries included in the focused macro block. The determination processes for vertical boundaries and horizontal boundaries are also performed in parallel. The horizontal filtering sections 132-1 through 132-n then apply the deblocking filter in parallel to a vertical boundary determined to require the deblocking filter to be applied. The vertical filtering sections 142-1 through 142-n apply the deblocking filter in parallel to a horizontal boundary determined to require the deblocking filter to be applied. This process is repeatedly performed on all macro blocks within an input image (see FIG. 21).

These two scenarios are mere examples for the description. Also in the second working example, processes of the deblocking filter 24 may be parallelized in various units such as a given number of macro blocks (two or four macro blocks) or a group of horizontally or vertically placed blocks, for example. Also in the second working example as well as the first working example, the parallelization control section 150 may control the parallelism and sequence of processes in the deblocking filter 24.

[4-3. Process Example for Each LCU]

As already mentioned, the technology according to various working examples described in this specification may be provided as a process based on an HEVC encoding unit (CU). According to HEVC, an encoding unit having the largest size is referred to as a largest coding unit (LCU) that can be selected as 64×64 pixels, for example. The minimum selectable CU size is 8×8 pixels. Normally, an image is encoded and decoded corresponding to each LCU in accordance with a raster scan sequence from the LCU at the top left of a picture (or a slice). The following describes process examples corresponding to LCUs in the deblocking filter 24.

Figure 27:
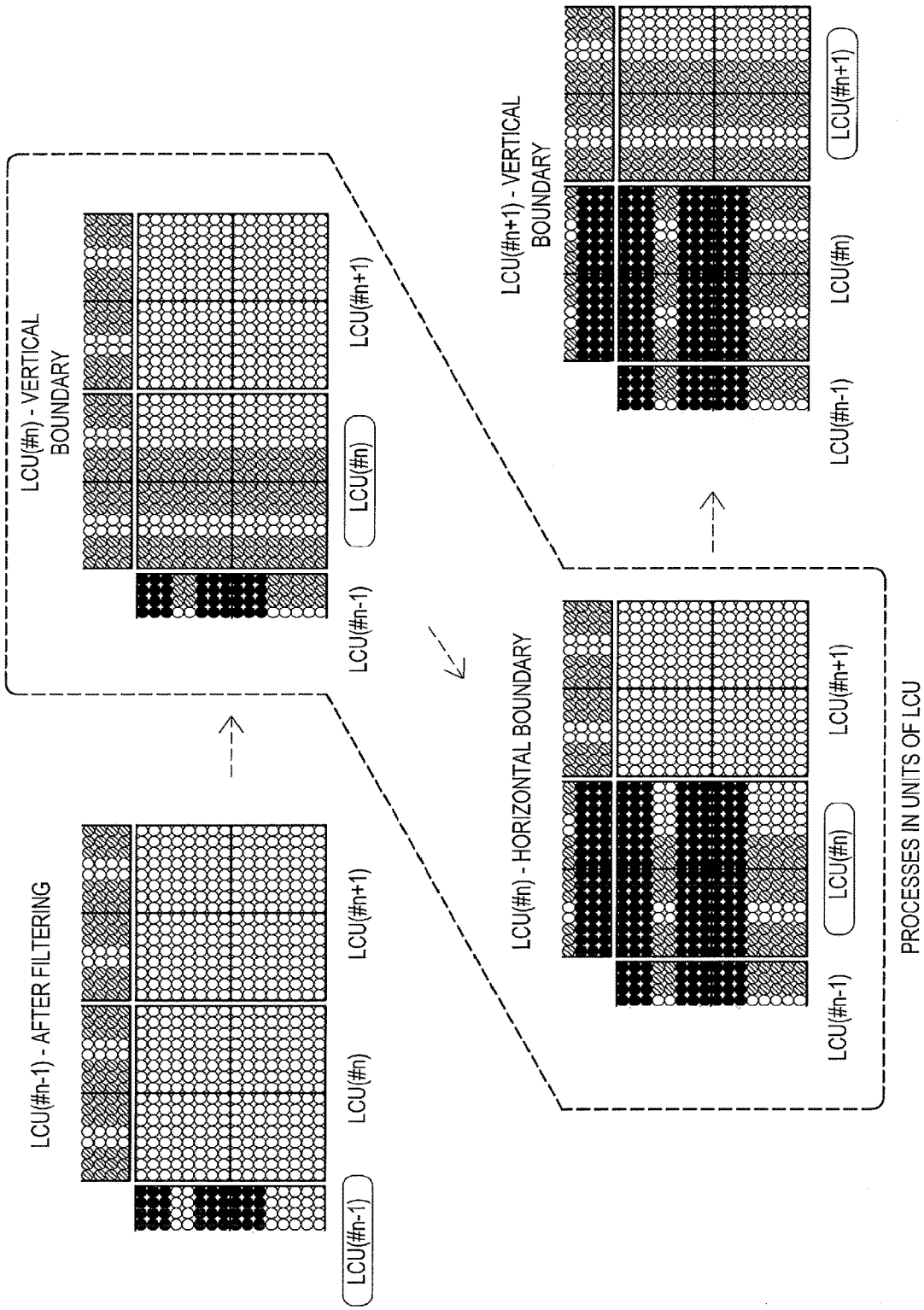
FIG. 27 is an explanatory diagram illustrating a process sequence for each LCU.

FIG. 27 is an explanatory diagram illustrating a process sequence for each LCU according to the second working example described above. The example assumes the LCU size to be 16×16 pixels and the CU size to be 8×8 pixels.

With reference to FIG. 27, the first stage is shown at the top left of the drawing and indicates that the filtering on LCUs has completed up to the (n−1)th LCU. Shaded pixels are targeted for filtering on vertical boundaries. Filled pixels are targeted for filtering on horizontal boundaries.

Processes for the second stage at the top right of FIG. 27 and the third stage at the bottom left thereof are targeted for the nth LCU. Before the second stage, pixel values input to the deblocking filter 24 are used to perform the filtering need determination processes in parallel on all vertical boundaries and horizontal boundaries belonging to the nth LCU. At the second stage, pixel values input to the deblocking filter 24 are used to perform the filtering process in parallel on a vertical boundary that belongs to the nth LCU and is determined to require the deblocking filter to be applied. The pixel values processed at the second stage are then used to perform the filtering process in parallel on a horizontal boundary that belongs to the nth LCU and is determined to require the deblocking filter to be applied.

A process for the fourth stage at the bottom right of FIG. 27 is targeted for the (n+1)th LCU. At the fourth stage, the filtering process is performed in parallel on a vertical boundary determined to require the deblocking filter to be applied after the filtering need determination processes are performed in parallel on all vertical boundaries and horizontal boundaries belonging to the (n+1)th LCU.

While the example assumes the LCU size to be 16×16 pixels, it may be set to 32×32 or 64×64 pixels. The effect of shortening the processing time according to the parallelization is further improved because increasing the size of an LCU to be selected also increases the number of vertical boundaries and horizontal boundaries belonging to one LCU.

Figure 28:
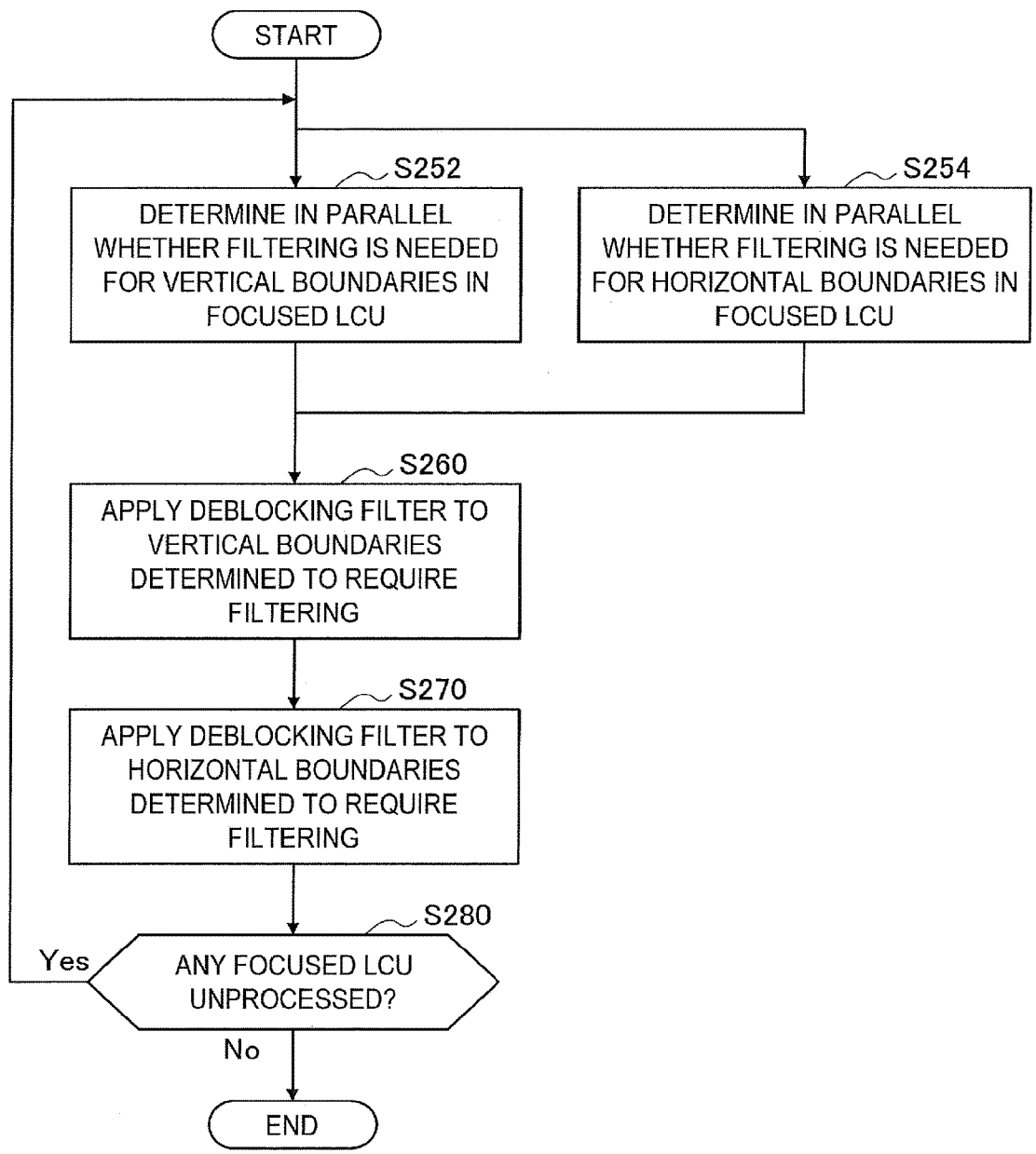
FIG. 28 is a flowchart illustrating a process flow for each LCU.

FIG. 28 is a flowchart illustrating a process flow of the deblocking filter 24 for each LCU.

With reference to FIG. 28, the vertical boundary determination sections 212-1 through 212-n determine in parallel whether filtering is needed for all vertical boundaries included in a focused LCU within an input image (step S252). The horizontal boundary determination sections 214-1 through 214-n determine in parallel whether filtering is needed for all horizontal boundaries included in the focused LCU (step S254). Steps S252 and S254 are also performed in parallel.

The horizontal filtering sections 132-1 through 132-n apply the deblocking filter in parallel to vertical boundaries in the focused LCU determined at step S252 to require the deblocking filter to be applied (step S260).

The vertical filtering sections 142-1 through 142-n apply the deblocking filter in parallel to horizontal boundaries in the focused LCU determined at step S254 to require the deblocking filter to be applied (step S270).

The process at steps S252 through S270 is repeated for a newly focused LCU if an LCU remains unprocessed in the input image (step S280). The process terminates if there remains no LCU unprocessed.

<5. Third Working Example>

[5-1. Overview]

According to the second working example, the filtering need determination processes on vertical boundaries and horizontal boundaries reference a pixel value input to the deblocking filter and thereby eliminating the dependency between the filtering need determination processes and making the parallelization of determination processes possible. The third working example described below applies the concept of the second working example also to the filtering process. The filtering processes for vertical boundaries and horizontal boundaries also filter pixel values input to the deblocking filter.

Figure 29:
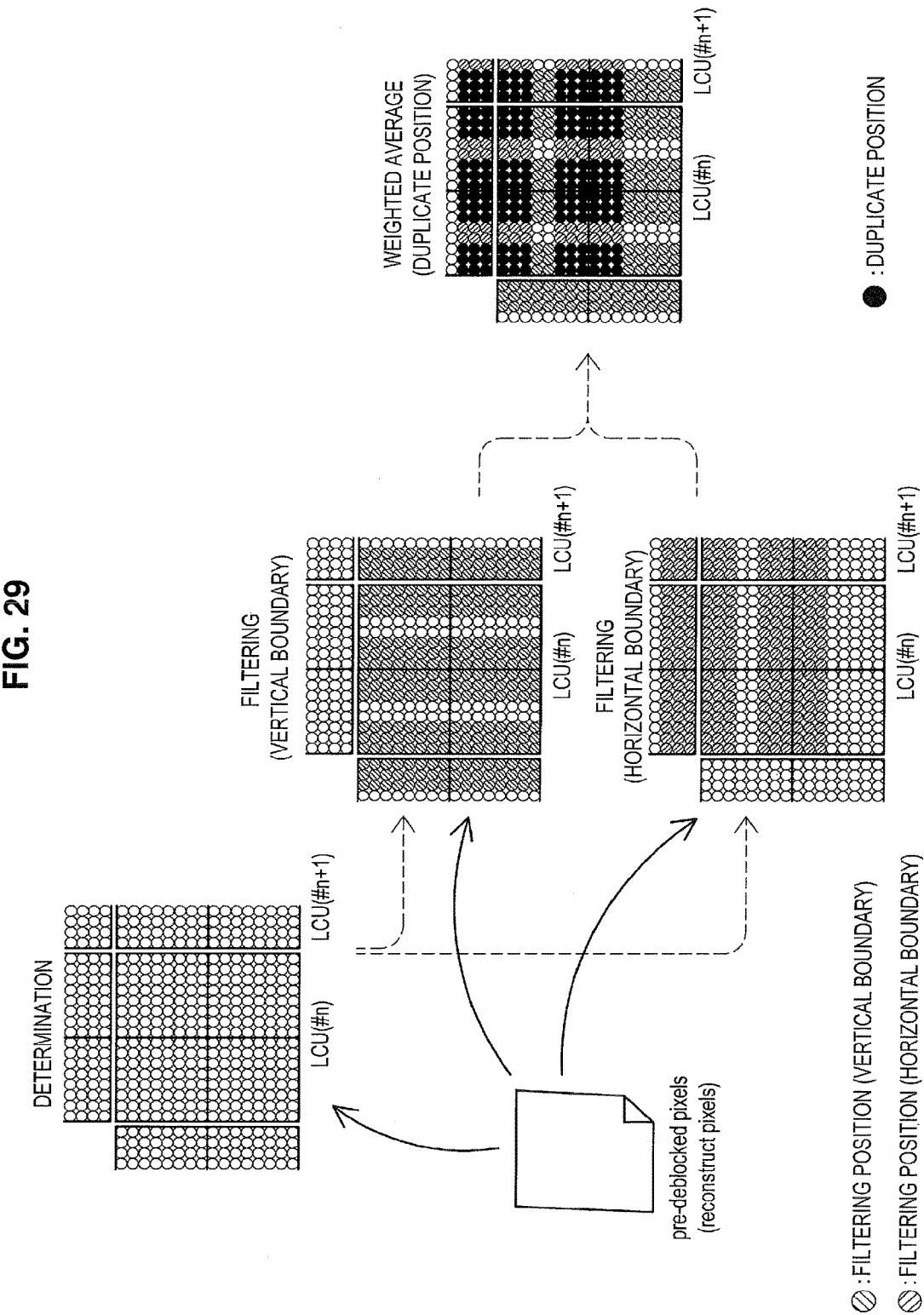
FIG. 29 is an explanatory diagram illustrating an overview of a third working example.

FIG. 29 is an explanatory diagram illustrating an overview of the working example. At the bottom left of FIG. 29, there is shown a shape representing input pixels (also referred to as reconstruct pixels) before being processed by the deblocking filter. The working example allows pixel values input to the deblocking filter to be referenced from not only filtering need determination processes for vertical boundaries and horizontal boundaries but also filtering processes for vertical boundaries and filtering processes for horizontal boundaries. Therefore, the dependency between the two filtering processes is eliminated. The two filtering processes are performed in parallel.

The filtering processes for vertical boundaries and the filtering processes for horizontal boundaries may update values of duplicate pixels. Filled pixels in FIG. 29 illustrate positions of the pixels likely to be duplicated. The deblocking filter according to the working example calculates one output pixel value from two filter outputs in terms of pixels that are duplicately updated by two filters operating in parallel

[5-2. Deblocking Filter Configuration Example]

Figure 30:
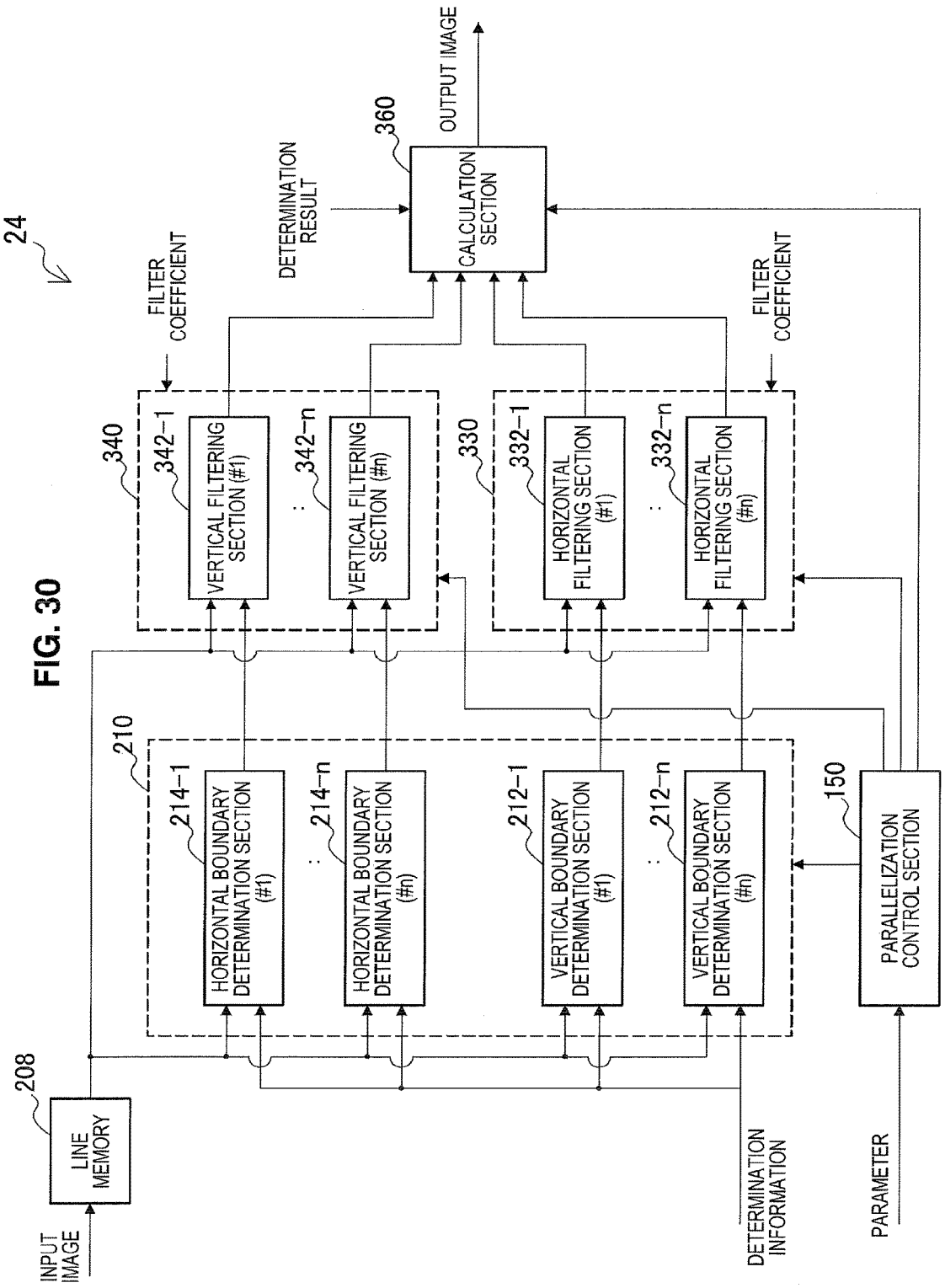
FIG. 30 is a block diagram illustrating a detailed configuration of a deblocking filter according to the third working example.

FIG. 30 is a block diagram illustrating a detailed configuration of the deblocking filter 24 according to the third working example. With reference to FIG. 30, the deblocking filter 24 includes the line memory 208, the determination block 210, a horizontal filtering block 330, a vertical filtering block 340, the parallelization control section 150, a calculation section 360. The determination block 210 includes vertical boundary determination sections 212-1 through 212-n and horizontal boundary determination sections 214-1 through 214-n. The vertical boundary determination sections 212 and the horizontal boundary determination sections 214 may determine the necessity of filtering on boundaries according to the various determination conditions as described in the second working example.

The horizontal filtering block 330 includes horizontal filtering sections 332-1 through 332-n. The horizontal filtering sections 332 are supplied with an input image value from the line memory 208 and a determination result concerning each vertical boundary from the determination block 210.

The horizontal filtering sections 332 apply the deblocking filter for vertical boundaries to right and left pixels around the corresponding vertical boundary if the determination result from the vertical boundary determination section 212 indicates that the filter needs to be applied. The horizontal filtering sections 332 output, to the calculation section 360, a pixel value after the filtering in terms of the filtered pixel or an input pixel value in terms of the other pixels.

The vertical filtering block 340 includes vertical filtering sections 342-1 through 342-n. The vertical filtering sections 342 are supplied with an input pixel value from the line memory 208 and a determination result concerning each horizontal boundary from the determination block 210.

The vertical filtering sections 342 apply the deblocking filter for horizontal boundaries to top and bottom pixels around the corresponding horizontal boundary if the determination result from the horizontal boundary determination section 214 indicates that the filter needs to be applied. Filtering processes of the vertical filtering sections 342-1 through 342-n are performed in parallel to filtering processes of the horizontal filtering sections 332-1 through 332-n. The vertical filtering sections 342 output, to the calculation section 360, a pixel value after the filtering in terms of the filtered pixel or an input pixel value in terms of the other pixels.

The calculation section 360 is supplied with an output pixel value from the horizontal filtering block 330 and an output pixel value from the vertical filtering block 340 in parallel. Further, the calculation section 360 is supplied with determination results from the vertical boundary determination section 212 and the horizontal boundary determination section 214. According to a determination result, the calculation section 360 calculates output pixel values for pixels filtered from the horizontal filtering block 330 and the vertical filtering block 340 based on filter outputs from the horizontal filtering block 330 and the vertical filtering block 340.

According to the working example, for example, the calculation section 360 calculates an average of two filter outputs for duplicately filtered pixels. The calculation section 360 may calculate a simple average of two filter outputs. Instead, the calculation section 360 may calculate a weighted average of two filter outputs. For example, the calculation section 360 may determine a weight for weighted averages of pixels according to the distance from each pixel to the vertical boundary and to the horizontal boundary.

Figure 31:
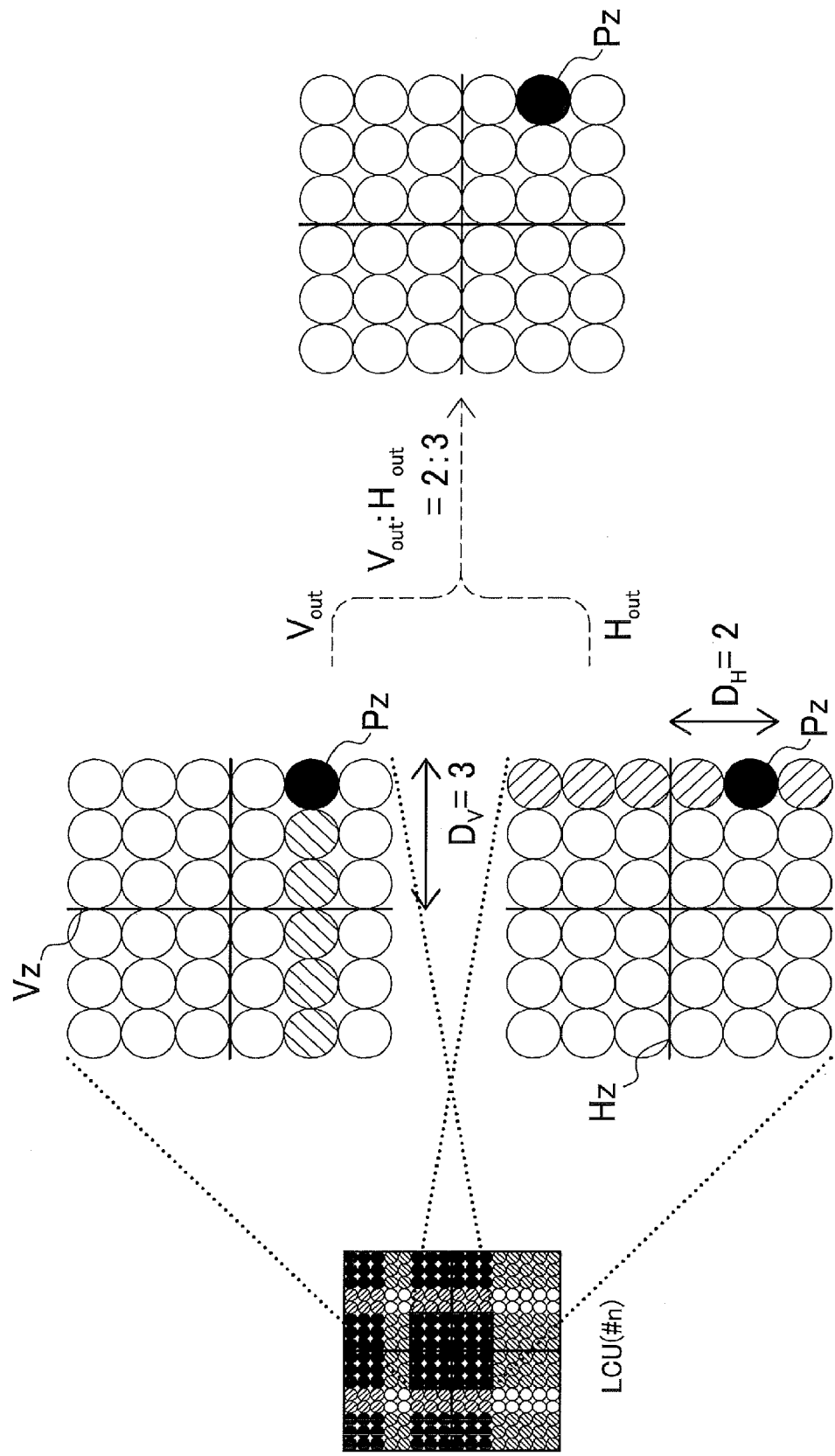
FIG. 31 is an explanatory diagram illustrating determination of a weight for weighted average.

FIG. 31 is an explanatory diagram illustrating determination of a weight for weighted average calculated by the calculation section 360. FIG. 31 shows focused pixel $P_Z$ in black corresponding to one of the duplicated positions illustrated in FIG. 29. There are three pixels corresponding to distance $D_V$ between focused pixel $P_Z$ and nearest vertical boundary $V_Z$. There are two pixels corresponding to distance $D_H$ between focused pixel $P_Z$ and nearest horizontal boundary $H_Z$. Distance $D_H$ is smaller than distance $D_V$. In this case, the calculation section 360 may set a weight for output from the deblocking filter applied to horizontal boundary $H_Z$ to be larger than a weight for output from the deblocking filter applied to vertical boundary $V_Z$. The example in FIG. 31 assumes that a ratio of filter output $V_{out}$ for vertical boundary $V_Z$ to filter output $H_{out}$ for horizontal boundary $H_Z$ is 2:3.

As seen from FIG. 31, calculating a weighted average of two filter outputs can consequently provide each focused pixel with an output pixel value similar to the case of applying one two-dimensional filter having a filter tap along the horizontal direction and a filter tap along the vertical direction. Parallelizing filtering processes on the vertical boundary and the horizontal boundary can also appropriately reduce block distortion appearing on the vertical boundary and the horizontal boundary. As another working example, the deblocking filter 24 may include one two-dimensional filter that simultaneously calculates horizontal filtering, vertical filtering, and a weighted average. In this case, however, the installation is very complicated because filter coefficients need to be variously changed correspondingly to pixels. On the other hand, the third working example performs two one-dimensional filters in parallel and then calculates a weighted average. This can easily provide processes substantially equal to a two-dimensional filter while ensuring the functionality of existing deblocking filters.

Figures 32, 33:
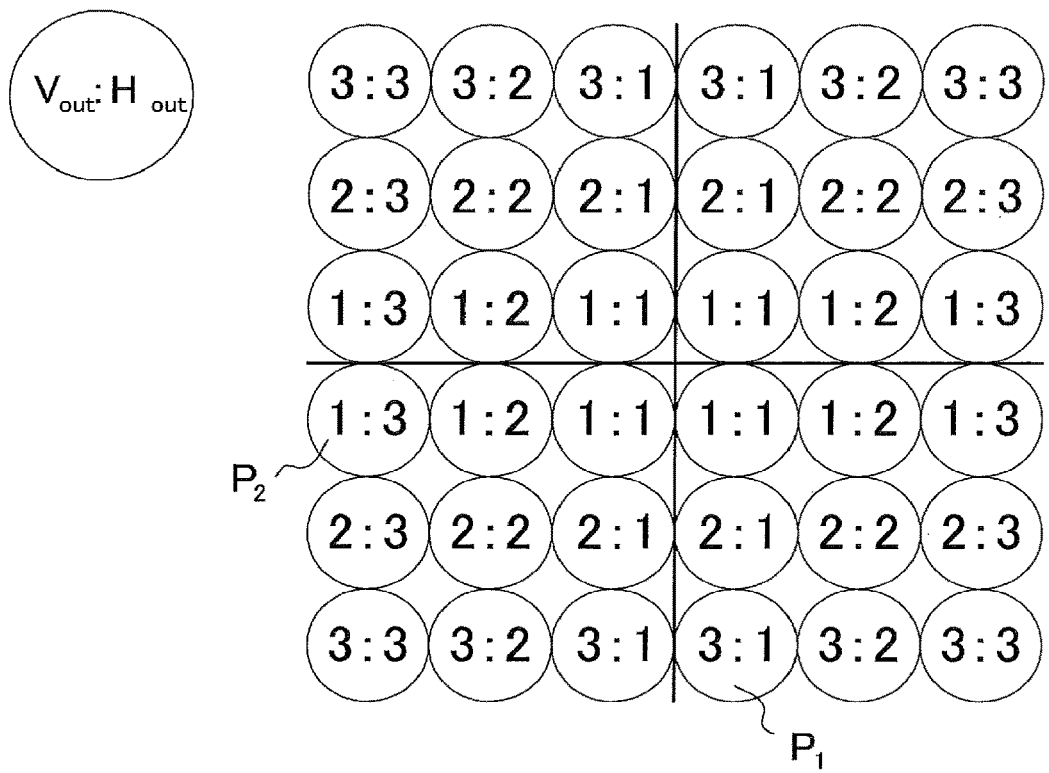
FIG. 32 is an explanatory diagram illustrating an example of a weight for weighted average.
FIG. 33 is an explanatory diagram illustrating an output pixel value from a calculation section according to the third working example.

FIG. 32 is an explanatory diagram illustrating an example of the weight for weighted averages calculated based on the example in FIG. 31. FIG. 32 shows 36 pixels (6×6) around an intersection between the vertical boundary and the horizontal boundary. The pixels correspond to the above-described duplicated positions. The ratio of the weight for filter output $V_{out}$ to the weight for filter output $H_{out}$ is 1:1 (2:2 or 3:3) for pixels positioned at an equal distance from the vertical boundary and the horizontal boundary. The weight for filter output $V_{out}$ is larger than the weight for filter output $H_{out}$ for pixels nearer to the vertical boundary. For example, the ratio of weights for pixel $P_1$ is $V_{out}$:$H_{out}$=3:1. The weight for filter output $V_{out}$ is smaller than the weight for filter output $H_{out}$ for pixels nearer to the horizontal boundary. For example, the ratio of weights for pixel $P_2$ is $V_{out}$:$H_{out}$=1:3.

The block distortion can be more effectively suppressed and the image quality can be improved by varying the weight for weighted averages depending on the distance between each pixel and the boundary.

The above-described weights are mere examples. For example, the calculation section 360 may determine the weight of weighted averages for pixels according to the edge strengths of the vertical boundary and the horizontal boundary corresponding to each pixel instead of or in addition to the distance between each pixel and the boundary. The edge strength may be represented with a parameter such as an edge value calculated from the calculation section 122 as shown in FIG. 16, for example. In this case, the weight for filer output on a boundary having a stronger edge may be set to be larger than the weight for filer output on a boundary having a weaker edge. Varying the weight of weighted averages according to the edge strength can adaptively improve the effect of the deblocking filter at a boundary that remarkably causes block distortion.

The calculation section 360 selects outputs from actually filtered blocks in terms of pixels filtered by one of the horizontal filtering block 330 and the vertical filtering block 340. The calculation section 360 directly outputs an input pixel value to be output to the deblocking filter 24 in terms of pixels not filtered by the horizontal filtering block 330 or the vertical filtering block 340. A table in FIG. 33 lists output pixel values from the calculation section 360 according to results of the determination whether to require the filtering.

[5-3. Process Sequence Example]

The following describes two examples of process sequences available for the deblocking filter 24 according to the working example. The example also assumes that the deblocking filter is supplied with an image having the size of 32×32 pixels. The input image includes four macro blocks MB0 through MB3 each having the size of 16×16 pixels.

(1) First Example

Figure 34:
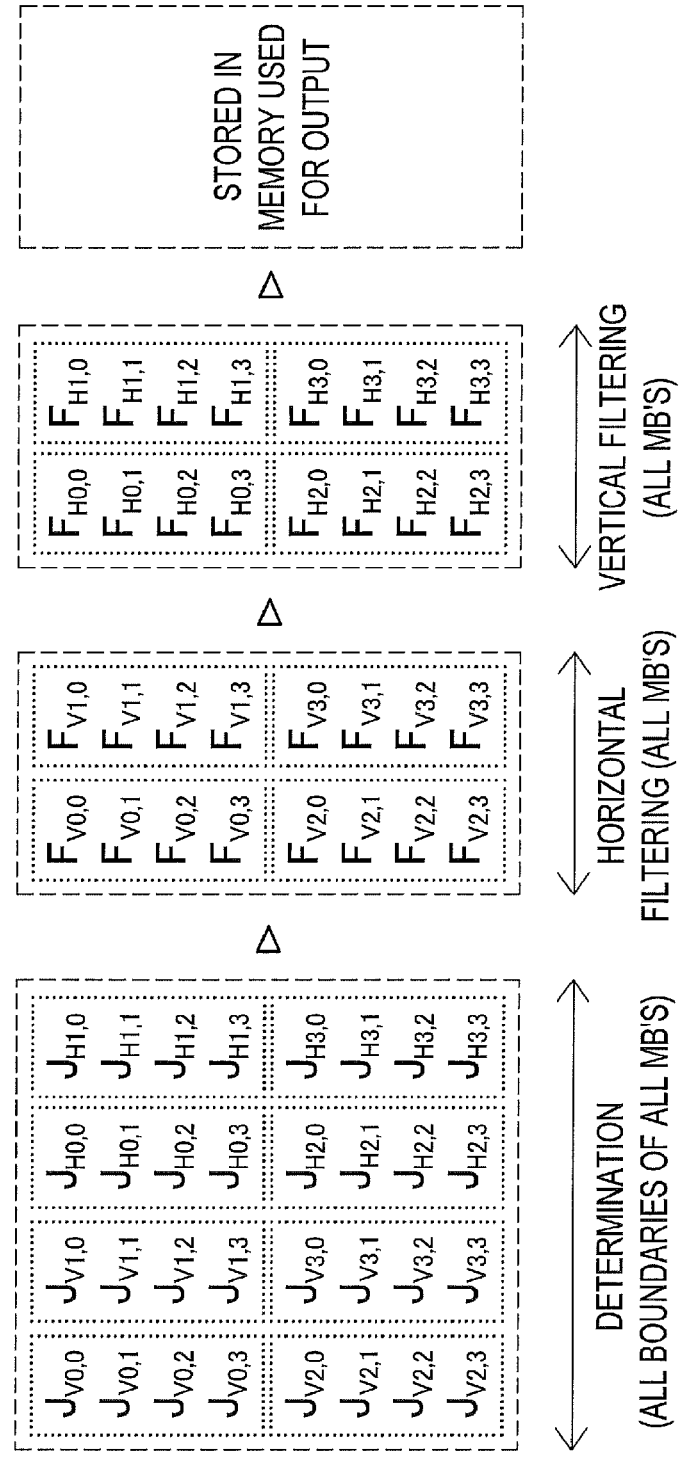
FIG. 34 is an explanatory diagram illustrating a first example of process sequence for comparison.

For comparison, FIG. 34 illustrates a process sequence when the dependency remains between a filtering process on the vertical boundary and a filtering process on the horizontal boundary. The process sequence in FIG. 34 substantially equals the process sequence in FIG. 13 according to the first working example. In FIG. 34, the first step performs, in parallel, filtering need determination processes $J_{V0,0}$ through $J_{V3,3}$ and $J_{H0,0}$ through $J_{H3,3}$ on all vertical boundaries and all horizontal boundaries of all the four macro blocks MB0 through MB3. The second step performs filtering processes $F_{V0,0}$ through $F_{V3,3}$ on 16 vertical boundaries of the four macro blocks MB0 through MB3. The third step performs filtering processes $F_{H0,0}$ through $F_{H3,3}$ on 16 horizontal boundaries of the four macro blocks MB0 through MB3. The fourth step (omitted from FIG. 13) stores pixel values after the filtering process on the horizontal boundary in the memory used for outputs from the deblocking filter 24.

Figure 35:
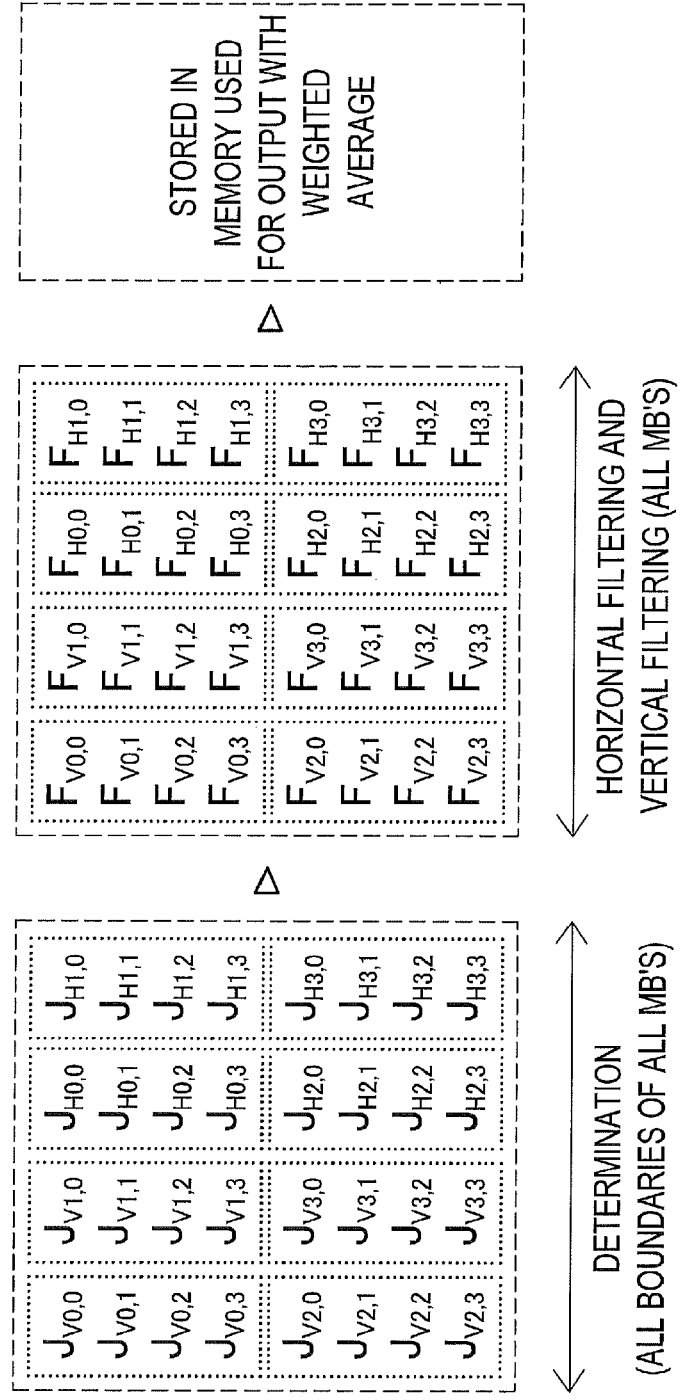
FIG. 35 is an explanatory diagram illustrating a first example of process sequence provided by the third working example.

FIG. 35 illustrates a first example of process sequence provided by the working example. In FIG. 35, the first step performs, in parallel, filtering need determination processes $J_{V0,0}$ through $J_{V3,3}$ and $J_{H0,0}$ through $J_{H3,3}$ on all vertical boundaries and all horizontal boundaries of the four macro blocks MB0 through MB3. The second step performs, in parallel, filtering processes $F_{V0,0}$ through $F_{V3,3}$ and $F_{H0,0}$ through $F_{H3,3}$ on all vertical boundaries and all horizontal boundaries of the four macro blocks MB0 through MB3. Actually, the second step filters only a boundary determined to require the filtering. The third step stores pixel values in the memory used for outputs from the deblocking filter 24. A weighted average of two filter outputs may be calculated as an output pixel value in terms of pixels filtered by the horizontal filtering block 330 and the vertical filtering block 340.

(2) Second Example

While the first example maximizes the parallelism, the deblocking filter 24 according to the second example can also perform a process for each macro block.

Figure 36:
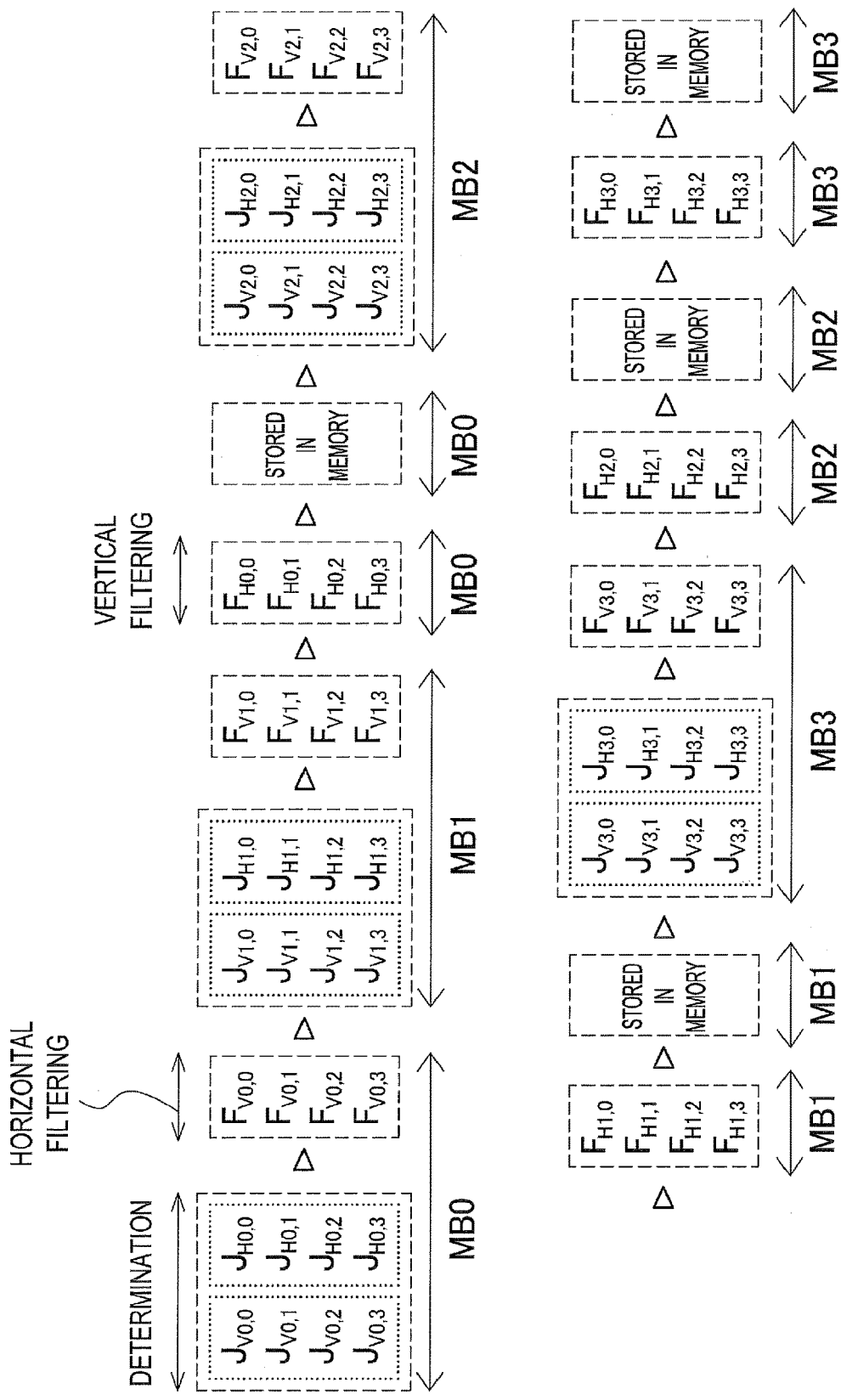
FIG. 36 is an explanatory diagram illustrating a second example of process sequence for comparison.

For comparison, FIG. 36 illustrates a process sequence for each macro block when the dependency remains between a filtering process on the vertical boundary and a filtering process on the horizontal boundary. The process sequence in FIG. 36 substantially equals the process sequence in FIG. 14 according to the first working example. FIG. 36 explicitly shows the four process steps (sixth, tenth, 14th, and 16th) that store pixel values in the memory for output and are omitted from FIG. 14 for simplicity. Sixteen process steps including the four process steps configure the process in FIG. 36.

Figure 37:
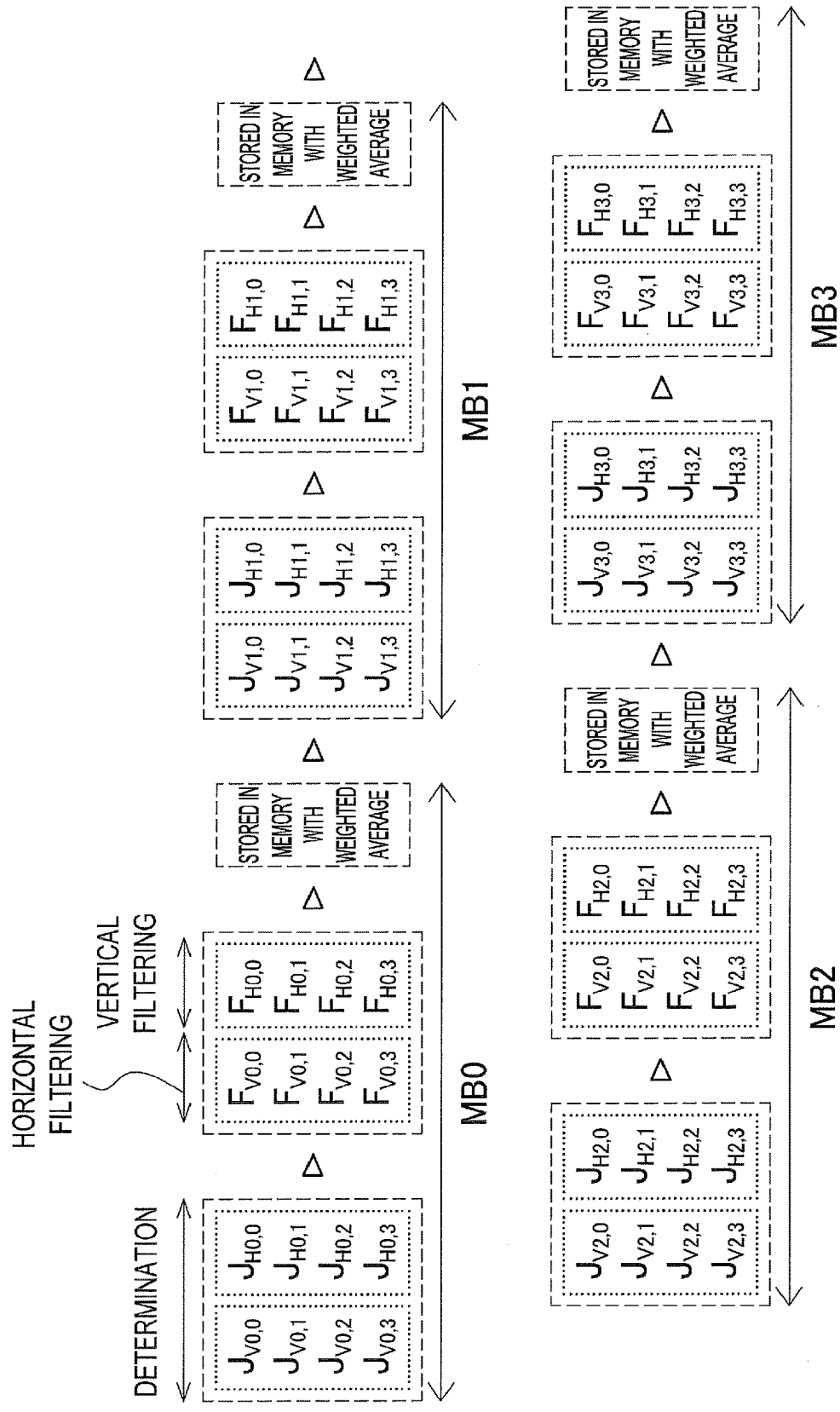
FIG. 37 is an explanatory diagram illustrating a second example of process sequence provided by the third working example.

FIG. 37 illustrates a second example of process sequence provided by the working example. In FIG. 37, the first step performs, in parallel, filtering need determination processes $J_{V0,0}$ through $J_{V0,3}$ and $J_{H0,0}$ through $J_{H0,3}$ on four vertical boundaries and four horizontal boundaries of macro block MB0. The second step performs, in parallel, filtering processes $F_{V0,0}$ through $F_{V0,3}$ and $F_{H0,0}$ through $F_{H0,3}$ on four vertical boundaries and four horizontal boundaries of macro block MB0. The third step stores pixel values of macro block MB0 in the memory used for outputs from the deblocking filter 24. A weighted average of two filter outputs may be calculated as an output pixel value in terms of pixels duplicately filtered by two filters. The fourth to sixth steps similarly process macro block MB1. The seventh to ninth steps similarly process macro block MB2. The tenth to twelfth steps similarly process macro block MB3. The process in FIG. 37 includes twelve process steps fewer than those of the process in FIG. 36.

The third working example eliminates the dependency between filtering processes for vertical boundaries and a filtering process for horizontal boundaries. The process of the deblocking filter 24 can be performed using fewer process steps than those used for the first and second working examples. One of advantages of allowing a filtering process to reference only pixels input to the deblocking filter is that any configuration of filter taps causes no dependency between filtering processes for vertical boundaries and filtering processes for horizontal boundaries. The third working example can improve the image quality by configuring a filter tap using more pixels than used for existing techniques. For example, the existing technique uses a filter tap of three pixels for each side of each boundary as described with reference to FIG. 7. The working example causes no dependency between processes even if a filter tap of five pixels or more is used at each boundary. No dependency occurs between processes even by further decreasing the block size as a process unit for the deblocking filter.

Also in the third working example as well as the first and second working examples, the parallelization control section 150 may control the parallelism and sequence of processes in the deblocking filter 24.

[5-4. Process Flow]

Figure 38:
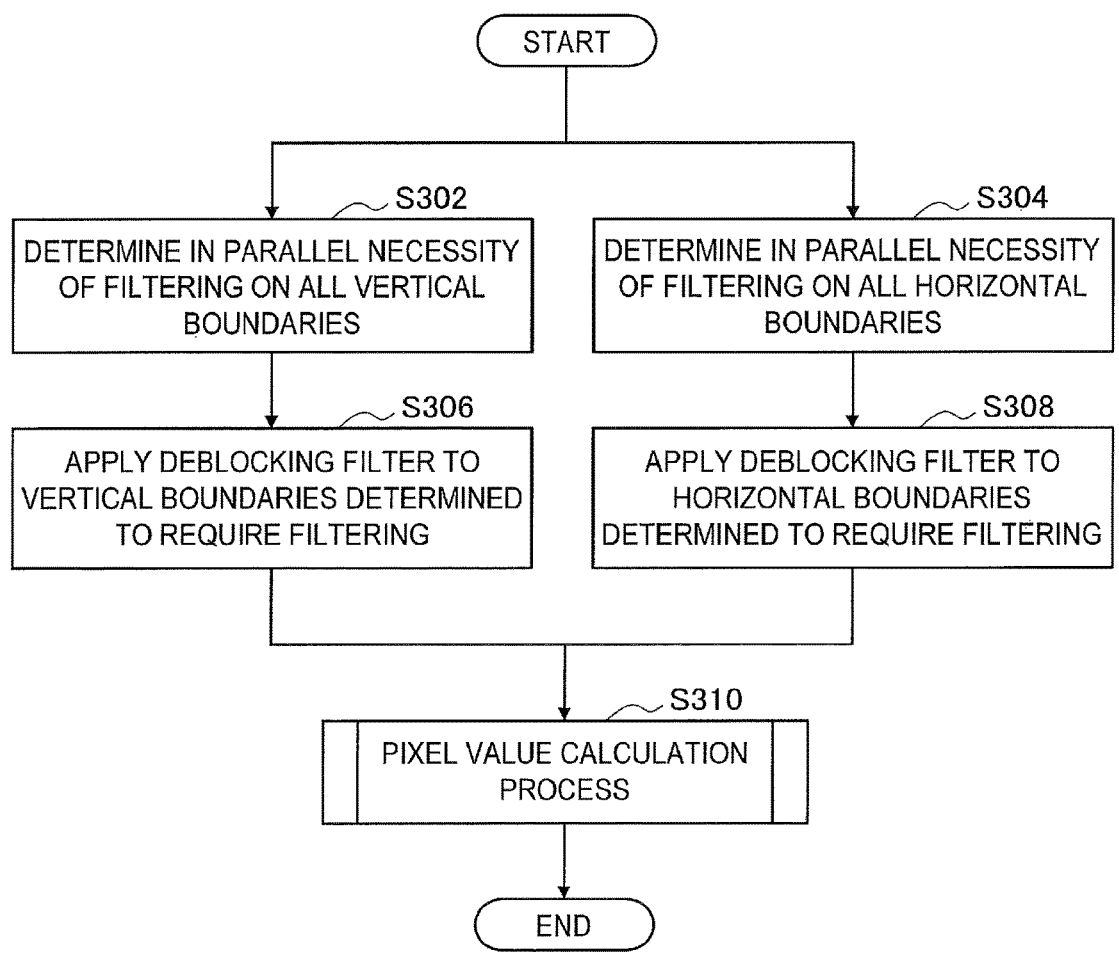
FIG. 38 is a flowchart illustrating a first example of a process flow for the deblocking filter according to the third working example.
Figure 39:
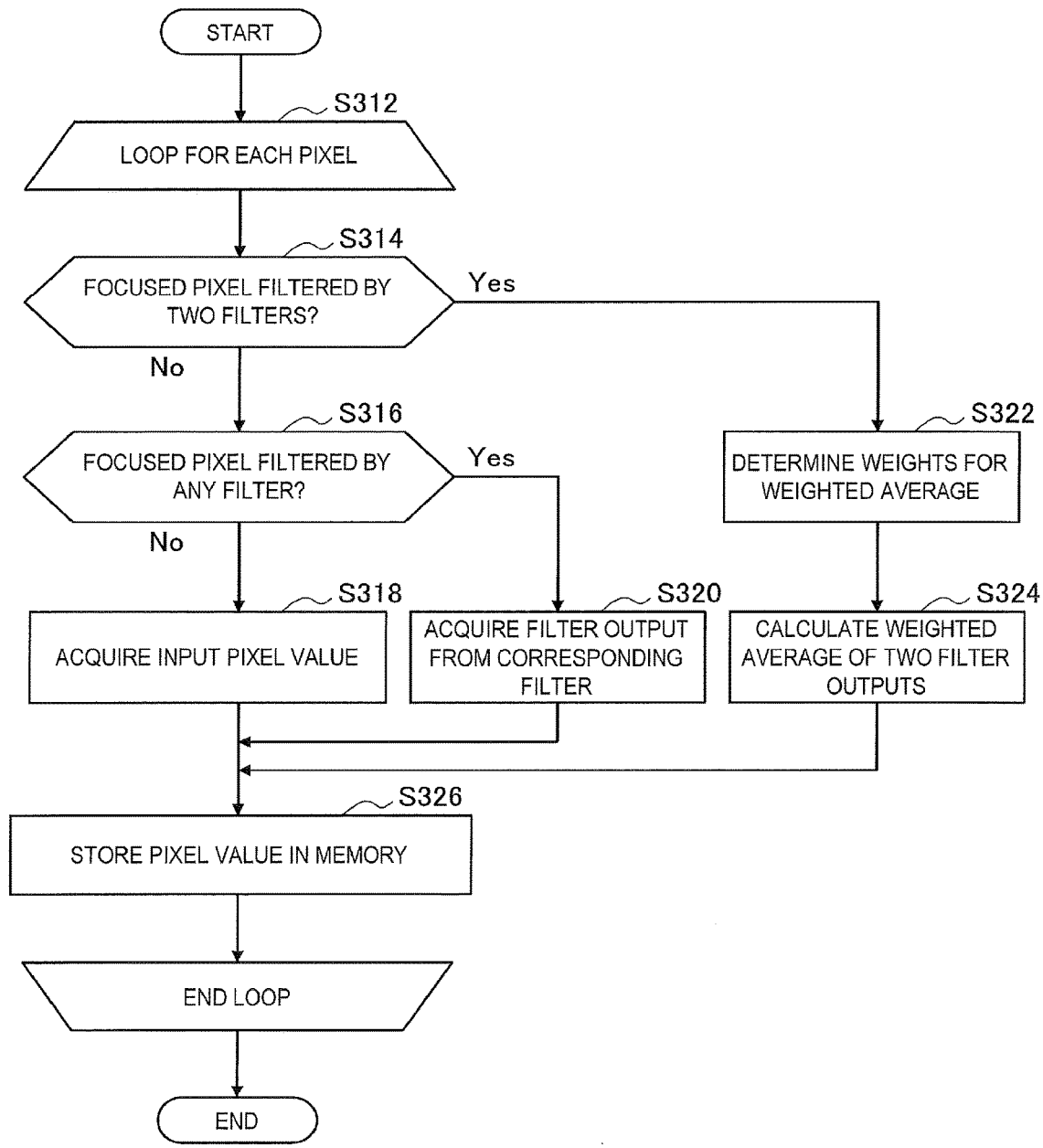
FIG. 39 is a flowchart illustrating a flow of a pixel value calculation process shown in FIG. 38.

FIG. 38 is a flowchart illustrating an example of a process flow for the deblocking filter according to the third working example. FIG. 39 is a flowchart illustrating a flow of the pixel value calculation process shown in FIG. 38.

With reference to FIG. 38, the vertical boundary determination sections 212-1 through 212-n determine in parallel whether filtering is needed for all vertical boundaries within an input image or a macro block (step S302). The horizontal boundary determination sections 214-1 through 214-n determine in parallel whether filtering is needed for all horizontal boundaries within the input image or the macro block (step S304). Steps S302 and S304 are also performed in parallel.

The horizontal filtering sections 332-1 through 332-n apply the deblocking filter in parallel to all vertical boundaries determined at step S302 to require the deblocking filter to be applied (step S306). The vertical filtering sections 342-1 through 342-n apply the deblocking filter in parallel to all horizontal boundaries determined at step S304 to require the deblocking filter to be applied (step S308). Steps S306 and S308 are also performed in parallel.

The calculation section 360 then performs the pixel value calculation process as shown in FIG. 39 (step S310). With reference to FIG. 39, the process from step S314 to step S326 loops for each pixel to be processed (step S312)

At step S314, the calculation section 360 determines whether two filters for vertical boundaries and horizontal boundaries have filtered a focused pixel (step S314). The process proceeds to step S322 if the two filters have filtered the focused pixel. The process proceeds to step S316 if the two filters have not filtered the focused pixel.

At step S316, the calculation section 360 determines whether one of the two filters for vertical boundaries and horizontal boundaries has filtered the focused pixel (step S316). The process proceeds to step S320 if one of the two filters has filtered the focused pixel. The process proceeds to step S318 if none of the filters has filtered the focused pixel.

At step S318, the calculation section 360 acquires an input pixel value to the deblocking filter 24 (step S318). At step S320, the calculation section 360 acquires a filter output from the filter that actually filters the focused pixel (step S320).

At step S322, the calculation section 360 determines weight values for calculating a weighted average of filter outputs from the two filters concerning the focused pixel according to distances from the focused pixel to the vertical boundary and the horizontal boundary or the edge strengths of the vertical boundary and the horizontal boundary corresponding to the focused pixel (step S322). The calculation section 360 calculates a weighted average of filter outputs from the two filters using the determined weight (step S324).

The calculation section 360 stores the pixel value of the focused pixel in the memory while the pixel value is acquired at step S318 or S320 or is calculated at step S324 (step S326). The sequences of processes as shown in FIGS. 38 and 39 terminate when the process is performed on all pixels to be processed.

<6. Application to Various Codecs>

The technology according to the disclosure is applicable to various codecs related to image encoding and decoding. The following describes examples of applying the technology according to the disclosure to multiview codec and scalable codec.

[6-1. Multiview Codec]

Figure 40:
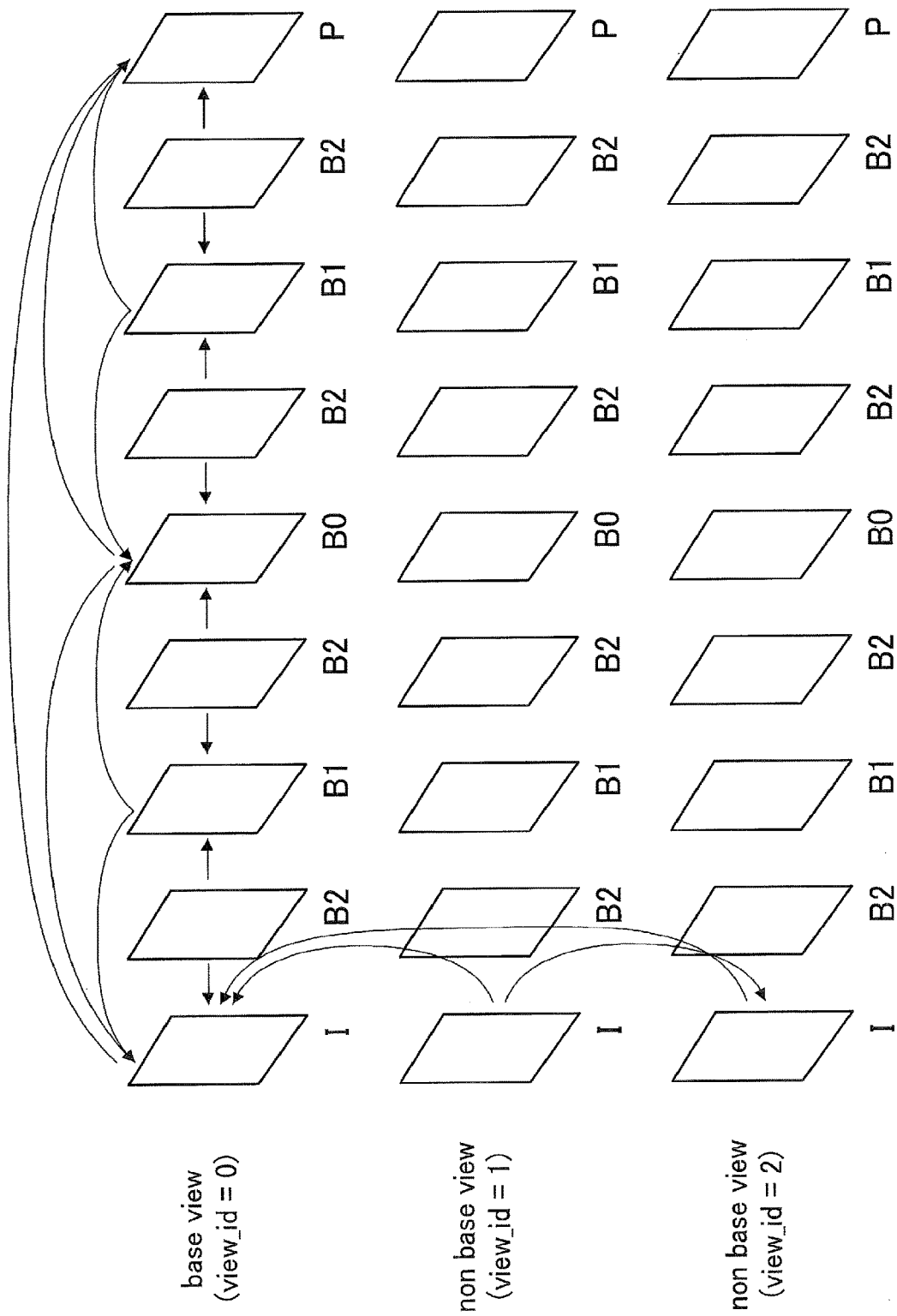
FIG. 40 is an explanatory diagram illustrating multiview codec.

The multiview codec is an image encoding system that encodes and decodes multiple-perspective video. FIG. 40 is an explanatory diagram illustrating the multiview codec. FIG. 40 illustrates sequences of frames for three views captured at three observing points. Each view is provided with a view ID (view_id). One of the views is specified as a base view. Views other than the base view are referred to as non-base views. The example in FIG. 40 represents a base view with view ID "0" and two non-base views with view ID "1" or "2." Encoding multiview image data may compress the data size of the encoded stream as a whole by encoding frames of the non-base view based on encoding information about frames of the base view.

The deblocking filter may be applied to each view during the encoding process and the decoding process according to the multiview codec described above. When the deblocking filter is applied to each view, filtering need determination processes on vertical block boundaries and horizontal block boundaries for each view may be parallelized based on the technology according to the disclosure. A filtering need determination process and a filtering process for each view may be parallelized. The parameter to control a filtering need determination process or a filtering process may be provided for each view. A parameter provided for the base view may be reused for the non-base view.

Filtering need determination processes or filtering processes may be parallelized over views. Views may share the parameter to control filtering need determination processes or filtering processes. It may be advantageous to additionally specify a flag indicating whether views share the parameter.

Figure 41:
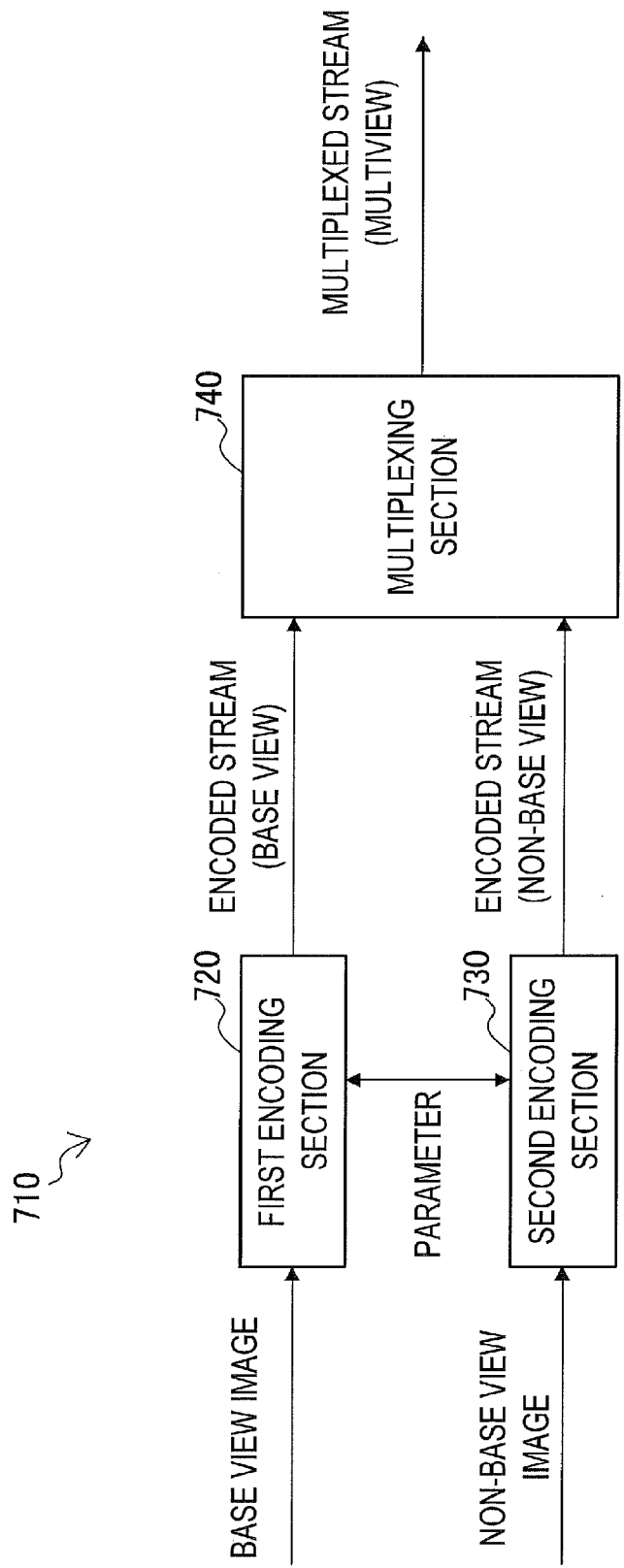
FIG. 41 is an explanatory diagram illustrating an image encoding process according to an embodiment applied to multiview codec.

FIG. 41 is an explanatory diagram illustrating an image encoding process applied to the multiview codec described above. FIG. 41 shows a configuration of a multiview encoding device 710 as an example. The multiview encoding device 710 includes a first encoding section 720, a second encoding section 730, and a multiplexing section 740.

The first encoding section 720 encodes a base view image and generates an encoded stream for the base view. The second encoding section 730 encodes a non-base view image and generates an encoded stream for the non-base view. The multiplexing section 740 multiplexes an encoded stream for the base view generated from the first encoding section 720 and one or more encoded streams for the non-base view generated from the second encoding section 730 to generate a multiplexed stream for multiview.

The first encoding section 720 and the second encoding section 730 illustrated in FIG. 41 are configured similarly to the image encoding device 10 according to the above-described embodiment. Applying the deblocking filter to views enables to parallelize filtering need determination processes for vertical block boundaries and horizontal block boundaries or parallelize filtering need determination processes and filtering processes. A parameter to control these processes may be inserted into a header area of the encoded stream for each view or into a common header area in the multiplexed stream.

Figure 42:
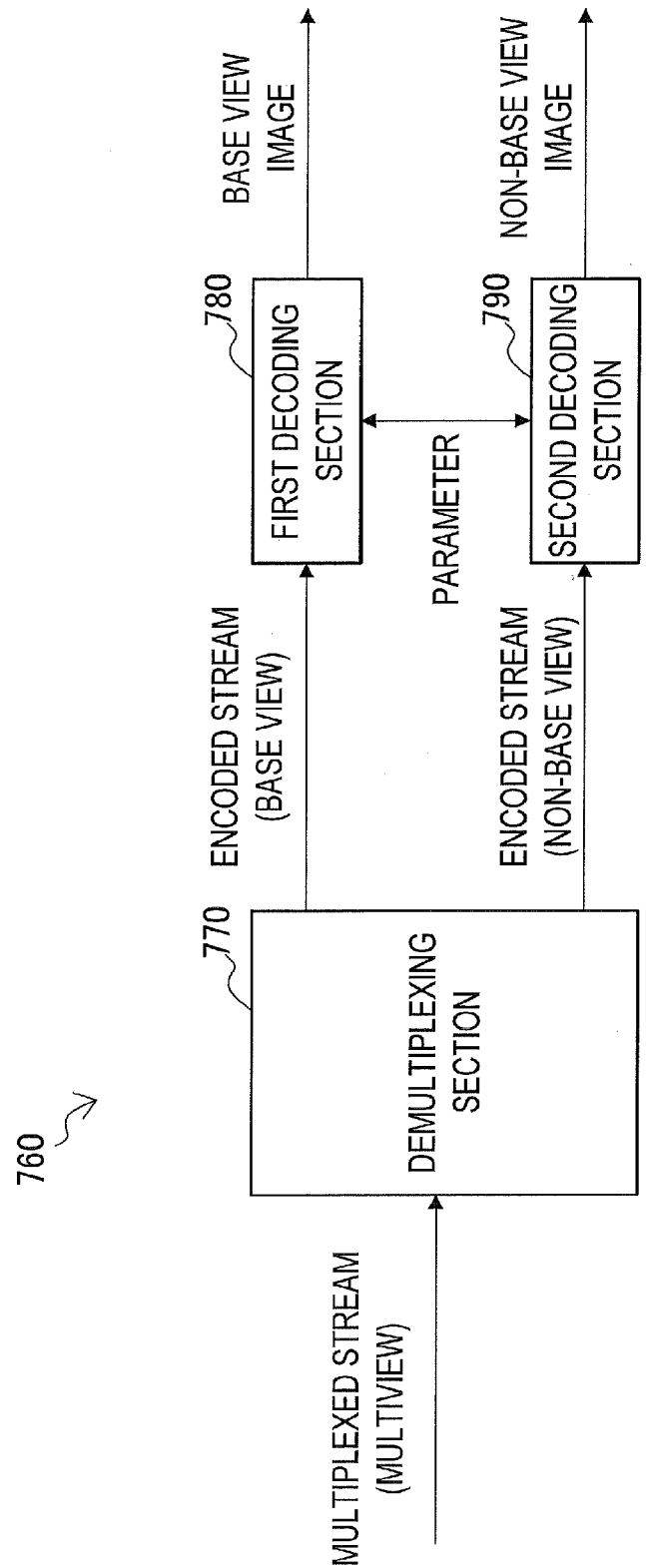
FIG. 42 is an explanatory diagram illustrating an image decoding process according to an embodiment applied to multiview codec.

FIG. 42 is an explanatory diagram illustrating an image decoding process applied to the multiview codec described above. FIG. 42 shows a configuration of a multiview decoding device 760 as an example. The multiview decoding device 760 includes a demultiplexing section 770, a first decoding section 780, and a second decoding section 790.

The demultiplexing section 770 demultiplexes a multiplexed stream for multiview into an encoded stream for the base view and an encoded stream for one or more non-base views. The first decoding section 780 decodes a base view image from an encoded stream for the base view. The second decoding section 790 decodes a non-base view image from an encoded stream for the non-base view.

The first decoding section 780 and the second decoding section 790 illustrated in FIG. 42 are configured similarly to the image decoding device 60 according to the above-described embodiment. Applying the deblocking filter to views enables to parallelize filtering need determination processes for vertical block boundaries and horizontal block boundaries or parallelize filtering need determination processes and filtering processes. A parameter to control these processes may be acquired from a header area of the encoded stream for each view or from a common header area in the multiplexed stream.

[6-2. Scalable Codec]

Figure 43:
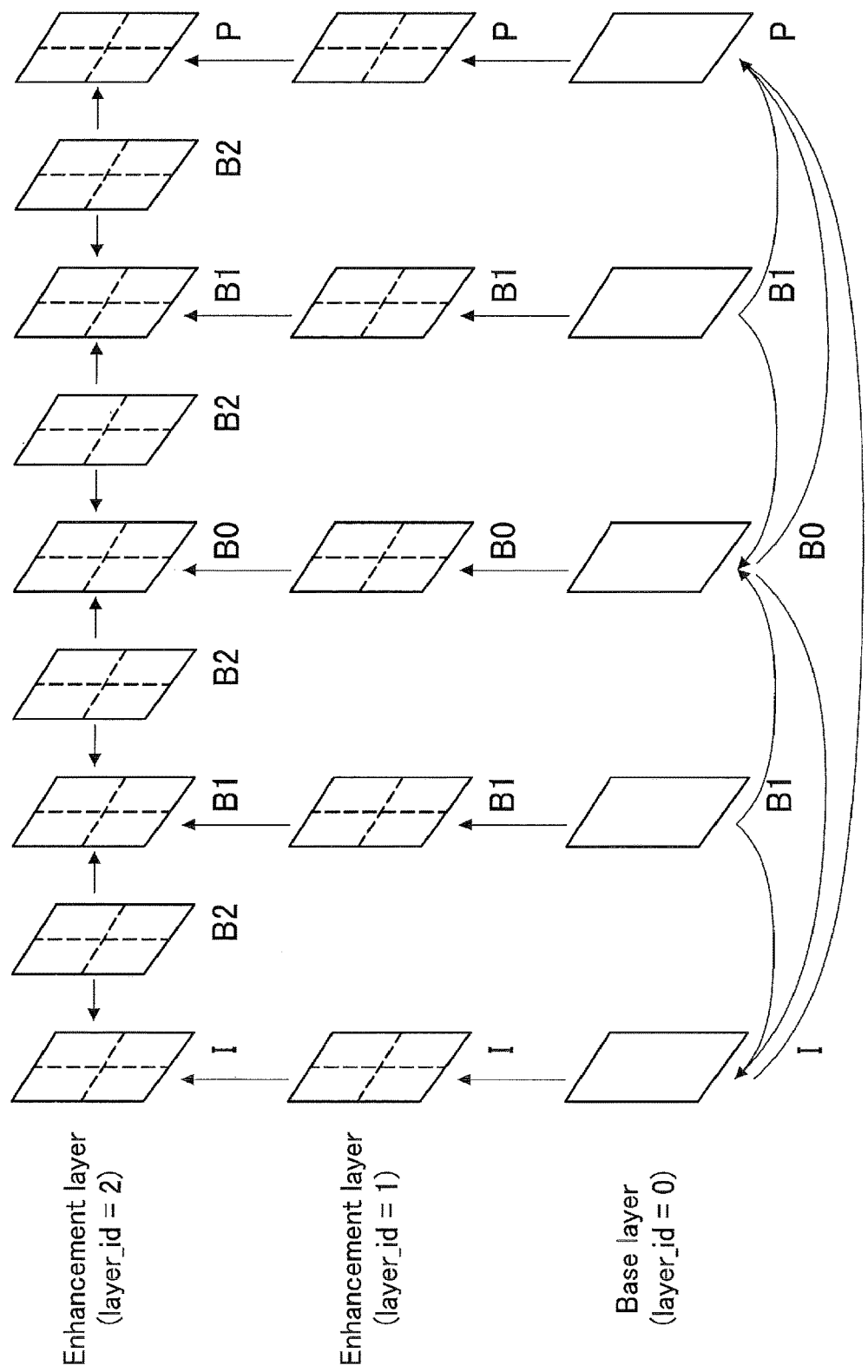
FIG. 43 is an explanatory diagram illustrating scalable codec.

The scalable codec is an image encoding system to provide hierarchical encoding. FIG. 43 is an explanatory diagram illustrating the scalable codec. FIG. 43 illustrates frame sequences for three layers of different space resolutions, time resolutions, or image qualities. Each layer is provided with a layer ID (layer_id). These layers include a base layer having the lowest resolution (or image quality).

Layers other than the base layer are referred to as enhancement layers. The example in FIG. 43 represents a base layer with layer ID "0" and two enhancement layers with layer ID "1" or "2." Encoding multi-layer image data may compress the data size of the encoded stream as a whole by encoding frames of the enhancement layer based on encoding information about frames of the base layer.

The deblocking filter may be applied to each layer during the encoding process and the decoding process according to the scalable codec described above. When the deblocking filter is applied to each view, filtering need determination processes on vertical block boundaries and horizontal block boundaries for each layer may be parallelized based on the technology according to the disclosure. A filtering need determination process and a filtering process for each layer may be parallelized. The parameter to control a filtering need determination process or a filtering process may be provided for each layer. A parameter provided for the base layer may be reused for the enhancement layer.

Filtering need determination processes or filtering processes may be parallelized over layers. Layers may share the parameter to control filtering need determination processes or filtering processes. It may be advantageous to additionally specify a flag indicating whether layers share the parameter. whether layers share the parameter.

Figure 44:
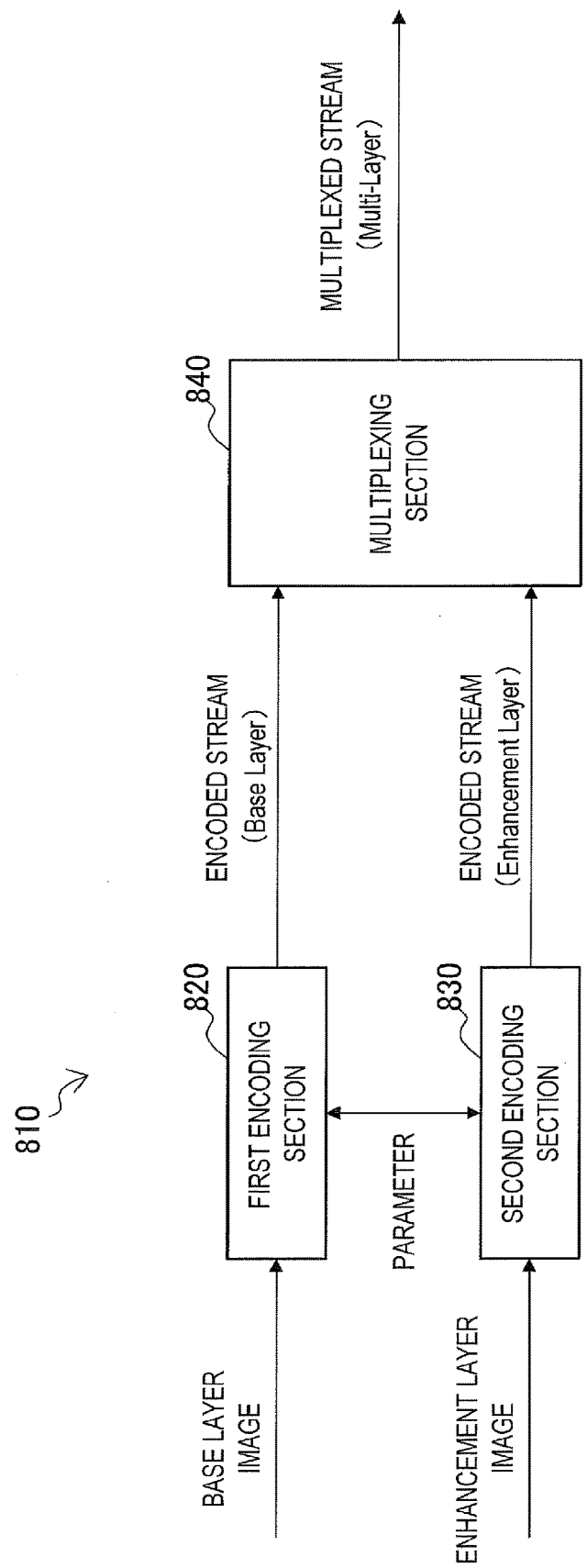
FIG. 44 is an explanatory diagram illustrating an image encoding process according to an embodiment applied to scalable codec.

FIG. 44 is an explanatory diagram illustrating an image encoding process applied to the scalable codec described above. FIG. 44 shows a configuration of a scalable encoding device 810 as an example. The scalable encoding device 810 includes a first encoding section 820, a second encoding section 830, and a multiplexing section 840.

The first encoding section 820 encodes a base layer image and generates an encoded stream for the base layer. The second encoding section 830 encodes an enhancement layer image and generates an encoded stream for the enhancement layer. The multiplexing section 840 multiplexes an encoded stream for the base layer generated from the first encoding section 820 and one or more encoded streams for the enhancement layer generated from the second encoding section 830 to generate a multiplexed stream for multi-layer.

The first encoding section 820 and the second encoding section 830 illustrated in FIG. 44 are configured similarly to the image encoding device 10 according to the above-described embodiment. Applying the deblocking filter to layers enables to parallelize filtering need determination processes for vertical block boundaries and horizontal block boundaries or parallelize filtering need determination processes and filtering processes. A parameter to control these processes may be inserted into a header area of the encoded stream for each layer or into a common header area in the multiplexed stream.

Figure 45:
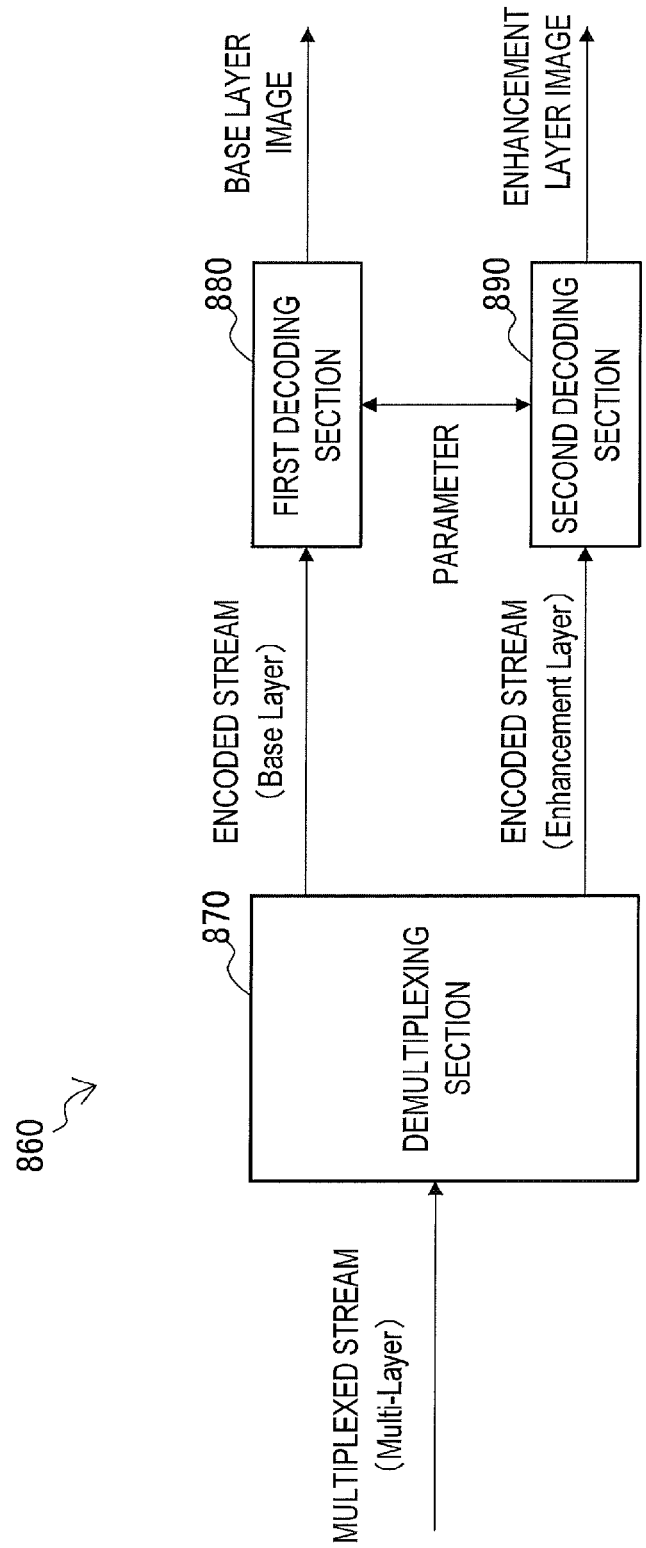
FIG. 45 is an explanatory diagram illustrating an image decoding process according to an embodiment applied to scalable codec.

FIG. 45 is an explanatory diagram illustrating an image decoding process applied to the scalable codec described above. FIG. 45 shows a configuration of a scalable decoding device 860 as an example. The scalable decoding device 860 includes a demultiplexing section 870, a first decoding section 880, and a second decoding section 890.

The demultiplexing section 870 demultiplexes a multiplexed stream for multi-layer into an encoded stream for the base layer and an encoded stream for one or more enhancement layers. The first decoding section 880 decodes a base layer image from an encoded stream for the base layer. The second decoding section 890 decodes an enhancement layer image from an encoded stream for the enhancement layer.

The first decoding section 880 and the second decoding section 890 illustrated in FIG. 45 are configured similarly to the image decoding device 60 according to the above-described embodiment. Applying the deblocking filter to layers enables to parallelize filtering need determination processes for vertical block boundaries and horizontal block boundaries or parallelize filtering need determination processes and filtering processes. A parameter to control these processes may be acquired from a header area of the encoded stream for each layer or from a common header area in the multiplexed stream.

<7. Example Application>

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

[7-1. First Example Application]

Figure 46:
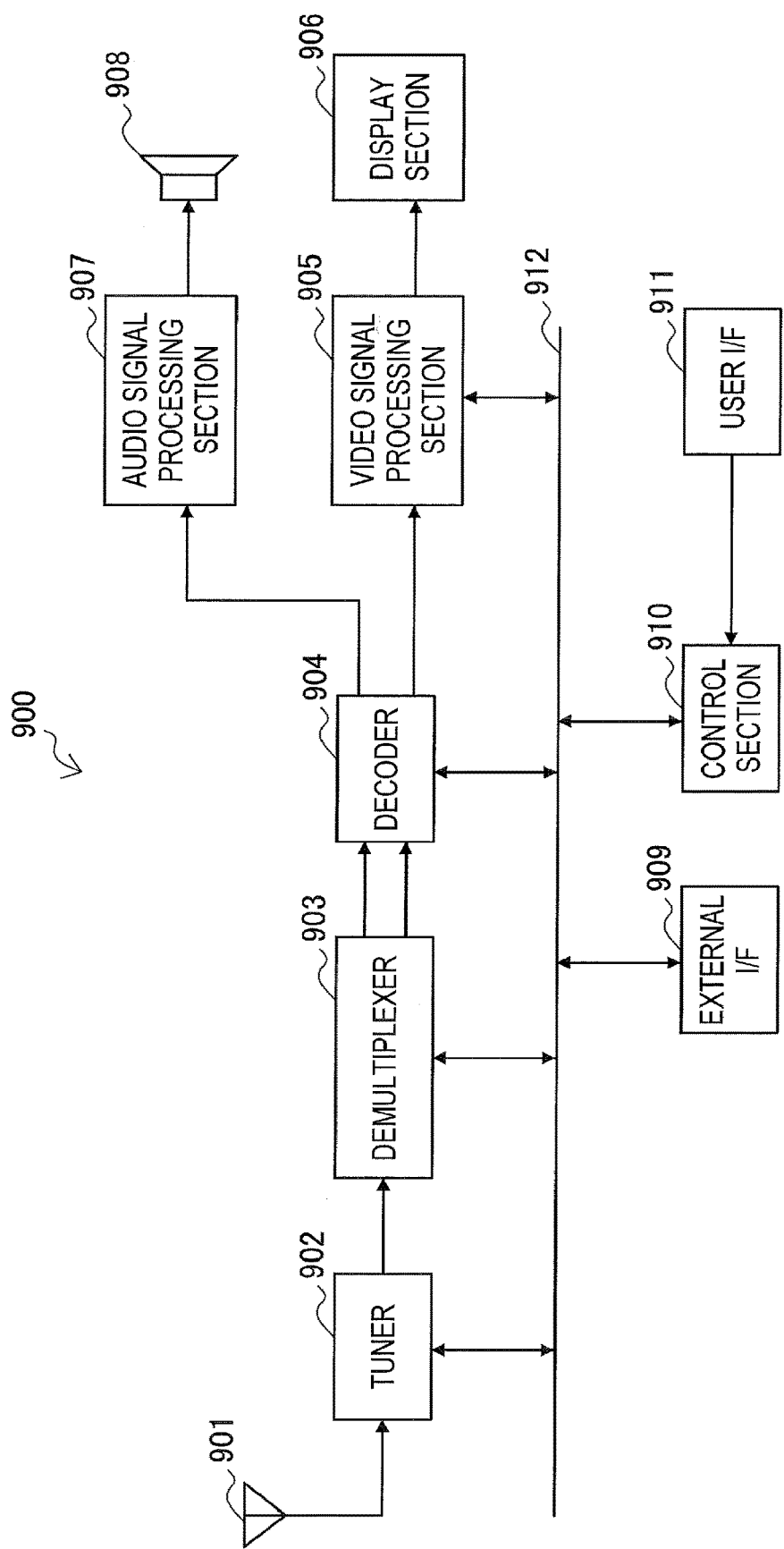
FIG. 46 is a block diagram illustrating a schematic configuration of a television apparatus.

FIG. 46 is a block diagram showing an example of a schematic configuration of a television adopting the embodiment described above. A television 900 includes an antenna 901, a tuner 902, a demultiplexer 903, a decoder 904, an video signal processing section 905, a display section 906, an audio signal processing section 907, a speaker 908, an external interface 909, a control section 910, a user interface 911, and a bus 912.

The tuner 902 extracts a signal of a desired channel from broadcast signals received via the antenna 901, and demodulates the extracted signal. Then, the tuner 902 outputs an encoded bit stream obtained by demodulation to the demultiplexer 903. That is, the tuner 902 serves as transmission means of the televisions 900 for receiving an encoded stream in which an image is encoded.

The demultiplexer 903 separates a video stream and an audio stream of a program to be viewed from the encoded bit stream, and outputs each stream which has been separated to the decoder 904. Also, the demultiplexer 903 extracts auxiliary data such as an EPG (Electronic Program Guide) from the encoded bit stream, and supplies the extracted data to the control section 910. Additionally, the demultiplexer 903 may perform descrambling in the case the encoded bit stream is scrambled.

The decoder 904 decodes the video stream and the audio stream input from the demultiplexer 903. Then, the decoder 904 outputs video data generated by the decoding process to the video signal processing section 905. Also, the decoder 904 outputs the audio data generated by the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal, for example, on the video data according to the setting. Furthermore, the video signal processing section 905 may generate an image of a GUI (Graphical User Interface) such as a menu, a button, a cursor or the like, for example, and superimpose the generated image on an output image.

The display section 906 is driven by a drive signal supplied by the video signal processing section 905, and displays a video or an image on an video screen of a display device (for example, a liquid crystal display, a plasma display, an OLED, or the like).

The audio signal processing section 907 performs reproduction processes such as D/A conversion and amplification on the audio data input from the decoder 904, and outputs audio from the speaker 908. Also, the audio signal processing section 907 may perform an additional process such as noise removal on the audio data.

The external interface 909 is an interface for connecting the television 900 and an external appliance or a network. For example, a video stream or an audio stream received via the external interface 909 may be decoded by the decoder 904. That is, the external interface 909 also serves as transmission means of the televisions 900 for receiving an encoded stream in which an image is encoded.

The control section 910 includes a processor such as a CPU (Central Processing Unit), and a memory such as an RAM (Random Access Memory), an ROM (Read Only Memory), or the like. The memory stores a program to be executed by the CPU, program data, EPG data, data acquired via a network, and the like. The program stored in the memory is read and executed by the CPU at the time of activation of the television 900, for example. The CPU controls the operation of the television 900 according to an operation signal input from the user interface 911, for example, by executing the program.

The user interface 911 is connected to the control section 910. The user interface 911 includes a button and a switch used by a user to operate the television 900, and a receiving section for a remote control signal, for example. The user interface 911 detects an operation of a user via these structural elements, generates an operation signal, and outputs the generated operation signal to the control section 910.

The bus 912 interconnects the tuner 902, the demultiplexer 903, the decoder 904, the video signal processing section 905, the audio signal processing section 907, the external interface 909, and the control section 910.

In the television 900 configured in this manner, the decoder 904 has a function of the image decoding device 60 according to the embodiment described above. Accordingly, also in the case of the image decoding in the television 900, it is possible to enhance the parallelism of deblocking filter processes and ensure high-speed processing.

[7-2. Second Example Application]

Figure 47:
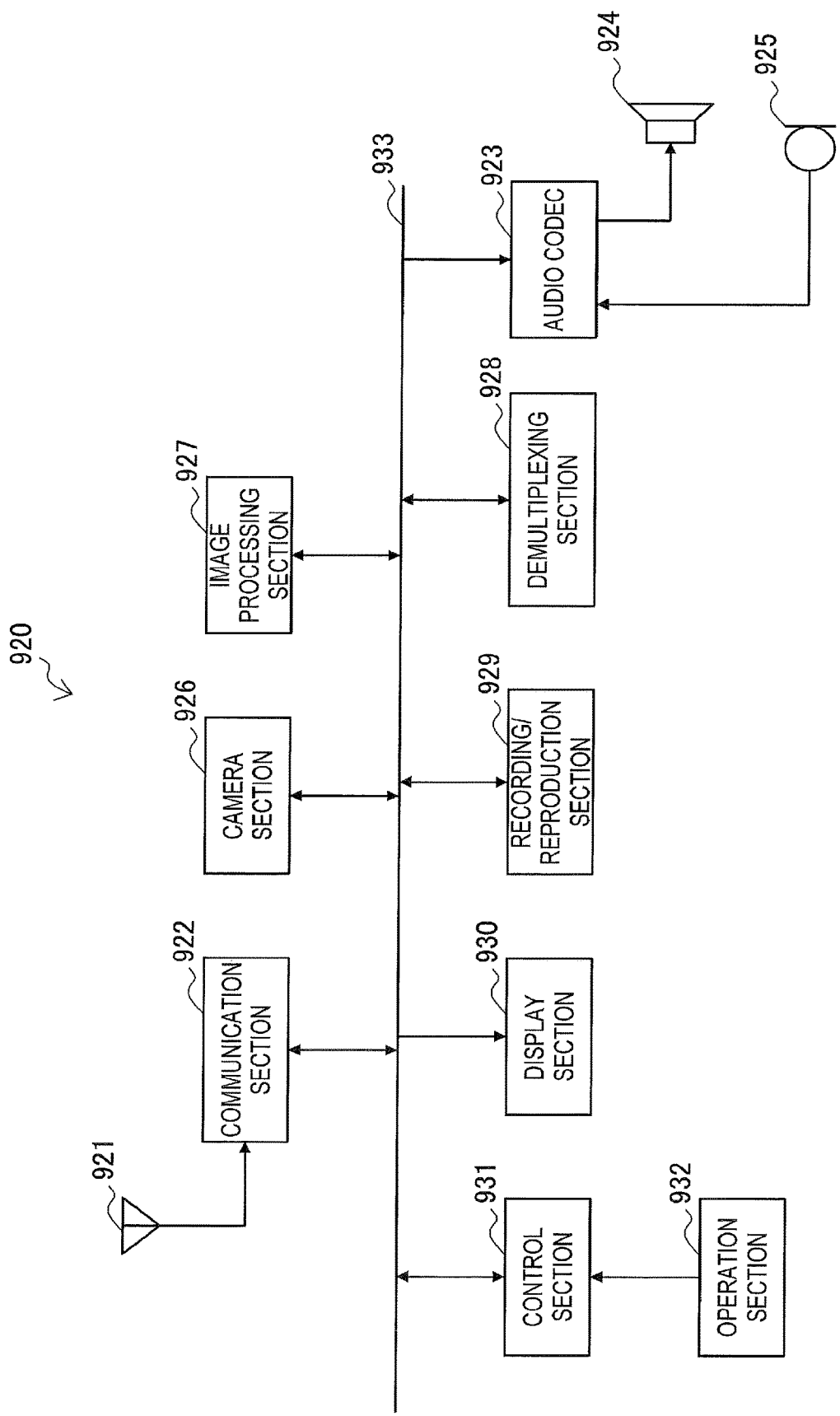
FIG. 47 is a block diagram illustrating a schematic configuration of a mobile phone.

FIG. 47 is a block diagram showing an example of a schematic configuration of a mobile phone adopting the embodiment described above. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 interconnects the communication section 922, the audio codec 923, the camera section 926, the image processing section 927, the demultiplexing section 928, the recording/reproduction section 929, the display section 930, and the control section 931.

The mobile phone 920 performs operation such as transmission/reception of audio signal, transmission/reception of emails or image data, image capturing, recording of data, and the like, in various operation modes including an audio communication mode, a data communication mode, an image capturing mode, and a videophone mode.

In the audio communication mode, an analogue audio signal generated by the microphone 925 is supplied to the audio codec 923. The audio codec 923 converts the analogue audio signal into audio data, and A/D converts and compresses the converted audio data. Then, the audio codec 923 outputs the compressed audio data to the communication section 922. The communication section 922 encodes and modulates the audio data, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. Then, the communication section 922 demodulates and decodes the received signal and generates audio data, and outputs the generated audio data to the audio codec 923. The audio codec 923 extends and D/A converts the audio data, and generates an analogue audio signal. Then, the audio codec 923 supplies the generated audio signal to the speaker 924 and causes the audio to be output.

Also, in the data communication mode, the control section 931 generates text data that makes up an email, according to an operation of a user via the operation section 932, for example. Moreover, the control section 931 causes the text to be displayed on the display section 930. Furthermore, the control section 931 generates email data according to a transmission instruction of the user via the operation section 932, and outputs the generated email data to the communication section 922. Then, the communication section 922 encodes and modulates the email data, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. Then, the communication section 922 demodulates and decodes the received signal, restores the email data, and outputs the restored email data to the control section 931. The control section 931 causes the display section 930 to display the contents of the email, and also, causes the email data to be stored in the storage medium of the recording/reproduction section 929.

The recording/reproduction section 929 includes an arbitrary readable and writable storage medium. For example, the storage medium may be a built-in storage medium such as an RAM, a flash memory or the like, or an externally mounted storage medium such as a hard disk, a magnetic disk, a magneto-optical disk, an optical disc, an USB memory, a memory card, or the like.

Furthermore, in the image capturing mode, the camera section 926 captures an image of a subject, generates image data, and outputs the generated image data to the image processing section 927, for example. The image processing section 927 encodes the image data input from the camera section 926, and causes the encoded stream to be stored in the storage medium of the recording/reproduction section 929.

Furthermore, in the videophone mode, the demultiplexing section 928 multiplexes a video stream encoded by the image processing section 927 and an audio stream input from the audio codec 923, and outputs the multiplexed stream to the communication section 922, for example. The communication section 922 encodes and modulates the stream, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. These transmission signal and received signal may include an encoded bit stream. Then, the communication section 922 demodulates and decodes the received signal, restores the stream, and outputs the restored stream to the demultiplexing section 928. The demultiplexing section 928 separates a video stream and an audio stream from the input stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends and D/A converts the audio stream, and generates an analogue audio signal. Then, the audio codec 923 supplies the generated audio signal to the speaker 924 and causes the audio to be output.

In the mobile phone 920 configured in this manner, the image processing section 927 has a function of the image encoding device 10 and the image decoding device 60 according to the embodiment described above. Accordingly, also in the case of the image decoding and encoding in the mobile phone 920, it is possible to enhance the parallelism of deblocking filter processes and ensure high-speed processing.

[7-3. Third Example Application]

Figure 48:
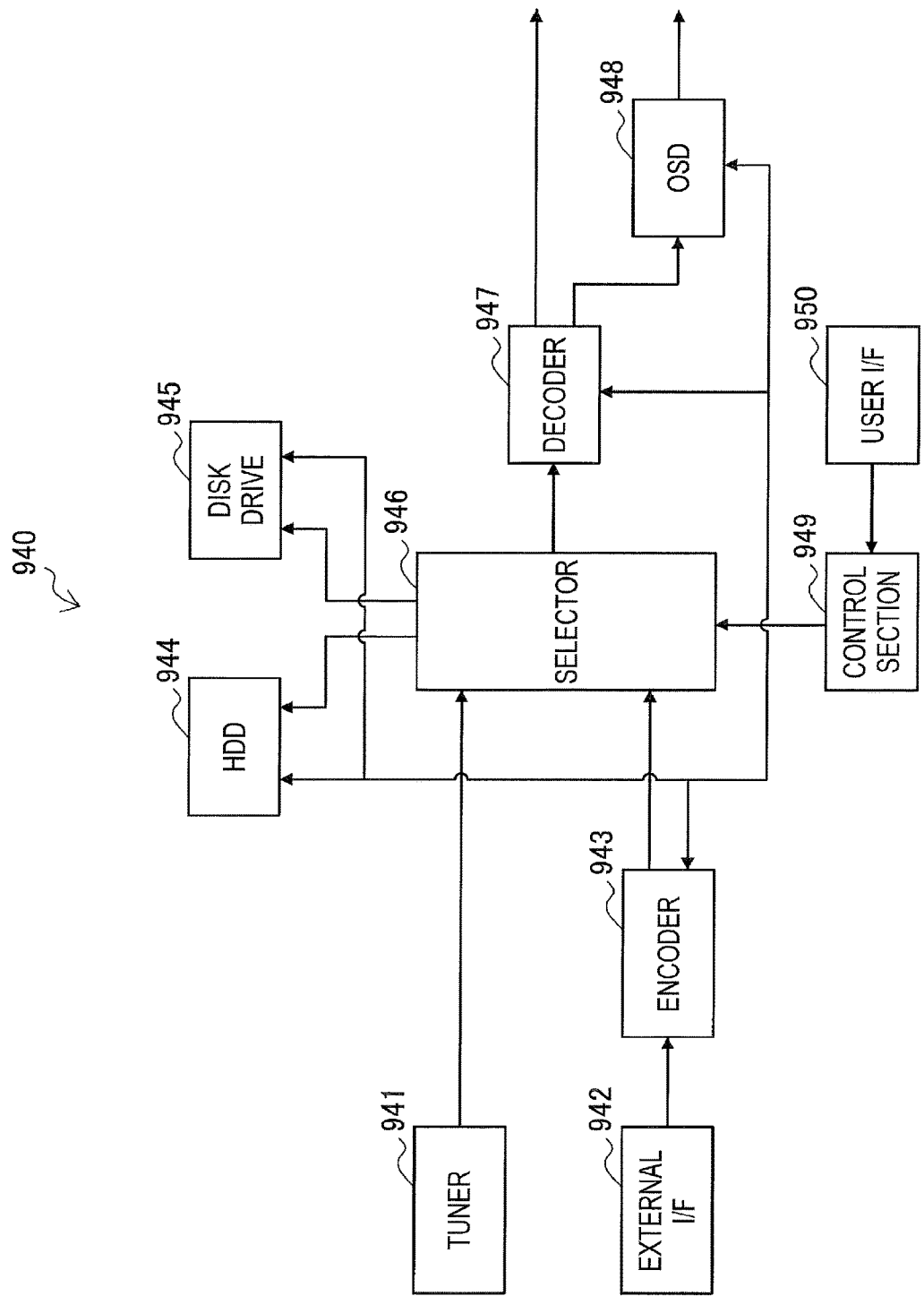
FIG. 48 is a block diagram illustrating a schematic configuration of a recording/reproduction device.

FIG. 48 is a block diagram showing an example of a schematic configuration of a recording/reproduction device adopting the embodiment described above. A recording/reproduction device 940 encodes, and records in a recording medium, audio data and video data of a received broadcast program, for example. The recording/reproduction device 940 may also encode, and record in the recording medium, audio data and video data acquired from another device, for example. Furthermore, the recording/reproduction device 940 reproduces, using a monitor or a speaker, data recorded in the recording medium, according to an instruction of a user, for example. At this time, the recording/reproduction device 940 decodes the audio data and the video data.

The recording/reproduction device 940 includes a tuner 941, an external interface 942, an encoder 943, an HDD (Hard Disk Drive) 944, a disc drive 945, a selector 946, a decoder 947, an OSD (On-Screen Display) 948, a control section 949, and a user interface 950.

The tuner 941 extracts a signal of a desired channel from broadcast signals received via an antenna (not shown), and demodulates the extracted signal. Then, the tuner 941 outputs an encoded bit stream obtained by demodulation to the selector 946. That is, the tuner 941 serves as transmission means of the recording/reproduction device 940.

The external interface 942 is an interface for connecting the recording/reproduction device 940 and an external appliance or a network. For example, the external interface 942 may be an IEEE 1394 interface, a network interface, an USB interface, a flash memory interface, or the like. For example, video data and audio data received by the external interface 942 are input to the encoder 943. That is, the external interface 942 serves as transmission means of the recording/reproduction device 940.

In the case the video data and the audio data input from the external interface 942 are not encoded, the encoder 943 encodes the video data and the audio data. Then, the encoder 943 outputs the encoded bit stream to the selector 946.

The HDD 944 records in an internal hard disk an encoded bit stream, which is compressed content data of a video or audio, various programs, and other pieces of data. Also, the HDD 944 reads these pieces of data from the hard disk at the time of reproducing a video or audio.

The disc drive 945 records or reads data in a recording medium that is mounted. A recording medium that is mounted on the disc drive 945 may be a DVD disc (a DVD-Video, a DVD-RAM, a DVD-R, a DVD-RW, a DVD+, a DVD+RW, or the like), a Blu-ray (registered trademark) disc, or the like, for example.

The selector 946 selects, at the time of recording a video or audio, an encoded bit stream input from the tuner 941 or the encoder 943, and outputs the selected encoded bit stream to the HDD 944 or the disc drive 945. Also, the selector 946 outputs, at the time of reproducing a video or audio, an encoded bit stream input from the HDD 944 or the disc drive 945 to the decoder 947.

The decoder 947 decodes the encoded bit stream, and generates video data and audio data. Then, the decoder 947 outputs the generated video data to the OSD 948. Also, the decoder 904 outputs the generated audio data to an external speaker.

The OSD 948 reproduces the video data input from the decoder 947, and displays a video. Also, the OSD 948 may superimpose an image of a GUI, such as a menu, a button, a cursor or the like, for example, on a displayed video.

The control section 949 includes a processor such as a CPU, and a memory such as an RAM or an ROM. The memory stores a program to be executed by the CPU, program data, and the like. A program stored in the memory is read and executed by the CPU at the time of activation of the recording/reproduction device 940, for example. The CPU controls the operation of the recording/reproduction device 940 according to an operation signal input from the user interface 950, for example, by executing the program.

The user interface 950 is connected to the control section 949. The user interface 950 includes a button and a switch used by a user to operate the recording/reproduction device 940, and a receiving section for a remote control signal, for example. The user interface 950 detects an operation of a user via these structural elements, generates an operation signal, and outputs the generated operation signal to the control section 949.

In the recording/reproduction device 940 configured in this manner, the encoder 943 has a function of the image encoding device 10 according to the embodiment described above. Also, the decoder 947 has a function of the image decoding device 60 according to the embodiment described above. Accordingly, also in the case of the image decoding and encoding in the recording/reproduction device 940, it is possible to enhance the parallelism of deblocking filter processes and ensure high-speed processing.

[7-4. Fourth Example Application]

Figure 49:
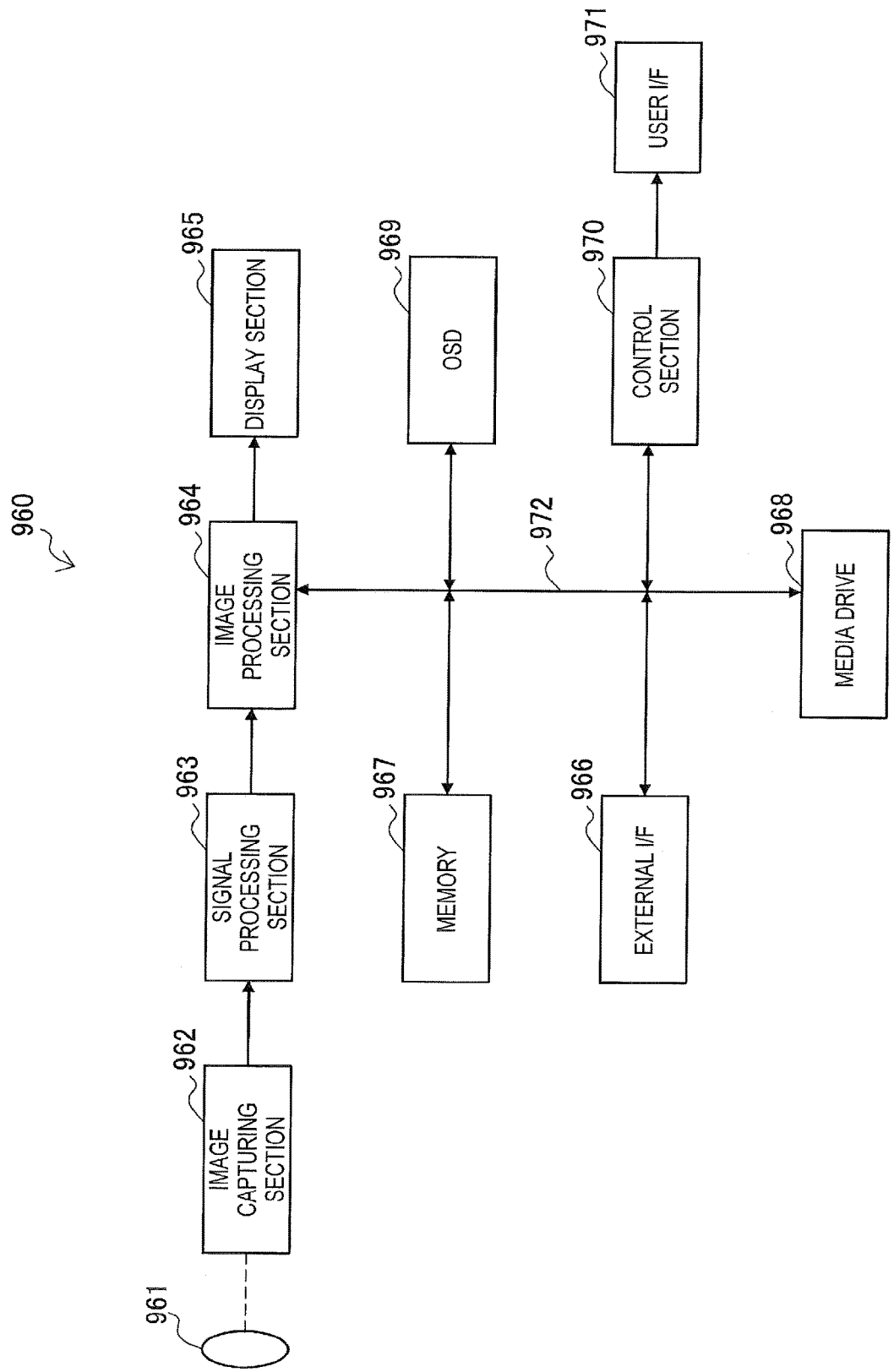
FIG. 49 is a block diagram illustrating a schematic configuration of an image capturing device.

FIG. 49 is a block diagram showing an example of a schematic configuration of an image capturing device adopting the embodiment described above. An image capturing device 960 captures an image of a subject, generates an image, encodes the image data, and records the image data in a recording medium.

The image capturing device 960 includes an optical block 961, an image capturing section 962, a signal processing section 963, an image processing section 964, a display section 965, an external interface 966, a memory 967, a media drive 968, an OSD 969, a control section 970, a user interface 971, and a bus 972.

The optical block 961 is connected to the image capturing section 962. The image capturing section 962 is connected to the signal processing section 963. The display section 965 is connected to the image processing section 964. The user interface 971 is connected to the control section 970. The bus 972 interconnects the image processing section 964, the external interface 966, the memory 967, the media drive 968, the OSD 969, and the control section 970.

The optical block 961 includes a focus lens, an aperture stop mechanism, and the like. The optical block 961 forms an optical image of a subject on an image capturing surface of the image capturing section 962. The image capturing section 962 includes an image sensor such as a CCD, a CMOS or the like, and converts by photoelectric conversion the optical image formed on the image capturing surface into an image signal which is an electrical signal. Then, the image capturing section 962 outputs the image signal to the signal processing section 963.

The signal processing section 963 performs various camera signal processes, such as knee correction, gamma correction, color correction and the like, on the image signal input from the image capturing section 962. The signal processing section 963 outputs the image data after the camera signal process to the image processing section 964.

The image processing section 964 encodes the image data input from the signal processing section 963, and generates encoded data. Then, the image processing section 964 outputs the generated encoded data to the external interface 966 or the media drive 968. Also, the image processing section 964 decodes encoded data input from the external interface 966 or the media drive 968, and generates image data. Then, the image processing section 964 outputs the generated image data to the display section 965. Also, the image processing section 964 may output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI, such as a menu, a button, a cursor or the like, for example, and outputs the generated image to the image processing section 964.

The external interface 966 is configured as an USB input/output terminal, for example. The external interface 966 connects the image capturing device 960 and a printer at the time of printing an image, for example. Also, a drive is connected to the external interface 966 as necessary. A removable medium, such as a magnetic disk, an optical disc or the like, for example, is mounted on the drive, and a program read from the removable medium may be installed in the image capturing device 960. Furthermore, the external interface 966 may be configured as a network interface to be connected to a network such as a LAN, the Internet or the like. That is, the external interface 966 serves as transmission means of the image capturing device 960.

A recording medium to be mounted on the media drive 968 may be an arbitrary readable and writable removable medium, such as a magnetic disk, a magneto-optical disk, an optical disc, a semiconductor memory or the like, for example. Also, a recording medium may be fixedly mounted on the media drive 968, configuring a non-transportable storage section such as a built-in hard disk drive or an SSD (Solid State Drive), for example.

The control section 970 includes a processor such as a CPU, and a memory such as an RAM or an ROM. The memory stores a program to be executed by the CPU, program data, and the like. A program stored in the memory is read and executed by the CPU at the time of activation of the image capturing device 960, for example. The CPU controls the operation of the image capturing device 960 according to an operation signal input from the user interface 971, for example, by executing the program.

The user interface 971 is connected to the control section 970. The user interface 971 includes a button, a switch and the like used by a user to operate the image capturing device 960, for example. The user interface 971 detects an operation of a user via these structural elements, generates an operation signal, and outputs the generated operation signal to the control section 970.

In the image capturing device 960 configured in this manner, the image processing section 964 has a function of the image encoding device 10 and the image decoding device 60 according to the embodiment described above. Accordingly, in the case of the image decoding and encoding in the image capturing device 960, it is possible to enhance the parallelism of deblocking filter processes and ensure high-speed processing.

<8. Summing-Up>

With reference to FIGS. 1 through 49, there have been described three working examples of the deblocking filters for the image encoding device 10 and the image decoding device 60 according to an embodiment. The three working examples use pixel values input to the deblocking filters to determine whether the deblocking filters for a vertical boundary and a horizontal boundary need to be applied or not. The determination processes can be performed in parallel independently of filtering process results. The dependency of processes between macro blocks is eliminated to enable parallelization of processes on macro blocks. As a result, it is possible to avoid delay or data rate degradation due to a large processing amount of the deblocking filters and ensure high-speed processing. The parallelism and sequences of deblocking filter processes can be flexibly configured according to various conditions such as image sizes or installation environment.

According to the first working example, the determination of whether to apply the deblocking filter to vertical boundaries uses pixel values of pixels belonging to rows to which the definition for horizontal boundaries is not applied. The determination of whether to apply the deblocking filter to horizontal boundaries uses pixel values of pixels belonging to rows to which the definition for vertical boundaries is not applied. The filtering process on a block does not update a pixel value used for the filtering need determination process on another block. Pixel values input to the deblocking filter need not be stored in extra memory even if a filtering need determination process on a given block follows a filtering process on another block. This can save hardware costs needed for the apparatus installation.

According to the second working example, the memory not updated by the filtering process stores a pixel value input to the deblocking filter. The filtering need determination processes reference the input pixel value. In this case, the filtering need determination processes reference a pixel whose position is free from restrictions. This enables to use flexible determination conditions appropriate to various purposes such as more accurate determination of filtering necessity or the determination with reduced processing costs.

According to the third working example, filtering processes for vertical boundaries and horizontal boundaries filter pixels input to the deblocking filter. This configuration can parallelize filtering processes for vertical boundaries and horizontal boundaries each other. This can further accelerate processes of the deblocking filter. An output pixel value is calculated based on two filter outputs in terms of a pixel updated by two filtering processes performed in parallel. Parallelizing two filtering processes can also appropriately reduce block distortion appearing on the vertical boundary and the horizontal boundary. An output pixel value can be calculated as a weighted average of two filter outputs. This can allow the deblocking filter to more effectively eliminate the block distortion and further improve the image quality.

The specification has mainly described examples where filtering processes for vertical boundaries precedes filtering processes for horizontal boundaries. In addition, the above-described effects of the technology according to the disclosure are equally available to a case where filtering processes for horizontal boundaries precede filtering processes for vertical boundaries. The deblocking filter processing unit or the macro block may be sized otherwise than described in the specification. An available technique may omit the filtering need determination processes and parallelize application of the deblocking filter to vertical boundaries and horizontal boundaries.

A technique of transmitting information used for deblocking filter process parallelization from the encoding side to the decoding side is not limited to the technique of multiplexing the information into the encoded stream header. For example, the information may not be multiplexed into an encoded bit stream but may be transmitted or recorded as separate data associated with the encoded bit stream. The term "association" signifies ensuring possibility of linking an image (or part of an image such as a slice or a block) contained in the bit stream with information corresponding to the image. Namely, the information may be transmitted over a transmission path different from that used for images (or bit streams). The information may be recorded on a recording medium (or a different recording area on the same recording medium) different from that used for images (or bit streams). The information and the image (or bit stream) may be associated with each other based on any units such as multiple frames, one frame, or part of a frame.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

The specification represents filtering processes for vertical boundaries as "horizontal filtering" and filtering processes for horizontal boundaries as "vertical filtering." Generally, filtering processes for vertical boundaries uses horizontally positioned filter taps. Filtering processes for horizontal boundaries uses vertically positioned filter taps. For this reason, the above-described nomenclature is used for the filtering processes.

REFERENCE SIGNS LIST 10, 60 image processing device
112-1 to 112-$n$, 212-1 to 212-$n$ first determination section (vertical boundary determination section)
114-1 to 114-$n$, 214-1 to 214-$n$ second determination section (horizontal boundary determination section)
132-1 to 132-$n$, 332-1 to 332-$n$ first filtering section (horizontal filtering section)
142-1 to 142-$n$, 342-1 to 342-$n$ second filtering section (vertical filtering section)
150 parallelization control section
208 line memory (memory)
360 calculation section

The invention claimed is:

1. An image processing device comprising:
processing circuitry configured to
perform horizontal filtering determination processes in parallel across a plurality of vertical block boundaries among a plurality of 8×8 blocks within a locally decoded image, each horizontal filtering determination process determining whether to apply a horizontal filter to pixels neighboring a respective vertical block boundary having a length of 8 pixels;
apply, in parallel, the horizontal filter to the pixels neighboring the plurality of vertical block boundaries within the locally decoded image to which the horizontal filter is determined to be applied by the horizontal filtering determination processes to generate a first filtered image, the horizontal filter being applied to each of the plurality of vertical boundaries within the locally decoded image to which the horizontal filter is determined to be applied by the horizontal filtering determination processes without depending on horizontal filter results of the other vertical block boundaries of the plurality of 8×8 blocks to which the horizontal filter is determined to be applied,
perform vertical filtering determination processes in parallel across a plurality of horizontal block boundaries among the plurality of 8×8 blocks within the first filtered image, each vertical filtering determination process determining whether to apply a vertical filter to pixels neighboring a respective horizontal block boundary having a length of 8 pixels,
apply, in parallel, the vertical filter to the pixels neighboring the horizontal block boundaries within the first filtered image generated by the horizontal filtering to which the vertical filter is determined to be applied by the vertical filtering determination processes to generate a second filtered image, the vertical filter being applied to each of the plurality of horizontal boundaries within the first filtered image to which the vertical filter is determined to be applied without depending on Vertical filter results for the other horizontal block boundaries of the plurality of 8×8 blocks to which the vertical filter is determined to be applied, and
encode an image using the second filtered image to generate an encoded stream.

2. The image processing device according to claim 1, wherein the processing circuitry is configured to encode the image per a unit of hierarchized block.

3. The image processing device according to claim 1, wherein each horizontal filtering determination process determines whether to apply the horizontal filter to the pixels neighboring the respective vertical block boundary without depending on the horizontal filtering determination processes for the other vertical block boundaries.

4. The image processing device according to claim 1, wherein each vertical filtering determination process determines whether to apply the vertical filter to the pixels neighboring the respective horizontal block boundary without depending on the vertical filtering determination processes for the other horizontal block boundaries.

5. An image processing method comprising:
performing horizontal filtering determination processes in parallel across a plurality of vertical block boundaries among a plurality of 8×8 blocks within a locally decoded image, each horizontal filtering determination process determining whether to apply a horizontal filter to pixels neighboring a respective vertical block boundary having a length of 8×8 pixels;
applying, in parallel by processing circuitry of an image processing device, the horizontal filter to the pixels neighboring the plurality of vertical block boundaries within the locally decoded image to which the horizontal filter is determined to be applied by the horizontal filtering determination processes to generate a first filtered image, the horizontal filter being applied to each of the plurality of vertical boundaries within the locally decoded image to which the horizontal filter is determined to be applied by the horizontal filtering determination processes without depending on horizontal filter results of the other vertical block boundaries of the plurality of 8×8 blocks to which the horizontal filter is determined to be applied,
performing vertical filtering determination processes in parallel across a plurality of horizontal block boundaries among the plurality of 8×8 blocks within the first filtered image, each vertical filtering determination process determining whether to apply a vertical filter to pixels neighboring a respective horizontal block boundary having a length of 8 pixels,
applying in parallel, the vertical filter to the pixels neighboring the horizontal block boundaries within the first filtered image generated by the horizontal filtering to which the vertical filter is determined to be applied by the Vertical filtering determination processes to generate a second filtered image, the vertical filter being applied to each of the plurality of horizontal boundaries within the first filtered image to which the vertical filter is determined to be applied without depending on Vertical filter results for the other horizontal block boundaries of the plurality of 8×8 blocks to which the vertical filter is determined to be applied, and
encoding an image using the second filtered image to generate an encoded stream.

6. The image processing method according to claim 5, wherein the encoding includes encoding the image per a unit of hierarchized block.

7. The image processing method according to claim 5, wherein each horizontal filtering determination process determines whether to apply the horizontal filter to the pixels neighboring the respective vertical block boundary without depending on the horizontal filtering determination processes for the other vertical block boundaries.

8. The image processing method according to claim 5, wherein each vertical filtering determination process determines whether to apply the vertical filter to the pixels neighboring the respective horizontal block boundary without depending on the vertical filtering determination processes for the other horizontal block boundaries.

9. A non-transitory computer-readable medium storing instructions which when executed by a computer cause the computer to perform an image processing method, the image processing method comprising:
performing horizontal filtering determination processes in parallel across a plurality of vertical block boundaries among a plurality of 8×8 blocks within a locally decoded image, each horizontal filtering determination process determining whether to apply a horizontal filter to pixels neighboring a respective vertical block boundary having a length of 8×8 pixels;
applying, in parallel, the horizontal filter to the pixels neighboring the plurality of vertical block boundaries within the locally decoded image to which the horizontal filter is determined to be applied by the horizontal filtering determination processes to generate a first filtered image, the horizontal filter being applied to each of the plurality of vertical boundaries within the locally decoded image to which the horizontal filter is determined to be applied by the horizontal filtering determination processes without depending on horizontal filter results of the other vertical block boundaries of the plurality of 8×8 blocks to which the horizontal filter is determined to be applied,
performing vertical filtering determination processes in parallel across a plurality of horizontal block boundaries among the plurality of 8×8 blocks within the first filtered image, each vertical filtering determination process determining whether to apply a vertical filter to pixels neighboring a respective horizontal block boundary having a length of 8 pixels,
applying, in parallel, the vertical filter to the pixels neighboring the horizontal block boundaries within the first filtered image generated by the horizontal filtering to which the vertical filter is determined to be applied by the vertical filtering determination processes to generate a second filtered image, the vertical filter being applied to each of the plurality of horizontal boundaries within the first filtered image to which the vertical filter is determined to be applied without depending on vertical filter results for the other horizontal block boundaries of the plurality of 8×8 blocks to which the vertical filter is determined to be applied, and
encoding an image using the second filtered image to generate an encoded stream.

10. The non-transitory computer-readable medium according to claim 9, wherein the decoding includes encoding the image per a unit of hierarchized block.

11. The non-transitory computer-readable medium according to claim 9, wherein each horizontal filtering determination process determines whether to apply the horizontal filter to the pixels neighboring the respective vertical block boundary without depending on the horizontal filtering determination processes for the other vertical block boundaries.

12. The non-transitory computer-readable medium according to claim 9, wherein each vertical filtering determination process determines whether to apply the vertical filter to the pixels neighboring the respective horizontal block boundary without depending on the vertical filtering determination processes for the other horizontal block boundaries.

* * * * *